(12) United States Patent
Dalton

(10) Patent No.: US 6,891,138 B2
(45) Date of Patent: May 10, 2005

(54) ELECTROMAGNETIC SUSCEPTORS WITH COATINGS FOR ARTIFICIAL DIELECTRIC SYSTEMS AND DEVICES

(76) Inventor: Robert C. Dalton, 455 Ocean Blvd., #27, Long Branch, NJ (US) 07740

( * ) Notice: Subject to any disclaimer, the term of this patent is extended or adjusted under 35 U.S.C. 154(b) by 14 days.

(21) Appl. No.: 10/351,769

(22) Filed: Jan. 27, 2003

(65) Prior Publication Data

US 2003/0226840 A1 Dec. 11, 2003

Related U.S. Application Data

(60) Continuation-in-part of application No. 09/897,268, filed on Jul. 2, 2001, now Pat. No. 6,512,215, which is a division of application No. 09/402,240, filed as application No. PCT/US98/06647 on Apr. 3, 1998, now Pat. No. 6,271,509.
(60) Provisional application No. 60/041,942, filed on Apr. 4, 1997.

(51) Int. Cl.$^7$ ................................................ H05B 6/10
(52) U.S. Cl. ........................ 219/634; 219/759; 219/730
(58) Field of Search ................................ 219/634, 638, 219/759, 633, 728, 730, 635, 679, 687; 422/168, 171, 174, 211; 204/157.15, 157.3, 158.2; 60/274, 770, 526, 531, 520, 650, 39.35; 428/238

(56) References Cited

U.S. PATENT DOCUMENTS 5,021,293 A * 6/1991 Huang et al. ................ 428/328
5,294,763 A * 3/1994 Chamberlain et al. ...... 219/729
5,338,911 A * 8/1994 Brandberg et al. .......... 219/759

* cited by examiner

Primary Examiner—Quang T Van
(74) Attorney, Agent, or Firm—Technoprop Colton LLC

(57) ABSTRACT

A coated susceptor of electromagnetic energy for chemical processing made of a matrix material that surrounds a non-matrix material that is made from a material that is different from the matrix material, in which the matrix material is constructed of material having lower dielectric losses compared to the non-matrix material, the non-matrix material initially absorbs electromagnetic energy applied to the electromagnetic susceptor to a greater extent than the matrix material, the non-matrix material produces subsequent heat in the matrix material, and the surface of the susceptor is coated with a material that interacts with applied electromagnetic energy of at least one frequency and initially absorbs electromagnetic energy and produces heat.

72 Claims, 9 Drawing Sheets

ELECTROMAGNETIC SUSCEPTORS WITH COATINGS FOR ARTIFICIAL DIELECTRIC SYSTEMS AND DEVICES

CROSS-REFERENCE TO RELATED APPLICATIONS

The present application is a continuation-in-part of U.S. patent application Ser. No. 09/897,268, filed on 2 Jul. 2001, allowed and which will issue as U.S. Pat. No. 6,512,215 on 28 Jan. 2003, which is a divisional of U.S. patent application Ser. No. 09/402,240, filed on 29 Sep. 1999, which issued as U.S. Pat. No. 6,271,509 B1 on 7 Aug. 2001, which is the US National Phase under Chapter II of the PCT of PCT Patent Application No. PCT/US98/06647 filed Apr. 3, 1998, which published as International Publication No. WO 98/46046 on 15 Oct. 1998, which claims the benefit of U.S. Provisional Patent Application No. 60/041,942, filed on Apr. 4, 1997.

BACKGROUND OF THE INVENTION

1. Field of Invention

This invention relates to a device and process for thermal treatment of waste gases and reactive gases. The invention is used for the destruction and reduction of pollutants from effluent waste streams, and to produce gaseous products from reactant gases. This invention more specifically relates to a coated susceptor of electromagnetic energy for chemical processing in which a matrix material surrounds a non-matrix material that is made from a material that is different from the matrix material, and the matrix material is constructed of material having lower dielectric losses compared to the non-matrix material.

2. Prior Art

Devices, which operate on electricity to thermally treat gases from waste streams to reduce pollution and thermally react gases for synthesis of products, do not rely on natural gas for supplying energy. Devices that use natural gas to produce energy for such applications create carbon dioxide, carbon monoxide and nitrogen oxides from the energy source. Electricity is considered to have cleaner operation when used in such devices since the above chemical species are not produced during operation from the heat source. Electric devices for pollution control applications produce less pollution at the point source when compared to the counter technologies operating on natural gas. The reduced pollution is favorable to reduce greenhouse gases and to the meet the requirements of the Clean Air Act of 1990. There are many types of electric heating methods; this discussion will focus on designs used to produce heat and reaction with applied electromagnetic energy.

The scope of this current invention is a device for thermal treatment of gases and pollutants that employs 1) alternate cavity and susceptor geometries for providing more homogeneous interactions of applied electromagnetic energy in the volume of the susceptor regardless of the flow rate and diameter of the exhaust duct width, 2) heat transfer methods to improve the overall heat efficiency of the device, 3) a susceptor structure that has reflectivity as principle mode of interaction with applied electromagnetic energy, which allows for energy to penetrate a susceptor, 4) composite susceptor materials, 5) a simple method of controlling the temperature versus energy concentration in the susceptor, and 6) field concentrators to concentrate the energy density of the applied electromagnetic energy.

Cavity geometries in these devices affect the optical properties of the electromagnetic energy within the susceptor. Electromagnetic energy, whether ultraviolet, infrared, microwave or radio frequencies, exhibits the same optical properties as the visible spectrum when interacting with geometric shapes and surfaces that are similar to a lens. The electromagnetic energy in a susceptor can either converge or diverge due to the geometric shape of the susceptor following the same principles as optical lenses. Additionally, the modes of propagation of the electromagnetic energy are dependent upon the cavities geometry. These modes effect the distribution of electromagnetic energy in the cavity. These modes are different for cylindrical and rectangular cavities (see, e.g., *Handbook of Microwave Engineering*).

Electromagnetic energy that is incident perpendicular to the perimeter of the circular cross-section of a cylindrical susceptor will converge initially, concentrating the energy within the cross-section. This concentration will cause the material inside the susceptor to absorb more energy than the material near the surface, changing the dielectric properties of the material inside the cross-section. This concentration of energy can make the material, which is located in the susceptor's interior, between the center and the perimeter, to absorb more energy, thereby reducing the depth of penetration of the material due to the susceptor's geometry.

The optical properties of rectangular cavities and planar surfaces are different. Rectangular cavities with a susceptor having a rectangular geometry and planar surfaces will follow the optical properties of a flat surface. A flat surface does not concentrate or disperse energy as do curved surfaces, such as convex and concave surfaces. With a flat surface of incidence for applied electromagnetic energy, the absorption of electromagnetic energy in a susceptor is due only to the properties of the materials and is not influenced by energy, which is concentrated by curved geometries. Incident energy on susceptors with flat surfaces will not be concentrated within a structure with homogeneous material, and the depth of penetration will be influenced by the incident energy's power, the electric fields and magnetic fields inside the susceptor. Conversely, incident energy on susceptors with curved geometry can be concentrated within a susceptor with homogeneous materials, and the depth of penetration of the energy will be influenced by the ability of the curved surface to concentrate energy inside the susceptor.

The overall energy efficiency of such devices for thermal treatment of gases can be improved with a better heat transfer process to capture the energy that is lost from cooling the tube that is the source for the applied electromagnetic energy. In industrial microwave drying operations, the heat produced from cooling the magnetrons with air is applied to the articles that are being dried with the microwaves. This synergistic drying, which uses hot air and microwaves, increases the energy efficiency of the drying process.

Alternative composite materials and susceptor structures can be used to facilitate the thermal treatment of gases. These composite materials and susceptor structures are known as artificial dielectrics.

Artificial dielectric structures date back to the 1940s. Artificial dielectrics were used as lenses to focus radio waves for communication (Koch). Artificial dielectrics use conductive metal plates, rods, spheres and discs (second phase material) which are embedded in matrices of low dielectric constants and low dielectric losses to increase the index of refraction, thus reducing size of a lens to achieve the desired optical properties. The second phase material reflects the energy and uses diffuse reflection to transmit electromagnetic energy. These plates, rods, spheres, and discs can be arranged in a lattice structure to produce an isotropic or an anisotropic structure.

When conductive elements are embedded in a low dielectric constant and low dielectric loss matrix, the effect of these on the matrix material's dielectric loss factor is negligible and the dielectric constant of the composite lens is increased. However, these above effects are limited and influenced by the size, shape, conductivity and volume fraction of the material embedded in a matrix of low dielectric loss, low dielectric constant of the material as well as the wavelength of the incident radiation. The dielectric strength and complex dielectric constant of the matrix material plays important additional roles in the design of artificial dielectric lenses. On the other hand, selection of matrix materials with different dielectric properties and incorporation of second phase materials such as semiconductors, ferroelectrics, ferromagnetics, antiferroelectrics, antiferromagnetics, dielectrics with higher dielectric losses, and dielectrics with conductive losses that produce absorption of microwave energy, produce heat in an artificial dielectric.

Lossy artificial dielectrics were demonstrated by the 1950s and subsequently used at the microwave frequencies to sinter ceramic articles, in food packaging for heating foodstuffs, in browning apparatuses for foodstuffs, in consumer products, and to render adhesives flowable for bonding applications.

The structure of the artificial dielectrics determines the electromagnetic properties. When the volume fraction of the second phase materials inside the artificial dielectric reaches a certain level, the artificial dielectric will reflect incident electromagnetic energy, shielding the artificial dielectric from absorbing electromagnetic energy. The volume fraction of the second phase material at which the artificial dielectric shields electromagnetic energy is dependent on the second phase material's reflectivity, the shape of the second phase material, and the temperature. By controlling the amount of reflection, the susceptor's reflectivity can be used to control the susceptor's temperature.

Reflectivity has been used to produce structures that have a self-limiting temperature. Producing reflectivity in dielectrics is explained in Von Hipple's Dielectrics and Waves. Using such principles, devices have been designed to have self-limiting temperatures. Self-limiting temperatures have also been theorized for materials with Curie temperatures. The reflectivity of electromagnetic energy is related to a material's conductivity. Metals are electrically conductive at room temperatures and reflective of electromagnetic energy. Semiconductors and ionic conductors have low moderate conductivity at room temperature. At elevated temperatures semiconductors and ionic conductors have increased conductivity, and these materials will become reflective to electromagnetic energy at elevated temperatures. The amount of reflectivity of a material at elevated temperature will also be dependent upon the wavelength of incident electromagnetic energy.

The artificial dielectrics structure can be used to produce diffuse reflection, or scattering, inside a susceptor. The second phase materials either can be reflective materials at room temperature, such as a metal, or can become reflective at elevated temperatures due to 1) increasing conductivity, such as semiconductors and ionic conductors and/or 2) exceeding the Curie temperature, such as ferroelectrics and ferromagnetics. This diffuse reflection may also be used to control the temperature of a given susceptor that uses the artificial dielectric structure.

Regardless of the structure of a susceptor and its materials of construction, applied energy must be applied to penetrate the structure and material or materials of construction for volumetric interaction between the susceptor and the applied energy.

Other considerations must be given to the structure of a susceptor in a device for thermal treatment of gases. Honeycombs, foams, packed material and woven structures, which are constructed of a material that either has an increased dielectric conductivity at elevated temperatures or has a Curie temperature below the operating temperature could become reflective. If the material becomes reflective, then the susceptor's structure either could a) act as waveguides with dimensions that would not allow the applied energy to penetrate because the applied energy would be below the cut-off frequency for the susceptor's structure or b) shield the electromagnetic energy from penetrating into the susceptor. The *Handbook of Microwave Engineering Handbook* explains waveguide theory in more detail. For example, granular suscepting structures employed in U.S. Pat. No. 4,718,358 for treatment of gases exemplify conditions where the susceptor's structure may not allow for incident electromagnetic energy penetrate the volume of the susceptor.

It seems to appear that the authors of U.S. Pat. No. 4,718,358 preferably embody granular absorbing material in the range of about 5 mm to 10 mm with a layer thickness, which is preferably 100 mm to 300 mm. One of the preferred absorbing materials is SiC in granular form. Silicon carbide, a semi-conducting ceramic, has a moderate penetration depth of approximately 10 cm at room temperature. And, depending upon the purity of the SiC, the depth of penetration can be less then 2 cm at room temperature. At elevated temperatures, silicon carbide becomes more conductive, thus having an even lower penetration depth. If one assumes that the granules in U.S. Pat. No. 4,718,358 are spherical, then the 10 mm spheres of the SiC would most likely pack inside the cylindrical cavity in what is known as the close-packed cubic structure. The close-packed cubic SiC structure would have a void volume of only 26%. The largest void space in this granular pack of 10 mm SiC spheres in the close-packed cubic structure would be occupied by what is known as an octahedral site. The octahedral site is the void space between six spheres—four spheres touching in one plane, one on the top of and one on the bottom of the void space formed between the four-spheres touching in one plane. The void diameter of the octahedral site at the largest diameter would be about 6 mm. With an open space of the 6 mm in width and the device in U.S. Pat. No. 4,718,358 operating at approximately 900° C., where the dielectric conductivity of SiC is greatly increased in comparison to the dielectric conductivity at room temperature, one can question the ability of the microwave energy at 2.45 GHz and wavelength of approximately 13 cm to propagate through the close-pack cubic structure of the SiC granules and heat a volume of SiC with a depth of the particles being between 100 mm to 300 mm. Does the packed SiC spheres at the operating temperature of 900° C. act as a collection of small waveguides that have dimensions below the cut off frequency for the applied electromagnetic radiation? If so, the susceptor's structure will not allow for the applied energy to penetrate into the entire volume of SiC granules. This type of structure would shield electromagnetic energy as exemplified in common practice by windows of household microwave cooking ovens. Or, does the packing of SiC spheres at an operating temperature of 900° C. have a finite depth of penetration that neither allows for the volumetric heating of the entire mass of SiC granules nor has electromagnetic energy throughout the volume of the SiC mass to interact with gaseous species for possible enhanced reactions? This latter argument for a finite depth of penetration in this susceptor arrangement would most likely heat a finite volume of SiC granules near the surface of the incident applied radiation, then heat would be thermally conducted through the SiC to the remaining volume of SiC granules since SiC is a very thermally conductive material. One could argue that a greater power level of applied electromagnetic energy could be incident on the SiC granules in an attempt to heat the entire volume, however depth of penetration can become less at increased levels of applied power. The greater power level will cause the depth of penetration to migrate to the surface where the applied electromagnetic energy is initially incident upon, when the SiC material becomes more conductive at elevated temperature. The increased conductivity can cause the material to become reflective to the applied energy.

Other suscepting structures such as honeycombs, foams and woven structures can have similar concerns about the depth of penetrations as mentioned above. These structures, when made of semiconducting, conducting, ferromagnetic, ferrimagnetic, ferroelectric and anitferroelectric materials, can have shallow depths of penetration. Graphite, carbon black, magnetite ($Fe_3O_4$), $MnO_2$ are materials that have depths of penetration less than 1 mm at room temperature. When suscepting structures, such as honeycombs, foams and weaves are coated with these material, the structures either will have shallow penetration depths or will act as waveguides that have dimensions that are below the cutoff frequency regardless of a) the bulk material or materials that makes up the substrate for the coating and b) the design of the susceptor's structure. Consequently, a susceptor must be properly designs for volumetric interaction with the electromagnetic energy, taking into consideration the materials of construction, the structure and the effects of coatings.

BRIEF SUMMARY OF INVENTION

This present invention, in its broadest sense, is an improved design that will produce a more homogeneous distribution of energy by 1) the design of the cavity geometry, 2) the location of the applied energy sources, and 3) the depth of penetration of the susceptor. The more homogeneous distribution of energy in the susceptor will provide for the invention to have the applied electromagnetic energy distributed volumetrically to a) produce heat, b) be present for interaction with chemical species for destruction of pollutants and to promote chemical reaction throughout the susceptor, c) to produce fluorescent radiation, and d) to produce thermoluminescent radiation.

The cavity geometry can use polygons that have a cross-section that is irregular shaped, having four (4) or more sides, and preferably a rectangle where the cross-sectional area of the rectangle is perpendicular to the direction of flow of the gas stream. The preferred rectangle shape has the location of the applied energy source on opposing faces of the longest parallel sides. The shortest distance of the irregular-shaped rectangular cross-section is referred to as the width. The width is designed to promote a homogenous distribution of energy by design. This design is based upon the depth of penetration of the susceptor by the applied electromagnetic energy. The depth of penetration of the susceptor is used instead of the depth of penetration of a material because the susceptor includes the void fraction, the material, materials or composite materials of construction and the susceptor's structure. The depth of penetration of the susceptor is defined similar to the depth of penetration for a material as mentioned earlier as a value of 1/e. The value of 1/e is equivalent to 67% of the energy being absorbed or scattered.

The cavity geometry together with the location of the applied energy sources and depth of penetration of the susceptor play an important role in the device. Since the energy sources are located on opposing faces of the irregular-shaped rectangle, the distance of one half the width, being the distance from the center of the cross-sectional area to the side of the cavity where the applied energy source is located, is defined in this invention as the width of interaction. The width of interaction is similar to the depth of penetration. The width of interaction is used to bisect the susceptor in half to define the depth of penetration of the susceptor upon the half width of the cavity and the susceptor's surface closest to the location of the applied energy sources as described above. The width of interaction is used to describe the amount of energy that is available for interaction within the susceptor to produce methods that promote chemical reaction and destruction of pollutants, whereas commonly the depth of penetration of electromagnetic energy describes the about of power attenuated in material. Attenuation can result in a material by a) absorption of energy to produce heat or b) reflection of the applied energy. In this invention, the penetration depth of the susceptor can be use to provide for the destruction of pollutants or reaction of gases by either 1) a method that primarily produces heat for thermal treatment, 2) a method that primarily uses the applied electromagnetic energy for interaction with gaseous/particulate species for chemical reaction or destruction of pollutants, 3) a method that produces fluorescent radiation, 4) a method that produces thermoluminescent radiation, 5) a method that produces scattering of the applied electromagnetic energy for concentrating the applied energy, or 6) a combination of these five methods. The combination of the methods would be best suited for the purpose at hand. The following examples demonstrate these primary methods:

Example One

If thermal treatment is needed as the primary method for chemical reaction or destruction of pollutants, then adsorption of electromagnetic energy by the susceptor is needed to produce heat in the range for thermal incineration (600–1000° C.) or for catalytic treatment (300–600° C.). To produce volumetric heating in the susceptor by the applied electromagnetic energy at the operating temperature, then the applied energy must penetrate the entire width of interaction inside the cavity at the operating temperature. Therefore, the electromagnetic energy must be absorbed by the susceptor, and the depth of penetration of the susceptor at the operating temperature must allow for the applied electromagnetic energy to volumetrically heat the width of interaction. For thermal treatment as the primary method, where the shape of the cavity for this device is an irregular-shaped polygon and the location of the source of the applied electromagnetic energy is as mentioned above, the depth of penetration of the susceptor should be approximately equivalent to one-third the entire width of susceptor. The depth of penetration of the susceptor being approximately ⅓ the width of the susceptor allows for approximately 50% of the total energy in the cavity from the sources of applied energy, which is located at opposing faces, to be present in the width of interaction and to be absorbed by the susceptor's material or materials of construction.

Example Two

If interaction of electromagnetic energy with the gaseous species is the primary method for treatment of the gases for chemical reaction or destruction of the pollutants, then to produce volumetric interaction of electromagnetic energy with the gaseous species the applied energy must penetrate the width of interaction inside the cavity at the operating temperature. Therefore, the electromagnetic energy must be able to penetrate the susceptor, and the depth of penetration of the susceptor at the operating temperature must allow for the applied electromagnetic energy to volumetrically interact with the gaseous or particulate species for treatment in the width of interaction. In this method a susceptor may be used to produce turbulence so the gases can mix for better conversion of reactant species to product species.

For volumetric interaction of electromagnetic energy with the gaseous species, where the shape of the cavity for this device is an irregular-shaped polygon and the location of the source of the applied electromagnetic energy is as mentioned above, the depth of penetration of the susceptor is not as important for this method unless the susceptor was designed to scatter the applied electromagnetic energy. The depth of the penetration of the susceptor would be designed from a material or materials that are primarily transparent to the applied electromagnetic energy in order to maximize the amount of applied energy to be present to drive the reaction. Additionally, the susceptors could use field-concentrators to increase the strength of the electromagnetic energy (the use of field-concentrators will be disclosed later in this section). The depth of penetration of the susceptor for this method for either reacting gases or destroying pollutants would be greater than the entire width of the susceptor and allow for approximately 50% of the total energy in the cavity from the sources of applied energy, which is located at opposing faces, to be present in the width of interaction for interaction between the applied energy and gaseous/particulate species. However, if scattering the applied energy is the desired for this method of treatment, then the depth of penetration should be about ⅓ the width of the susceptor.

Example Three

If a combination of treatment methods is needed as the best method for either chemical reaction or destruction of pollutants, then adsorption, transmission, reflection and scattering of electromagnetic energy or energies by the susceptor may be required. Absorption of the applied electromagnetic energy in the susceptor either could produce heat, or could produce fluorescent radiation emissions, thermoluminescent radiation emissions or assist in producing fluorescent radiation. For example, an applied ultraviolet (UV) energy source can be used to produce phosphorescent radiation in a susceptor or at a field concentrator for interaction between the phosphorescent radiation and the gaseous/particulate species to drive the reaction. The applied UV energy can also interact with the gaseous/particulate species. Such a material for the susceptor or field concentrator could be a phosphorescent material.

The depth of penetration of susceptor must allow for applied UV energy to penetrate the susceptor for volumetric interaction a) with the susceptor to produce fluorescent radiation and/or b) directly between the applied UV energy and gaseous/particulate species. Consequently, if UV and microwave energies are applied to the same susceptor, other interactions may occur between the applied energies, material of construction of the susceptor, field concentrators and the gaseous species (or particulate). The UV energy that is applied to the cavity can interact as previously mentioned, however the microwave energy a) may produce thermoluminescence in the phosphorescent materials b) may produce heat in the susceptor by the applied microwave energy and/or c) may enhance the phosphorescent radiation produce primarily by the applied UV energy. Of other consequence, if the applied energy to the same susceptor is only microwave energy then other interactions may occur. The microwave energy either a) may be completely absorbed for thermal treatment of the gases, b) may be partially absorbed and interact with the gaseous species for interaction, c) may be used to heat the susceptor and produce thermophosphorescence of UV radiation, which interacts with the gaseous species, or d) a combination of the mentioned interactions in a, b, and c.

This example, example three, demonstrates the potential complexity of the interaction of the applied electromagnetic energy, fluorescent radiation and thermoluminescent radiation with the susceptor's material of construction and the susceptor's construction. As previously mentioned in the Background section, the material or materials of construction as well as the structure of the susceptor will influence the ability of the applied electromagnetic energy or energies to penetrate and interact with the susceptor a) to produce heat, b) to be present for interaction with the gaseous/particulate species, c) to produce fluorescence, and d) to produce thermoluminescence. Likewise, the ability of fluorescent and thermoluminescent radiation to penetrate finite distances within the susceptor's structure and interact with the gaseous/particulate species in the air stream for chemical reaction or destruction of pollutants could be of importance to the design of the susceptor. Fluorescent radiation could be phosphorescence, incandescence or fields generated by thermionic emissions or thermoelectricity emissions.

In example three, the transmission of, absorption of, reflectivity of and scattering of each wavelength of energy that is present in the susceptor becomes important. Instead of the susceptor being constructed of a material, the susceptor may better be constructed of more than one material, which will allow for the wavelength or wavelengths of the applied electromagnetic energy or energies to penetrate and volumetrically interact with the susceptor. And the construction and design of the susceptor and the susceptor's materials of construction will have to be chosen to prevent the design of the susceptor's structure from shielding the wavelength or wavelengths of the applied electromagnetic energy and energies. And also, transmission, absorption, reflectivity and scattering properties of the susceptor will be effected by the bulk density of the materials of construction, as well as the porosity size, pore structure and amount porosity in the materials of construction.

This invention, in its broadest sense, is an improved design which uses cavity geometry that has a cross-section, which is perpendicular to the flow of the gas stream, and is shaped as an irregular shape, having four (4) or more sides, preferably a rectangle. The preferred rectangle shape has the location of the applied energy source on opposing faces of the longest parallel sides of the cross-section area perpendicular to the flow of the gas stream. The location of the applied energy source and the geometry of the cavity and susceptor does not allow for the optical properties of the device to concentrate energy, thus simplifying the design of a susceptor for interaction with the applied electromagnetic energy and producing a more homogeneous distribution of electromagnetic energy in the cavity.

When the susceptor is designed for a specific method a treatment of the gas stream, the design will be only be dictated by the depth of penetration of the susceptor which is dependent upon the chosen width of interaction of the susceptor, since energy is not concentrated. Therefore, once a method for treatment of the gas stream is chosen, once an amount of power of the applied electromagnetic energy or energies is chosen and once a width of interaction is decided upon to reduce the static-pressure in the device, the susceptor's materials of construction and susceptor's structure can remain constant when the device is to be scaled for larger flow rates and larger exhaust duct width in commercial and industrial applications. To accommodate larger flow rates or larger exhaust duct widths, only the length of the cross-sectional area of the irregular-shaped polygon where the energy source or sources are located can simply be elongated. Unlike cylindrical cavities, the absorption properties of the susceptor's material or material of construction do not have be changed to accommodate greater flow rates and larger duct widths of commercial and industrial process for volumetric heating or interaction of the applied energy with the gases inside the device susceptor.

With the design of the device in this invention, proper thermal treatment of the pollutants can be achieved. Since this design simplifies the susceptor for producing heat at a wide variety of flow rates and duct widths, one can readily design devices for proper thermal treatment of gases by selecting an operating temperature and by sizing a length of a hot zone for the required residence time at the operating temperature and turbulence in the susceptor. Thermal insulation around the susceptor may be needed to prevent heat losses. Material that is transparent to the applied electromagnetic energy or energies and that uses an aerogel structure would be best suited for thermal insulation. An aerogel is a structure that has over 96% porosity and a bulk density of 4%. The hot zone's length would be designed in the coaxial direction of flow of the air stream where the direction is the defined breadth of the device.

In this broadest sense of the invention, the cavity's geometrical cross-sectional area perpendicular to the flow of the air stream and the susceptor's width of interaction is designed to provide in this device a more homogenous distribution of energy with a given amount of applied power. With the more homogeneous distribution of energy, the invention allows for one to design a method for specific treatment of gaseous and particulate species, compared to designing treatment methods with devices that have geometries that concentrate electromagnetic energy such as a cylinder. With this invention, the depth of penetration of the susceptor by the applied electromagnetic energy or energy allows one to design methods of destroying pollution and reacting gases/particulate species. When the depth of the penetration of the susceptor is one third ($\frac{1}{3}$) the width of the susceptor's total width or greater, the method of treatment of gases/particulate can be either 1) primarily thermal, 2) a combination of thermal, fluorescent, thermoluminescent, and interaction between the applied energy or energies and the gas or particulate in the air stream, or 3) when scattering of the applied energy is used to concentrate the applied energy without producing substantial heating of susceptor, such as with a low loss, low dielectric constant susceptor constructed with metallic spheres and fused silica, the device can primary treat by interaction between the applied energy or energies and the gas or particulate in the air stream:

The design is improved over the prior art because the prior art used cylindrical geometries. Cylindrical geometries tend to concentrate energy in a susceptor. Concentrated energy can lead to several problems when operating the device. One concern is the concentrated energy promotes conditions that lead to thermal runaway. The runaway can cause the susceptor's material or materials to melt, creating a pool of liquid material in the susceptor. Another concern is that the concentrated energy will not allow the applied energy to volumetric heat a susceptor. Such concentration will require the absorbing properties of the susceptor's material of construction to be graded to counteract the concentration, however this may not help. Also, susceptors in cylindrical cavities are more difficult to scale up to greater flow rates and duct widths because of the absorption properties. Another concern is that the concentrated energy can lead to deleterious reaction between composite materials and coatings on substrates. The deleterious reaction can cause the materials to melt at eutectic temperature, cause an article to become friable and alter the interaction between the applied electromagnetic material and the susceptor, changing the properties for subsequent use.

Another aspect of this invention is a heat transfer process to increase the efficiency of such devices, which treat gases for chemical reaction, or destruction of pollutants. Commercially available magnetrons are generally between 65–70% efficient. Therefore 30–35% of the energy that is initially put into the system is lost. An aspect of this invention is a heat transfer process for using that energy.

In this heat transfer process, heat is transferred between heat energy that is produced by the tube or tubes which supplies the applied electromagnetic energy and an input chemical species flow that can contain gases and particulate species. The process uses the heat from the tubes or tubes to preheat the input chemical species flow, or part of the input chemical species flow, prior to it entering the device. This heat transfer process for preheating the input chemical species flow will decrease the cost of operating such a device. The heat from the tube, or tubes, can be exchanged with the input chemical species flow by such cooling fins that are found on commercial magnetrons, heat pipes, thermoelectric devices, or cooling systems that circulate a fluid around the tube and release the heat at radiator. After the input chemical species flow is preheated with heat from the tube, the input chemical species flow can be further heated by heat transfer either a) from the cavity walls, b) from a conventional heat exchanger (a recuperator) that is located after the exit end of the device, or c) from both the cavity walls and a conventional recuperator.

Another aspect of this invention is a susceptor design that is described in this invention as a gas-permeable macroscopic artificial dielectric. The gas-permeable macroscopic artificial dielectric susceptor device can be a honeycomb structure, foam, or woven fabric filter with a pattern, or a structure consisting of discrete susceptors. The macroscopic artificial dielectric susceptor can be designed a) for a specific cavity geometry, b) for a specific depth of penetration of applied and subsequent radiation produced from the applied radiation, c) to be temperature self-limiting, or d) to produce, in the macroscopic artificial dielectric susceptor, a desired ratio of a self-limited temperature to power concentration of applied electromagnetic energy at one or more frequencies.

This aspect of the invention distinguishes the term artificial dielectric by using an artificial dielectric material and a macroscopic artificial dielectric susceptor. An artificial dielectric material is used to describe the case where an article is constructed of composite material consisting of two or more materials each with different dielectric properties, where one material is the matrix and the other material is or other materials are embedded in the matrix without substantial chemical reaction between the matrix and the embedded in materials. A macroscopic artificial dielectric susceptor is used to describe a susceptor that is either a) an article constructed of a material where the article has a coating applied in a specific pattern to create an artificial dielectric structure from the coating and the article, b) a woven structure that contains two or more different materials as threads (or yarns) which woven together to form an artificial dielectric structure, or c) a structure that consists of a mixture of discrete suscepting articles where the mixture contains discrete articles that have different dielectric properties and surround each other to form an artificial dielectric structure.

When the susceptor is a gas-permeable macroscopic artificial dielectric structure that is a honeycomb structure constructed of materials, some of the cell walls of the honeycomb can be coated with materials that have different dielectric properties to produce a macroscopic artificial dielectric. The pattern of cells with coated walls are arranged in the honeycomb so that the applied electromagnetic energy and energies penetrate the suscepting structure and either heat the susceptor or scatter the energy for interaction with the gases/particulate in the air stream. The pattern of the cell walls attenuate the applied electromagnetic energy by either a) partially or completely by absorbing the applied energy, producing fluorescent radiation to heat the remaining parts of the susceptor and the air stream or b) partially or completely scattering applied energy to concentrate the applied energy for interaction with the air stream or to heat the remaining volume of the susceptor. Also, a macroscopic artificial dielectric can be made from the honeycomb structure by filling some of the cells with another material. Additionally, a large honeycombed-shaped, macroscopic artificial dielectric structure can be constructed from 1) smaller discrete susceptor articles that are small honeycombed shaped articles that have differing dielectric properties and/or conductivity or 2) smaller discrete susceptor articles that are honeycombed shaped that have the same dielectric property and are cemented together with a material which has different dielectric properties and/or conductivity.

It is understood by one who reads this that the same or similar methods used to create honeycombed-shaped macroscopic artificial dielectrics can be employed to create macroscopic artificial dielectrics out of foams and weaves.

When the macroscopic artificial dielectric susceptor is designed as a device with a structure consisting of discrete susceptors, the susceptor can be designed for complex interaction with the applied energy or energies as previously described in Example Three. Potentially, each discrete susceptor can have separate characteristics for absorption, transmission, scattering and reflection of 1) applied electromagnetic energy or energies, 2) subsequent fluorescent radiation produced from the applied electromagnetic energy or energies, and 3) the subsequent radiation from heat resulting from the dielectric loss within each individual susceptor. The discrete susceptors in this invention are known as unit susceptors. The separate characteristics of absorption, transmission, scattering and reflection of a unit susceptor are effected by the unit susceptor's length, thickness, shape, composite materials structure, material selection, porosity, pore sizes, temperature dependence of the complex dielectric constant and thermal conductivity.

Since macroscopic artificial dielectric susceptors are made from a mixture of unit susceptors, one is capable of designing a variety of susceptor structures. The versatility using unit susceptors will be apparent with the following discussion. Although the optical properties of each unit susceptor within the macroscopic artificial dielectric can be independent, the structure of the macroscopic artificial dielectric susceptor will dictate the interaction of the macroscopic susceptor with the applied electromagnetic energy. The structure of the macroscopic artificial dielectric susceptor will be described with the unit susceptors that are primarily reflective. The reflectivity of the unit susceptors can be produced from either metallic or intermetallic materials species at room temperature or materials such as semiconductors, ferroelectrics, ferromagnetics, antiferroelectrics, and antiferromagnetics that become reflective at elevated temperatures. The materials that produce reflection can be a) homogeneous, b) composite materials having a second phase material in a matrix that is partially absorptive to applied electromagnetic energy where the volume fraction of the second phase materials can be used to control the amount of reflection of a unit susceptor, or c) coatings on a unit susceptor. Also, the length, width and shape of the unit susceptors and the distance between reflective unit susceptors can be controlled by the reflectivity of the gas-permeable macroscopic susceptor.

The shape of the unit susceptor can be designed for reflection. The shape of the unit susceptor can be chiral, spire-like, helical, rod-like, acicular, spherical, ellipsoidal, disc-shaped, needle-like, plate-like, irregular-shaped or the shape of spaghetti twist in Muller's Spaghetti and Creamette brand. The shape of the unit susceptor can be designed to produce turbulence in the air flow, thus providing for mixing of reactants in the gaseous or liquid stream. The shape and size of the susceptor can be used to grade the pore size of the susceptor to accommodate the expansion of gas due to passing through the hot zone.

The temperature dependent materials that are used in unit susceptors can be used to produce a temperature self-limiting macroscopic susceptor as well as to produce in the macroscopic dielectric a desired ratio of a self-limited temperature to power concentration of applied electromagnetic energy at one or more frequencies. The above-mentioned structures can be produced and the desired effects achieved by controlling the volume fraction, size and shape of the unit susceptors and the transmission, reflection, absorption and scattering produced by the materials selection for each unit susceptor.

The macroscopic artificial dielectric susceptor works on the principle of reflection and diffuse reflection, scattering. The reflectivity of the macroscopic artificial dielectric susceptor is controlled by the volume and interconnectivity of the unit susceptors which are the primarily reflective unit susceptors in the macroscopic susceptor. The primarily reflective unit susceptors are defined as being the unit susceptors which are primarily reflective to the applied energy or energies. The gas-permeable artificial dielectric susceptor has the primarily reflective unit susceptors surrounded by unit susceptors that are either primarily transparent or primarily absorptive of the applied energy or energies. As the volume of the primarily reflective unit susceptors increases in the macroscopic susceptor, a degree of interconnectivity of the primarily reflective unit susceptor will occur, forming an interconnective network within the macroscopic artificial susceptor. The degree or amount of interconnectivity will depend on the size and shape of the primarily reflective unit susceptors. The ability of the applied energy or energies to penetrate the macroscopic artificial dielectric susceptor will depend not only on the volume of the primarily reflective unit susceptor but also on the degree and amount of interconnectivity. When the degree of interconnectivity of the primarily reflective unit susceptors throughout the entire gas-permeable macroscopic susceptor is such that maximum distance between the interconnected network of the primarily reflective unit susceptors does not allow for applied energy to penetrate or the longest wavelength of the applied energies to penetrate, the gas-permeable macroscopic susceptor, itself, will become primarily reflective to either a) the applied electromagnetic energy or b) the longest wavelength of the applied energies. In some instances, a high degree of interconnectivity is desired.

A high degree of interconnectivity can be beneficial in some instances. Clusters of primarily reflective unit susceptors can be distributed about the macroscopic artificial susceptor to promote scattering. Primarily reflective unit susceptors can be aggregated to form shapes and boundaries that reflect one or more wavelengths of the applied energy or energies. The volume fraction and interconnectivity of the reflective unit susceptors surrounding primarily absorbing or primarily transparent unit susceptors can be used to design specific macroscopic artificial dielectric structures a) for resonant cavities with that are based upon the wavelength of the applied energy in the susceptor, b) for scattering energy for interaction with gas or particulate species, c) that concentrate energy at field concentrators which are located on other unit susceptors, d) that concentrate energy within the susceptor for increased reactivity between the gas stream and the fluorescent radiation, e) that have the primarily reflective unit susceptors arranged in such a manner to produce a large spiral, helical or other shape with the macroscopic susceptor, f) that act as shielding to prevent the applied electromagnetic from entering material inside the cavity for thermal insulation, g) that prevent leakage outside the cavity by the applied energy, h) that reflect applied energy to other regions of the artificial dielectric to provide either higher temperatures or increased energy for reaction or destruction of gaseous/particulate species and i) possibly, that regulate the temperature of the gas-stream.

The several benefits and advantages of this invention compared to devices of prior art will become apparent to one skilled in the art who reads and understands the following examples of this invention's empirical results. Table 1 contains data from several gas-permeable macroscopic artificial dielectrics susceptors that were exposed to applied electromagnetic energy of a frequency of 2.45 Ghz in this invention's cavity as described as having a rectangular cross-sectional area perpendicular to the direction of the gas stream's flow. The location of the applied energy's source was as mentioned previously. Each of the following examples of the gas-permeable, macroscopic artificial dielectric susceptor uses unit susceptors.

A type-K thermocouple was inserted into the cavity after the time shown. Prior to inserting the thermocouple, all power to the magnetrons was turned off. In these examples, the unit susceptors that are designated as an aluminosilicate (AS) ceramic were made from an 85/15 weight percent mixture of EPK Kaolin/KT Ball Clay. The unit susceptors that are made of artificial dielectric materials have an aluminosilicate matrix made from an 85/15 weight percent mixture of EPK Kaolin/KT Ball Clay. The composition of the unit susceptors that are made from artificial dielectric materials are designate by AS—(volume percent of second phase materials), i.e. AS-12 SiC. The particle size of each second phase material was less then −325 US mesh size. The time to produce a visible glow—that is, red heat—was observed visually. All examples were separate tests.

The gas permeable macroscopic artificial dielectric susceptor was exposed to approximately 12.6 KW of power from 16 800 watt magnetrons. The dimensions of the cross-sectional area perpendicular to direction of flow were 7 inches in width and 14 inches in length. The breadth of the cavity was 22 inches. Eight magnetrons were located on each side of the opposite sides of the largest parallel side of the cross-sectional area. On each side, the eight magnetrons were grouped in pairs, and the four pairs were group one after another along the breadth of the cavity. In these examples from experimental results, all unit susceptors are shaped as spaghetti twists (rotini). The spaghetti twists produce a large amount of free volume within the macroscopic artificial dielectric susceptor, over 70% free volume.

The result of experiments in these examples show the uniqueness of this invention, and the implications of these results that show several advantages over the prior art will become clear to the reader after understanding the discussion of the results.

Discussion 1: When the results of Examples 4 and 5 are compared, one finds that the greater volume percentage of SiC, which makes an artificial dielectric material within the unit susceptors, decreases the time to show a red glow and increases the temperature after one hour. The macroscopic susceptor of Example 4 is constructed of only unit susceptors that have a composition of an aluminosilicate ceramic matrix containing 6 vol. % −325 mesh SiC, required 51 minutes to show a red glow and after one hour had a center temperature of 803° C., whereas the macroscopic susceptor of Example 5 is constructed of only unit susceptors that have a composition of an aluminosilicate ceramic matrix containing 12 vol. % −325 mesh SiC, required 27 minutes to show a red glow and after one hour had a center temperature of 858° C. In comparing Example 4 with Example 5, one finds that a greater percentage of SiC in the macroscopic susceptor produced a faster heating rate and a higher temperature the macroscopic susceptor.

TABLE 1

| Example | Weight % of each unit susceptor type in macroscopic susceptor | Time to show a red glow in the device | Temp. after one hour | Comments |
|---|---|---|---|---|
| 4 | 100% AS - 6 SiC | 51 min | 803° C. | |
| 5 | 100% AS - 12 SiC | 27 min | 858° C. | |
| 6 | 100% AS | 29 min | >1260° C. | susceptor's temperature exceed the limit of the type-K thermocouple |
| 7 | 50% AS<br>50% AS - 12 SiC | 36 min | 1006° C. | |
| 8 | 50% AS<br>50% AS - 12 SiC | 39 min | 1008° C. | temperature after 3 hours |
| 9 | 50% AS<br>50% AS - 12 SiC | 32 min | 1006° C. | temperature after 4 hours and 30 minutes |
| 10 | 56% AS<br>23% AS - $30Cr_2O_3$<br>12% AS - 30 Chromate<br>6% AS - $30Fe_2O_3$ and Chromate<br>3% AS - $30Fe_2O_3$ | 6 min | 1142° C. | |
| 11 | 18% AS - 30 Chromate<br>19% AS - 30 $Cr_2O_3$<br>32% AS - $30Fe_2O_3/30Cr_2O_3$<br>9% AS - 30 Chromate/$30Fe_2O_3$ | <2 min, then the glow disappeared. | had to shut down after 30 minutes. | 2 of the 16 magnetron tubes melted from the back reflection off the gas permeable macroscopic susceptor. Here |

TABLE 1-continued

| Example | Weight % of each unit susceptor type in macroscopic susceptor | Time to show a red glow in the device | Temp. after one hour | Comments |
|---------|---|---|---|---|
| | 3% AS - 30Fe$_2$O$_3$<br>19% AS - 30CaTiO$_3$ | | | the large volume and high degree of interconnectivity produced a very reflective macroscopic susceptor. |

Discussion 2: When the results of Examples 5 and 6 are compared, one finds that the greater volume percentage of SiC, which makes an artificial dielectric material within the unit susceptors, does not greatly effect the time to show a red glow and decreases the temperature after one hour when compared to unit susceptors that are just made from the aluminosilicate ceramic matrix material. The macroscopic susceptor of Example 6 is constructed of only unit susceptors that have a composition of an aluminosilicate ceramic matrix containing 12 vol. % −325 mesh SiC, required 27 minutes to show a red glow and after one hour had a center temperature of 858° C., whereas the macroscopic susceptor of Example 6 is constructed of only unit susceptors that have a composition of the aluminosilicate ceramic matrix contain 0 vol. % −325 mesh SiC, required 29 minutes to show a red glow and after one hour had a center temperature that was greater than 1260° C. In comparing Example 5 with Example 6, one finds that the 12 vol. % of SiC in the macroscopic susceptor of Example 5 suppresses the temperature of the macroscopic susceptor as compared to the macroscopic susceptor that was constructed of unit susceptors that are constructed of the aluminosilicate matrix alone.

Comparison between Discussion 1 and Discussion 2: In Discussion 1, the increased volume percentage of SiC in the unit susceptors, which are constructed of an artificial dielectric material, shows that the greater volume of SiC in an artificial dielectric material increased the absorption of the applied electromagnetic energy; the heating rate and temperature after one hour increased. In Discussion 2, the results showed that the macroscopic susceptor without the artificial dielectric material, (AS-vol. % SiC), had a) about the same heating rate as the artificial dielectric material with 12 vol. % SiC and b) a higher temperature than the artificial dielectric material with 12 vol. % SiC. One can understand that the greater SiC content in the artificial material in Example 5 compared to Example 4, increases the absorption of macroscopic susceptors.

One can also understand that when one compares Example 5 to Example 6, one finds that the absorption of the applied energy by the unit susceptor, which is made of an artificial dielectric material, suppresses the temperature after one hour. This suppression of the temperature can be due to the reflectivity of the SiC as the temperature of the SiC increases.

Discussion 3: When one compares Example 7 with Example 4, one finds intriguing results. Example 7 uses a macroscopic artificial dielectric susceptor made from a 50/50 mixture of two types of unit susceptors. One type of unit susceptor is the primarily reflective and is constructed of an artificial dielectric material, AS-12 SiC, the material used in Example 5. The other type of unit susceptors is the primarily absorptive unit susceptor material and is constructed of the AS material that was used in Example 6. The 50/50 mixture of the two types of unit susceptors did not produce an interconnective network between the primarily reflective unit susceptors. When one carefully compares the results from Example 4 and Example 7, one finds that the total amount of SiC on the macroscopic susceptor for the unit susceptor that is constructed of the artificial material, AS-6SiC in Example 4 is approximately equal to the total volume of SiC in the macroscopic artificial dielectric susceptor in Example 7. In Example 7, the 50/50 mixture of the AS unit susceptors and the AS-12 vol. % unit susceptors produces approximately the same volume of SiC in the macroscopic susceptor as Example 4. However, Example 7 has faster time to show a red glow then Example 4 and a higher temperature after one hour (1006° C.). Absorption by the total volume of SiC in the macroscopic susceptor cannot be fully responsible for the results in Example 7. It is the structure, the macroscopic artificial dielectric susceptor, that is responsible for the increased time to show a red glow and a higher temperature after one hour (1006° C.). Therefore, the structure of the macroscopic artificial dielectric susceptor that contains the primarily reflective unit susceptors that are mixed with the primarily absorptive susceptors, must be having the primarily reflective unit susceptors reflecting, or scattering the applied energy and the scattered (reflected) energy is being absorbed by the primarily absorptive unit susceptors. The primarily reflective unit susceptors are concentrating the energy within the macroscopic artificial dielectric susceptor.

Discussion 4: When one compares the results from Examples 7, 8 and 9, one finds that the macroscopic artificial dielectric structure can produce a self-limiting temperature, and since it can produce a self-limiting temperature, the gas-permeable macroscopic artificial dielectric structure should allow one to design macroscopic artificial dielectric structures to a desired self-limiting temperature to power concentration of applied energy or energies to heat gases, treat pollutants in a gas stream and to react chemical species in a gas stream.

Discussion 5: The results of Example 10 show an effect one finds when the gas-permeable macroscopic artificial dielectric susceptor is constructed of primarily reflective unit susceptors which are made from an artificial dielectric material that contains a greater volume percentage of semiconducting and materials with a Curie temperature. The primary reflective unit susceptors were constructed of an artificial dielectric containing 30 vol. % of −325 mesh materials that were either Cr$_2$O$_3$, Fe$_2$O$_3$, chromate or a mixture containing two of the three materials. The matrix of the artificial dielectric material was the AS materials. The gas-permeable artificial dielectric that was constructed from these primarily reflective unit susceptors had a very fast time to show a red glow and a high temperature (1142° C.). Example 10 shows that the amount of reflection of the primarily reflective susceptors influences the heat rate of, temperature of and energy concentration within the macroscopic artificial dielectric susceptor. One can understand that the amount of reflection also should allow one to design macroscopic artificial dielectric structures to a desired self-limiting temperature to power concentration of applied energy or energies to heat gases, treat pollutants in a gas stream and to react chemical species in a gas stream as well as will increase the energy concentration within the artificial dielectric susceptor.

Discussion 6: Example 11 exemplifies what happens when the volume fraction and the interconnectivity of the primarily unit reflective susceptors become too great. At first one sees that a very fast time to show a red glow red is present, then the glow disappears. What has happened in this example is that the temperature of the primarily reflective unit susceptors increased by absorbing the applied energy, and then the increased temperature caused the primarily reflective unit susceptors either to have Curie temperature to be exceeded, to have greater reflectivity or both in the unit susceptors' materials of construction. With the increase reflectivity, Curie temperature exceeded, high volume fraction of the primarily reflective unit susceptor and extremely high degree of interconnectivity of the primarily reflective unit susceptors, the macroscopic artificial dielectric susceptor became reflective and did not allow for the applied energy to volumetrically interact with the macroscopic artificial dielectric susceptor. The back reflection from the macroscopic artificial dielectric susceptor destroyed two microwave tubes.

Of importance is the structure of a macroscopic artificial dielectric susceptor. The structure should allow for applied electromagnetic energy to penetrate the distance between the primarily reflective components, whether a discrete susceptor, coating or woven structure so the structure does not act as a collection of waveguides with cut-off frequencies that prevent the applied energy from penetrating the width of interaction.

Another aspect of this invention is the use of the structure of the macroscopic artificial dielectric susceptor for adsorption, regeneration and desorption of gaseous reactants or pollutants. The structure can be used with such devices known in the field of pollution control as rotary concentrators or other devices that use adsorption in a process to treat to pollutants. Typically in such devices, a zeolite material or activated carbon is used to adsorb gaseous species. Other forms of carbon also can be used. The penetration depth of carbon in the form of an article tends to be about one micron, and in loose powder, the penetration depth can be 3 mm. Zeolite materials, depending upon their doping, have much greater penetration depths.

A macroscopic artificial dielectric susceptor can be made from a mixture of unit susceptors. The mixture would contain unit susceptors made with activated carbon and unit susceptors made with zeolites. Also, unit susceptors can be made from either a) artificial dielectric materials having a zeolite as the matrix and a carbon species as the second phase, b) artificial dielectric materials having a carbon species as the matrix and zeolite species as the second phase, or c) unit susceptors that are coated with a carbon species, preferably activated carbon. As in the keeping with the aspects of this invention, the structure of a macroscopic artificial dielectric susceptor should allow for applied electromagnetic energy to penetrate the distance between the primarily reflective components, whether a discrete susceptor, coating or woven structure so that the structure does not act as a collection of waveguides with cut-off frequencies that prevent the applied energy from penetrating the width of interaction.

Another aspect of this invention is the use of semiconducting metals and ceramics, ionic-conducting ceramics, ferromagnetic, ferrimagnetic, ferroelectric and antiferroelectric materials for their reflective characteristics of the applied electromagnetic energy. These types of materials tends to be primarily absorbing materials as articles or large particles (particle sizes greater than 250 microns), however when the particle size of these types of materials are 50 microns or less these semi-conducing materials greatly absorb the applied energy, especially wavelengths in the microwave region, and reach very high temperatures, becoming very conductive. When these materials become very conductive at high temperatures, they become very reflective. Reflective behavior from the small particle-size SiC in the unit susceptors that were constructed of artificial dielectric materials, not the volume fraction of the SiC, is the only way to explain the different behavior between Example 4, Example 5 and Example 7. In this invention, SiC is used as a high temperature reflector.

The conductivity of these types of materials as well as other ceramic materials, mentioned above can be controlled by cation and anion substitution on the lattice structure of the materials. Typically, the amount of substitution of cation or anion on a lattice structure of a material would be less than 15 mole percent.

The absorption, transmission, reflection, scattering and the complex dielectric constant of unit susceptors can be controlled by using composite materials. These composite materials are artificial dielectrics, layered or coated composites, having a matrix material containing a second phase or third phase which have a particle diameter less than −325 US mesh size. The composite materials for unit susceptors can use combination of materials in such a fashion where the matrix is a) a metal forming a cermet, b) polymeric organic materials, c) a polycrystalline ceramic, d) a glass/ceramic material, and e) intermetallic. Materials for the matrix, substrate for a coated unit susceptor or entire unit susceptor include a) aluminosilicates and silica derived from clays or mixture of clays, b) alumina, c) MgO, d) stabilized and partially stabilized zirconia, e) magnesium silicates and silica derived from talcs, f) enstatite, g) forsterite, h) steatite, i) porcelain ceramics, j) cordierite, k) fused silica, l) stainless steel, and m) cast iron. The second phase materials can be 1) a thermoluminescent material, 2) a phosphorescent material, 3) an incandescent material, 4) ferroelectric, 5) ferromagnetic, 6) ferrimagnetic, 7) $MnO_2$, 8) $TiO_2$, 9) CuO, 10) NiO, 11) $Fe_2O_3$, 12) $Cr_2O_3$, 13) $Li_2O$ doped $MnO_2$, 14) $Li_2O$ doped CuO, 15) $Li_2O$ doped NiO, 16) CuO—$MnO_2$—$Li_2O$ complex, 17) CuO—$MnO_2$, 18) silicide, 19) borides, 20) aluminides, 21) nitrides, 22) carbides, 23) ceramic glazes with metal particles, and 24) ceramic glazes with semi-conducting particles. The shape of the second phase materials can be chiral, spire-like, helical, rod-like, acicular, spherical, ellipsoidal, disc-shaped, irregular-shape, plate-like or needle-like.

Another aspect of this invention is a conceptual design of the structure of a unit susceptor's artificial dielectric material that increases the chemical compatibility between the matrix and second phase material. The size of the second phase material can be used to control the chemical compatibility between the matrix and the second phase material. Larger particle sizes of the second phase material will make the second phase materials more compatible with the matrix. In this invention, where the second phase material has questionable compatibility with the matrix the second phase material is to have a particle size between 200 microns and 4 mm. Chemical incompatibility can lend to melting or other solid-state reactions at the interface between the matrix and the second phase material. The melting and solid-state reactions can lead to greater absorption, and possible to a situation that leads to thermal runaway in the material.

Another aspect of this invention is the design of unit susceptors that have artificial dielectric materials that have compatible thermal expansions between the matrix and the second phase material. Poor thermal expansion compatibility can lead to friable unit susceptors from thermally cycling the device during operation. The two methods that this device uses are a) materials where the thermal expansion mismatch is less than 15% and b) the matrix and the second phase material has the same lattice structure and principle composition, but the lattice structure of the second phase material is doped with a cation or an anion to change the electrical resistance of the second phase material in the artificial dielectric material. Using the spinel structure as examples, the matrix material can be $MgAl_2O_4$ and the second phase material would be $(Mg,Fe)Al_2O_4$, and the matrix of $Fe_2O_3$ and the second phase material is $Fe_2O_3$ doped with $TiO_2$. Additionally, the matrix can be AlN and the second phase materials can be AlN doped with $Fe^{+3}$.

The thermal conductivity of the unit susceptor can be controlled for heat transfer. The thermal conductivity can be controlled by either a) porosity of the material of the unit susceptor, b) the composite structure of the unit susceptor, c) high thermally conductive materials such as from high purity nitrides, aluminides, silicides, borides and carbides, d) highly thermally conductive coatings can be used as coating on porous unit susceptors to increase the thermal conductivity at the surface, or e) grading the pore structure by flame polishing the outer surface of the susceptor.

Another aspect of this invention is the use of unit susceptors or coatings on unit susceptors that are sacrificial. The sacrificial susceptors or coatings are used in either in chemical reactions or used to treat pollutants. For example, to eliminate NOx from polluted gas streams, NOx can be reacted with carbon to produce $N_2$ and $CO_2$. In this example carbon is needed as a reactant. Therefore, unit susceptors or coating on unit susceptors could be made with carbon that is sacrificial. After the carbon-containing unit susceptors are used up, the macroscopic artificial dielectric structure can be replenished with the new carbon-containing susceptors. The form of carbon can be activated carbon, carbon black, soot, pitch, or graphite.

Another aspect of this invention is the use of field concentrators on the surface of the unit susceptors. The field concentrators concentrate the electromagnetic field locally so a high intensity electromagnetic field is available to interact with gaseous/particulate species to either drive chemical reaction, enhance the reaction between chemical species or to treat pollutants. The field concentrator would be made from either a) conductors, b) semiconductors, c) materials with a Curie point, d) ionic-conducting ceramic, e) composite materials from a and c, f) composite materials from b and c, g) composite materials from a and d, and h) composite materials from b and d. The shape of the composite materials can be chiral, spire-like, helical, rod-like, acicular, spherical, ellipsoidal, disc-shaped, irregular-shape, plate-like, needle-like or have a shape that has sharp-pointed-gear-like teeth. The size of the field concentrators can be one to 10 times the depth of penetration of applied electromagnetic energy of material construction, either at room temperature or the operating temperature. This size difference depends on the chemical compatibility between the field concentrators and the unit susceptor's materials of construction. Where there is little concern for deleterious reaction between the unit susceptor and field concentrator, then the size of the field concentrator, which, based on its depth of penetration of the materials of construction, can be 1 to 10 times the depth penetration at the operating temperature. If there is great concern for deleterious reaction between the unit susceptor and field concentrator, then the size of the field concentrator should be such not to promote reaction, 200 microns to 4 mm.

Additionally, a barrier coating between the field concentrator and the unit susceptor can be present to prevent deleterious chemical reaction between the field concentrator and the unit susceptor. Materials for field concentrators include materials that can be 1) a thermoluminescent material, 2) a phosphorescent material, 3) an incandescent material, 4) ferroelectric, 5) ferromagnetic, 6) ferrimagnetic, 7) $MnO_2$, 8) $TiO_2$, 9) CuO, 10) NiO, 11) $Fe_2O_3$, 12) $Cr_2O_3$, 13) $Li_2O$ doped $MnO_2$, 14) $Li_2O$ doped CuO, 15) $Li_2O$ doped NiO, 16) CuO—$MnO_2$—$Li_2O$ complex, 17) CuO—$MnO_2$, 18) silicide, 19) borides, 20) aluminides, 21) nitrides, 22) carbides, 23) ceramic glazes with metal particles, 24) ceramic glazes with semiconducting particles, 25) materials that produce thermionic emissions, and 26) thermoelectric materials.

Another aspect of this invention is the production of ozone from unit susceptors and field concentrators. When the distance (gap) between two conducting or semiconducting field concentrator becomes close enough to cause a discharge of a spark for the field that is produced by the applied electromagnetic energy, ozone will be produced. The same type of discharge can occur on the surface of unit susceptors that are constructed of an artificial dielectric material. A spark can occur from gap between the exposed surfaces of the second phase material in the artificial dielectric, and ozone can be produced. This can occur at elevated temperature and when the volume fraction of the second phase material exceeds twenty percent (20%). Also, an electric discharge can occur between two unit susceptors that contain field concentrators and the gap between exposed surfaces of second phase material from two unit susceptors.

Another embodiment of this invention is a heat transfer process. The invention embodies the input chemical species flow obtaining heat, or being preheated, prior to entering the device for thermal or other methods of treatment by a heat exchange method that provides heat to the input chemical species flow from heat that is produced from the source for applied energy. The source can be any device that produces the applied energy. Such a device generally operates at low efficiencies and produces heat. This heat transfer process for preheating the input chemical species flow will decrease the cost of operating such a device. The heat from the tube, or tubes, can be exchanged with the input chemical species flow. After the input chemical species flow is preheated with heat from the tube, the input chemical species flow can be further heated by heat transfer either a) from the cavity walls, b) from a conventional heat exchanger (a recuperator) which is located after the exit end of the device, or c) from both the cavity walls and conventional recuperator.

DETAILED DESCRIPTION OF THE PREFERRED EMBODIMENTS

This invention is a device that uses a gas-permeable structure for a susceptor of electromagnetic energy to react gases for desired products or to treat pollutants for producing clean air which can be discharged into the environment in accordance with the law of the land. The device has a specific cavity geometry, location where the applied energy from a source enters the cavity, a susceptor that is designed by the depth of penetration of the susceptor, and a means to scale-up the device for larger flow rates of an air stream without changing the susceptor's interaction with the applied energy or depth of penetration of the susceptor because the device is designed to increase the size of the device by a near linear scale from the location where the applied electromagnetic energy enters the cavity and the cavity's geometry.

Another aspect of this invention is a heat transfer process that increases the efficiency of the device.

Another aspect of this invention is a gas-permeable, macroscopic artificial dielectric susceptor which uses reflection, scattering and concentration of the applied electromagnetic energy which is used a) to react gases for desired products or to treat pollutants for producing clean air which can be discharged into the environment in accordance with the law of the land, b) to regulate the temperature of the air stream, c) to prevent the device from overheating, d) to prevent deleterious reactions between the materials of construction, e) to heat a gas stream, f) to create a device of substantial size for adsorption and regeneration of gaseous species from a mixture of carbon-containing susceptor and zeolite-containing susceptors, and g) to produce a desired ratio of a self-limited temperature to power concentration of applied energy or energies to perform the desired utility.

Another aspect of this invention is the structure of the unit susceptors, which can make up the gas-permeable, macroscopic artificial dielectric susceptor.

Another aspect of this invention is the use of field concentrators on unit susceptors to create local electromagnetic fields by interaction with the applied electromagnetic energy.

The integral parts of the device are the cavity, 1, the inlet opening, 2, which is permeable to gases and particulate and provides a means to prevent applied electromagnetic energy from escaping the cavity, the outlet opening, 3, which is permeable to gases and provides a means to prevent applied electromagnetic energy from escaping the cavity, opening to the cavity, 4, which allows the applied electromagnetic energy to enter the cavity, lenses, 5, which focus or disperse the applied electromagnetic energy in the cavity, and if necessary, provide a gas-tight seal to prevent gases and particulate from escaping the cavity, applied energy, 6, electromagnetic energy sources, 7, waveguides, 8, and susceptor, 9, which is the suscepting region on the device.

Figure 1:
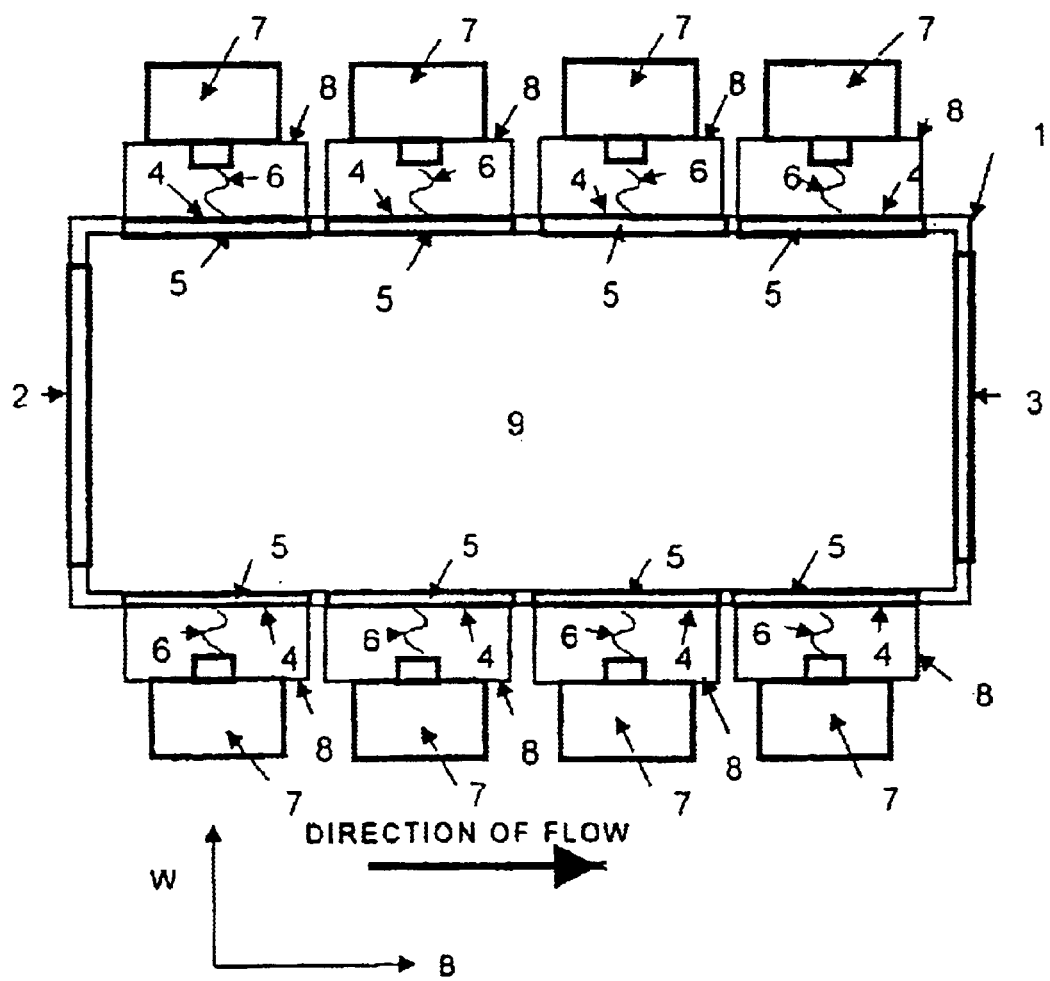
FIG. 1 is a cross-section of the device according to the invention in a longitudinal axial direction of the breadth of the device and width of the device.
Figure 2:
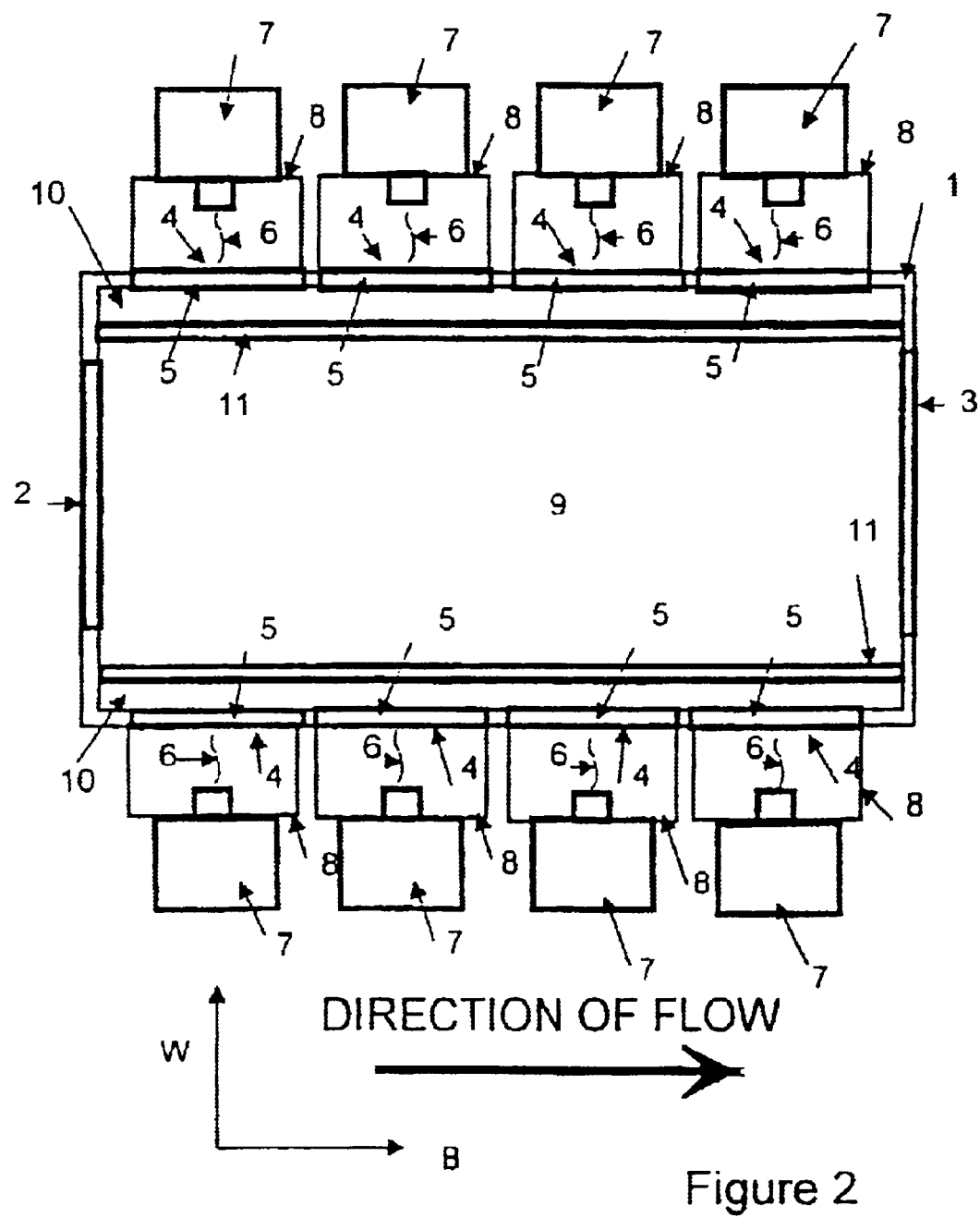
FIG. 2 is the device as in FIG. 1 with thermally insulating layers.
Figure 3:
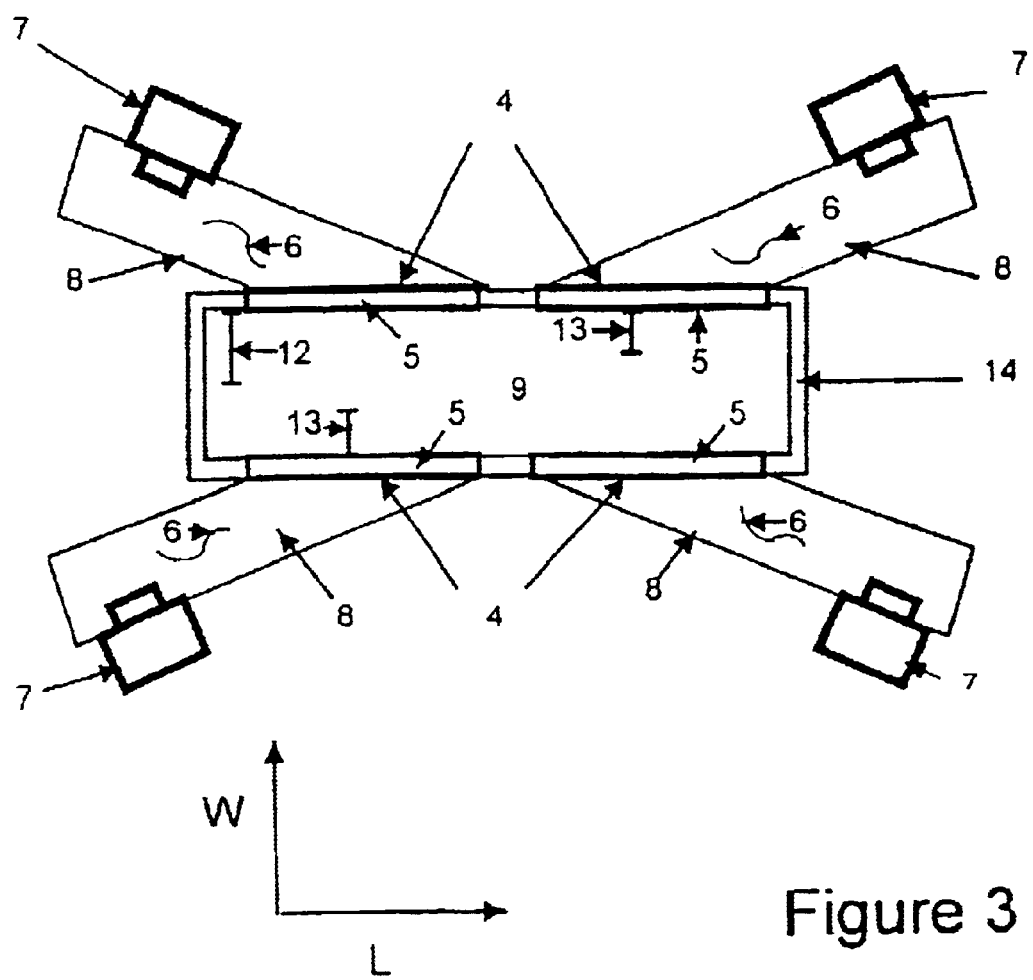
FIG. 3 is a cross-section of the device normal to the direction of Flow with relationship between the susceptor 9 and the depth of penetration of the susceptor 14.

Discussion of FIGS. 1, 2 and 3 illustrates the construction of the device to react gases for desired products or to treat pollutants for producing clean air which can be discharged into the environment in accordance with the law of the land, details the operation for the device and discloses, in its broadest sense, the primary embodiment of this invention.

FIG. 1 is an axial, longitudinal section of the device that is known in this invention as the device breadth. In FIG. 1, the geometric axes of the device are given by arrows marked W for width and B for breadth. The device has a rectangular cavity, 1, having an inlet opening, 2, where reactant gases or pollutants enter the cavity. Inlet opening, 2, is designed to be permeable to reactant gases, pollutants and particulate in the air stream. The reactant gases, pollutants and particulate enter cavity, 1, thought inlet opening, 2, and enter susceptor, 9. As the reactant gases, pollutants and particulate pass through susceptor, 9, either gaseous reactants are converted to products or pollutants and particulates are converted to clean air which can be discharged into the environment in accordance with the law of the land by the necessary treatment means which are produced from the interaction of applied electromagnetic energy, 6, with susceptor, 9. The products and clean air exit cavity, 1, though outlet opening, 3. The interaction between applied energy, 6, and susceptor 9 can provide treatment means either a) by a primarily thermal method having all or a very large amount the applied electromagnetic energy, 6, being absorbed and producing heat in susceptor, 9, b) by a method having the electromagnetic energy primarily interact with the gas reactants, pollutants and particulates without a substantial quantity of applied energy, 6, absorbed by susceptor, 9, producing heat, c) by a method having a combination of methods a and b, or d) by a method where the combined effects of method c and other subsequent fluorescent radiation, thermoluminescent radiation, thermionic emission and thermoelectricity assist in treating the gas reactants, pollutants and particulates.

The method of treatment is determined by the interaction of applied electromagnetic energy, 6, with the material or materials of construction that make-up the susceptor, 9. The applied electromagnetic energy, 6, can be of more than one frequency, UV, IR, visible and microwave. The applied electromagnetic energy, 6, enters cavity, 1, through openings, 4, that are located on opposing sides of the cavity, 1, as shown in FIGS. 1, 2 and 3. The applied electromagnetic energy, 6, is generated from electromagnetic sources, 7, travels down waveguides, 8, and can pass through lenses, 5, which can be located at cavity opening, 4, then interacts with the susceptor, 9. If lenses, 5, are not needed for the operating conditions of the device, then the applied electromagnetic energy, 6, can just enter cavity, 1, through cavity openings 4.

The reactant gases, pollutants and particulates enter through inlet opening, 2, enter susceptor, 9, for treatment. Turbulence can be generated by the structure of susceptor, 9, to provide better mixing. The residence time in the device that is required by a specific treatment method is provided by increasing the breadth of the device, which is inclusive of increasing the breadth of susceptor, 9, and cavity, 1. Additionally energy sources, 7, waveguides, 8, and cavity openings, 4, can be arranged along the breadth of the device to provide the necessary power of applied energy to the susceptor for treatment. Such additionally energy sources, 7, waveguides, 8, and cavity openings on opposing faces can be arranged by anyone skilled in the art to provide the optimum conditions. Electronic methods of controlling applied power and start-up methods can be employed by those skilled in the art without taking away from the embodiment of this invention. This device can be employed in operation in a horizontal position and/or in a vertical position.

FIG. 2 provides the same view as FIG. 1. FIG. 2 illustrates the location of thermal insulation, 10, and a thin thermally insulating barrier, 11, that prevents gases, pollutants and particulates from passing through its boundaries. Thermal insulation, 10, and a thin thermally insulating barrier, 11, surround the perimeter of susceptor, 9, in the direction of the breadth of the susceptor. Thermal insulation, 10, and thin thermally insulating barrier, 11, is constructed of material that is transparent to the applied electromagnetic energy. Material of construction that are transparent to the applied electromagnetic energy can be high purity alumina, aluminosilicate, MgO, steatite, enstatite, fosterite, nitrides, ceramic porcelain, fused silicate and glass in fiber or foam form. The preferred materials structure for thermal insulation, 10, is an aerogel. The thermally insulating layer, 10, and thin thermally insulating barrier, 11, are employed to prevent cavity, 1, and waveguides, 8, and energy sources, 7, from being effected in an adverse manner by heat from treatment methods which can cause unwanted thermal expansion, corrosion and deterioration of electronic.

FIG. 3 is a cross-section of the device that is normal to the direction of gas flow from inlet, 2, to outlet, 3. The directional axes for the discussion of the embodiments of the device are show in FIG. 3 and labeled W for width and L for length. The device in this invention embodies the geometric shape of the cavity's cross-section that is normal to the direction of airflow, 14, in cavity, 1, the location of openings, 4, in cavity, 1, the depth of penetration of the susceptor, 13, and the width of interaction, 12. The geometric shape of the cavity's cross-section that is normal to the direction of flow, 14, is an irregular shaped polygon that has the largest dimension of the two parallel sides as it length. The preferred irregular-polygon has four (4) sides and is a rectangle as shown in FIG. 3. This embodiment is not limit to an irregular-shaped polygon with 4 sides, the irregular-shaped polygon must have a minimum of four (4) sides.

This invention embodies the geometric shape of the susceptor's cross-sectional area that is normal to the direction of flow of susceptor, 9, to have the same geometric shape of the cavity's cross-sectional area that is normal to the direction of flow, 14. This invention embodies the location of the openings, 4, in cavity, 1, to be located on opposing sides of longest parallel direction of the cavity's cross-section that is normal to the direction of flow, 14, which is termed the length of cross-section, 14.

The susceptor, 9, in this invention embodies a design to have volumetric interaction with the electromagnetic energy. Susceptor, 9, is designed to have a depth of penetration of the susceptor, 13, by applied electromagnetic energy, 6, at the operating temperature that can not be less then one-third (⅓) the width of the of susceptor. This embodied design allows for a minimum 50% of the applied electromagnetic energy, 6, to be present in each half volume of the susceptor, 9, where the half volume of the susceptor is defined by the product of the width of interaction, 12, by the length of the susceptor by the breadth of the susceptor. The width of interaction is equal to one-half of the width of the interior dimensions of cavity, 1. The embodied susceptor design allows a) for volumetric interaction between the applied energy, 6, and the susceptor, 9 and b) for volumetric interaction between applied energy, 6, and the reactant gases, pollutants and particulates. The rectangular cavity design does not concentrate energy by the geometry of the rectangular cavity, 1, or the rectangular shape of the susceptor.

Provided that the susceptor is a homogeneous material, the rectangular shape of the susceptor interacts optically with the applied electromagnetic energy, 6, from openings, 4, in cavity, 1, as though the susceptor was a flat lens. On the other hand, if the geometry of the cavity's cross-sectional area normal to the direction of flow and geometry of the susceptor's cross-sectional area normal to the direction of flow was circular and the applied energy enters this type of cavity from openings that were located around the perimeter of the cavity, then applied energy will tend to concentrate in the circular susceptor.

The device, in this invention, embodies the ability to linearly scale the device for gas streams with larger flow rates without having to redesign the depth of penetration of the susceptor, 13. The linear scale is accomplished simply by keeping the widths of susceptor, 9, and of cavity, 1, while extending the lengths of the susceptor, 9, and cavity 1. The depth of penetration of the susceptor, 13, and the width of interaction, 12, will remain constant. One may have to add more energy sources, 7, waveguides, 8, openings, 4, in cavity, 1, along the extended length to provide more power to the cavity, but the cost involved is much less than redesigning the susceptor's properties that interact with the applied electromagnetic energy to provide volumetric interaction between the applied energy and the susceptor's and cavity's new size and geometric structure. Additionally, the cost to treat higher flow rates in the same size cavity as lower flow rates by increasing the power can require the use of costly high power tubes that produce the electromagnetic energy.

Another aspect of the invention, as shown in FIG. 3, is employing waveguides, 8, that intersect the surfaces of the cavity, 1, at oblique angles to produce large openings, 4, in cavity, 1, that allows for the applied electromagnetic energy, 4, to be applied over a larger surface of the susceptor. Also, the use of waveguides, 8, allows for the energy source, 7, to be located away from the cavity to lessen any deleterious interaction between heat and the energy source, 7.

The dimensions of the cavity, 1, can be designed for the frequency of the applied electromagnetic energy and the TE and TM modes of the applied electromagnetic energy. The size of the cavity may be adjusted to accommodate desired TE and TM modes at certain power levels, which produce more uniform heating of the susceptor.

The inlet, 2, and outlet, 3, can prevent the applied electromagnetic energy, 6, from escaping with a perforated article made from a reflective artificial dielectric materials, polarizers that are arranged in a cross-nickels fashion, fermicages, attenuators, or undulating paths.

The thickness of the wall in cavity, 1, is determined by the skin depth of the material for the applied frequency or frequencies. The thickness of the wall is a minimum three (3) skin depths of the material for the applied frequency. When more than one frequency of electromagnetic energy is applied to the cavity, the skin depth of materials is determined by the lowest frequency of radiation.

The materials of construction that are selected for the cavity, 1, is dependent on operating temperatures. The materials can be stainless steels, aluminum, aluminum alloy, nickel, nickel alloy, inconel, tungsten, tungsten alloys, aluminides, silicides, vanadium alloys, ferritic steel, graphite, molybdenum, titanium, titanium alloys, artificial dielectric materials which are design to reflect incident radiation, copper alloys, niobium alloys, chromium alloy, inconel, chromyl, alumel, copper/constantine alloys and other high temperature alloys. For radio frequencies, transparent materials such as alumina porcelains, zircon porcelains, lithia porcelains, high temperature porcelains, glasses, alumina, mullite, fused silica, quartz, forsterite, steatite, cordierite, enstatite, BN, AlN, $Si_3N_4$, oxides and other polymers which exhibit low dielectric and conductive losses at the applied frequencies can be applied.

The applied electromagnetic energy at one or more frequencies can enter the cavity through openings, 4, in the walls adjacent to the macroscopic susceptor or be channeled through the cavity to the macroscopic susceptor from either above, below or passing through transparent thermal insulation adjacent to the side walls. The applied energy can enter through a single or plural openings that either contains inserted bulbs, antenna or tubes, that are either couplers, lenses, slotted waveguide or zigzag slotted waveguides. The applied energy, 6, can be linearly polarized, circularly polarized or polarized by reflection or scattering. Entering radiation from multiple couples can be polarized in such a manner to achieve a better distribution of electromagnetic energy in the cavity.

More than one frequency of electromagnetic energy can be propagated through the openings, 4. For waveguides, 8, the cut-off frequency will determine the frequencies that can propagate through the waveguide.

When lenses, 5, are employed, optical engineering for the lenses can be used to obtain the desired effect. The radius of curvature of the lens or lenses can be adjusted to concentrate or disperse the electromagnetic energy (convergence and divergence of the applied energy). The lens thickness can be adjusted to eliminate or greatly reduce reflection of the energy so that the reflection of the energy back to the radiation source does not damage the source. Coatings on the lenses can be use to reflect selected wavelengths back into the cavity. Materials for lenses, 5, should have high purity (greater than 99% pure) transparent single crystals, polycrystalline and amorphous organic and inorganic materials with low dielectric constants, low dielectric losses such as alumina porcelains, zircon porcelains, lithia porcelains, high temperature porcelains, glasses, alumina, mullite, forsterite, steatite, cordierite, enstatite, BN, AlN, $Si_3N_4$, oxides and other polymers, MgO, fused silica, iodides, bromides, polycarbonate, polypropylene, and quartz. The porosity of the material can be used to scatter the applied energy into the cavity. The porosity would be designed for the applied energy.

Waveguides, 8, can either be horns or rectangular, cylindrical, or parabolic shapes. The best waveguide shape is a rectangle that intercepts the surface of the cavity at oblique angles as shown in FIG. 3. The oblique angle increases cross-sectional area of the opening into the cavity and minimizes the back reflection off the surface of the macroscopic susceptor and/or insulation into the waveguide which would be transmitted back to the radiation source, 7, or diminish the power, 6, emanating from the waveguides, 8.

Another embodiment of this invention is a heat transfer process. The heat transfer process is illustrated by the flow chart in FIG. 4. The invention embodies the input chemical species flow obtaining heat, or being preheated, prior to entering the device for thermal or other methods of treatment by a heat exchange method that provides heat to the input chemical species flow from heat that is produced from the source for applied energy. The source can be a magnetron, a UV lamp, an IR lamp or other electronic device that produces the applied energy, 6. Such a device generally operates at low efficiencies and produces heat. This heat transfer process for preheating the input chemical species flow will decrease the cost of operating such a device. The heat from the tube, or tubes, can be exchange with the input chemical species flow by such cooling fins, such as those that are found on commercial magnetrons, heat pipes, thermoelectric devices, cooling systems that circulate a fluid around the tube or lamp and release the heat at a radiator. After the input chemical species flow is preheated with heat from the tube, the input chemical species flow can be further heated by heat transfer either a) from the cavity walls, b) from a conventional heat exchanger (a recuperator) that is located after the exit end of the device, or c) from both the cavity walls and conventional recuperator.

Heat exchange with the artificial dielectric device and other devices that use electromagnetic energy can allow for increased energy efficiency of the device, as well as to allow for increased energy efficiency to processes outside the device in an industrial process or within a manufacturing facility. Increased energy efficiency of the device reduces the operating cost of the device, while the increased energy efficiency outside the device utilizes heat energy produced by the device for other applications. These applications can be, but are not limited to, heating water for washing applications in textile operations, heating water for pulping operations, preheating air for combustion in coal-fired electricity generation, preheating air, methane or both for gas-fired turbine electricity generation, preheating ammonia for selective non-catalytic reduction (SNCR) of nitrogen oxides (NOx) and selective catalytic reduction (SCR) or nitrogen oxides (NOx) and to preheat methane or other gaseous organics prior to entering a device which catalyzes the methane or other gaseous organic species to higher order molecules.

Figure 4:
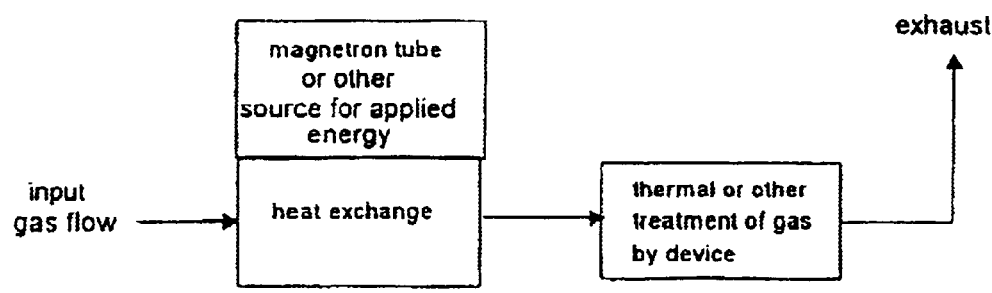
FIG. 4 is a flow chart representing a heat transfer process.

The heat exchange process in FIG. 4 can have additional steps. These steps can include additional heat exchange, cooling of the output chemical species flow prior to heat exchange with either a conventional heat exchanger, charged air cooler, heat pipes or other device, and mixing input chemical species flow from different heat exchange methods prior to entering the device which treats the input chemical species flow.

Another aspect of this invention is a heat exchange process having the steps where: step (1) the heat exchange between the source of electromagnetic energy and the input chemical species flow or part of the input chemical species flow occurs; step (1a) next the input chemical species flow or part of the input chemical species flow is further heated by heat exchange between the exiting hot, output chemical species flow by exchange of heat with either conventional pipe heat exchanger, heat pipes, charged air coolers or other means; step (2) then the input chemical species flow or part of the input chemical species flow enters the device to be treated; and step (3) output chemical species flow exits the device and exhausts through the heat exchange system. The benefits of this method for a heat exchange process is that the experimentally measured temperatures of cooling air over magnetrons, at steady-state conditions in this device and under the operating conditions, provide data that exhibits a temperature change of the ambient air after exchanging heat with the magnetron tubes. The initial ambient air temperature of approximately 80° F. was raised to approximately 130° F., providing a change in temperature of approximately +50° F. This small, but significant, rise in air temperature provides cooling for the electromagnetic source, magnetrons. Without this cooling, the magnetrons would overheat, reduce their power output, lessen the lifetime of electronic device or combination thereof. This heat exchange process must be carried out in the order of step (1)

then step (1a). This process cannot exchange the order of step (1) and step (1a) and provide the necessary cooling of the electromagnetic source. If step (1a) was switched with step (1), then the gases leaving the heat exchange method in step (1a) would be too hot to provide the necessary heat exchange for cooling the electromagnetic source.

Other experimental data provides support for the order of the steps. The temperature of the output chemical species flow, under operating conditions and prior to exhausting via the heat exchanger in step (1a), was in excess of 842° F. The heat exchange from step (1a) would raise the temperature of the input gases too great to be effective in cooling the applied electromagnetic source. Even if the gaseous output chemical species are expanded to reduce the temperature of the output chemical species flow prior to entering the heat exchanger in step (1a), it is doubtful that an effective heat exchange process and desired mass balance between the input chemical species flow and the output chemical species flow could be obtained.

Another aspect of this invention is a heat exchange process having the steps where: step (1) the heat exchanges between the source of electromagnetic energy and the input chemical species flow or part of the input chemical species flow occurs; step (1a) next the input chemical species flow or part of the input chemical species flow is further heated by heat exchange between the exiting hot, output-chemical species flow by exchange of heat with either conventional pipe heat exchanger, heat pipes, charged air coolers or other means; step (2) then the input chemical species flow or part of the input chemical species flow enters the device to be treated; step (3a) output chemical species flow exits the device and the output chemical species flow is cooled; and step (3b) the output chemical species flow exhausts through the heat exchange system. In step (3a) the output chemical species flow can be cooled by a variety of means and for a variety of purposes. Cooling in step (3a) can occur by expanding the gaseous output chemical species, using a coil containing fluid species that is in communication with neither the input nor the output chemical species or other methods. Step (3a) provides for the use of lower cost material for the construction of the heat exchange devices in step (1a). These materials can be aluminum, aluminum alloys, or other. In addition, step (3a) allows for the application of the heat exchange process with the treatment device to be optimized for economic benefit of an industrial process or manufacturing facility. Examples of potential economic benefit are: textiles industry—an economic benefit to cool the output chemical species in step (3a) with fluids that eventually are used to wash textiles with hot water; coal-fired power plants—combustion air is preheated in step (3a); and gas-fired power plants—methane and combustion air is preheated in step (3a).

Another aspect of this invention is a heat exchange process having the steps where: step (1b) the heat exchanges between the source of electromagnetic energy and part of the input chemical species flow occurs; step (1c) another part of the input chemical species flow is further heated by heat exchange between the exiting hot, output-chemical species flow by exchange of heat with either conventional pipe heat exchanger, heat pipes, charged air coolers or other means; step (1d) all input chemical species flows are mixed prior to entering the device for treatment; step (2) then the entire input chemical species flow enters the device for treatment; and step (3) the output chemical species exhausts through the heat exchange system. Step (3a) disclosed in the preceding paragraph can be added to this heat exchange process if needed.

Another embodiment of this invention is a structure of the gas-permeable susceptor, 9. This invention embodies a macroscopic artificial dielectric structure for the gas-permeable susceptor, 9. The embodied gas-permeable macroscopic artificial dielectric susceptor can be a honeycomb structure, foam, or woven fabric filter with a pattern, or a structure consisting of discrete susceptors, which are referred to herein as unit susceptors. This invention embodies the gas-permeable, macroscopic artificial dielectric susceptor to allow for applied electromagnetic energy, 6, to penetrate the distance between the primarily reflective components, whether a discrete susceptor, a coating pattern or woven pattern structure so the structure does not act as a collection of waveguides with cut-off frequencies that prevents the applied energy, 6, from penetrating the width of interaction, 12. The gas-permeable, macroscopic artificial dielectric susceptor embodies a) an article constructed of a material where the article has a coating applied in a specific pattern to create a macroscopic artificial dielectric structure from the coating and the article, b) a woven structure that contains two or more different materials as threads (or yarns) which woven together to form a macroscopic artificial dielectric structure, or c) a structure that consists of a mixture of discrete suscepting articles where the mixture contains discrete articles that have different dielectric properties and surround each other to form a macroscopic artificial dielectric structure.

When the embodied invention, the gas-permeable macroscopic artificial dielectric structure, has an article which is a honeycomb structure constructed of a material, some of the cell walls of the honeycomb can be coated with materials that have different dielectric properties to produce a macroscopic artificial dielectric. The pattern of cells with coated walls are arranged in the honeycomb so that the applied electromagnetic energy and energies penetrate the suscepting structure and either heat the susceptor or scatter the energy for interaction with the gases/particulate in the air stream. The pattern of the cell walls attenuate the applied electromagnetic energy by either a) partially or completely by absorbing the applied energy, producing fluorescent radiation to heat the remaining parts of the susceptor and the air stream or b) partially or completely scattering applied energy to concentrate the applied energy for interaction with the air stream or to heat the remaining volume of the susceptor. Also, the embodied macroscopic artificial dielectric can be made from the honeycomb structure by filling some of the cells with another material. Additionally, the invention embodies 1) a large honeycombed-shaped, macroscopic artificial dielectric structure that is constructed from smaller discrete susceptor articles that are small honeycombed shaped articles that have differing dielectric properties and/or conductivity or 2) smaller discrete susceptor articles that are honeycombed-shaped that have the same dielectric property and are cemented together with a material which has different dielectric properties and/or conductivity. This invention also embodies the same or similar methods used to create honeycombed-shaped macroscopic artificial dielectrics to be employed to create macroscopic artificial dielectrics out of foams and weaves.

When the embodied macroscopic artificial dielectric susceptor is designed as a structure that consists of unit susceptors, susceptors can be designed for complex interaction with the applied energy or energies as previously described in Example Three. Potentially, each unit susceptor can have separate characteristics for absorption, transmission, scattering and reflection of 1) applied electromagnetic energy or energies, 2) subsequent fluorescent radiation produced from the applied electromagnetic energy or energies, and 3) the subsequent radiation from heat resulting from the dielectric loss within each individual susceptor. The separate characteristics of absorption, transmission, scattering and reflection of a unit susceptor embodied in this invention are controlled by the unit susceptor's length, thickness, shape, composite materials structure, material selection, porosity, pore sizes, temperature dependence of the complex dielectric constant and thermal conductivity.

Figure 5:
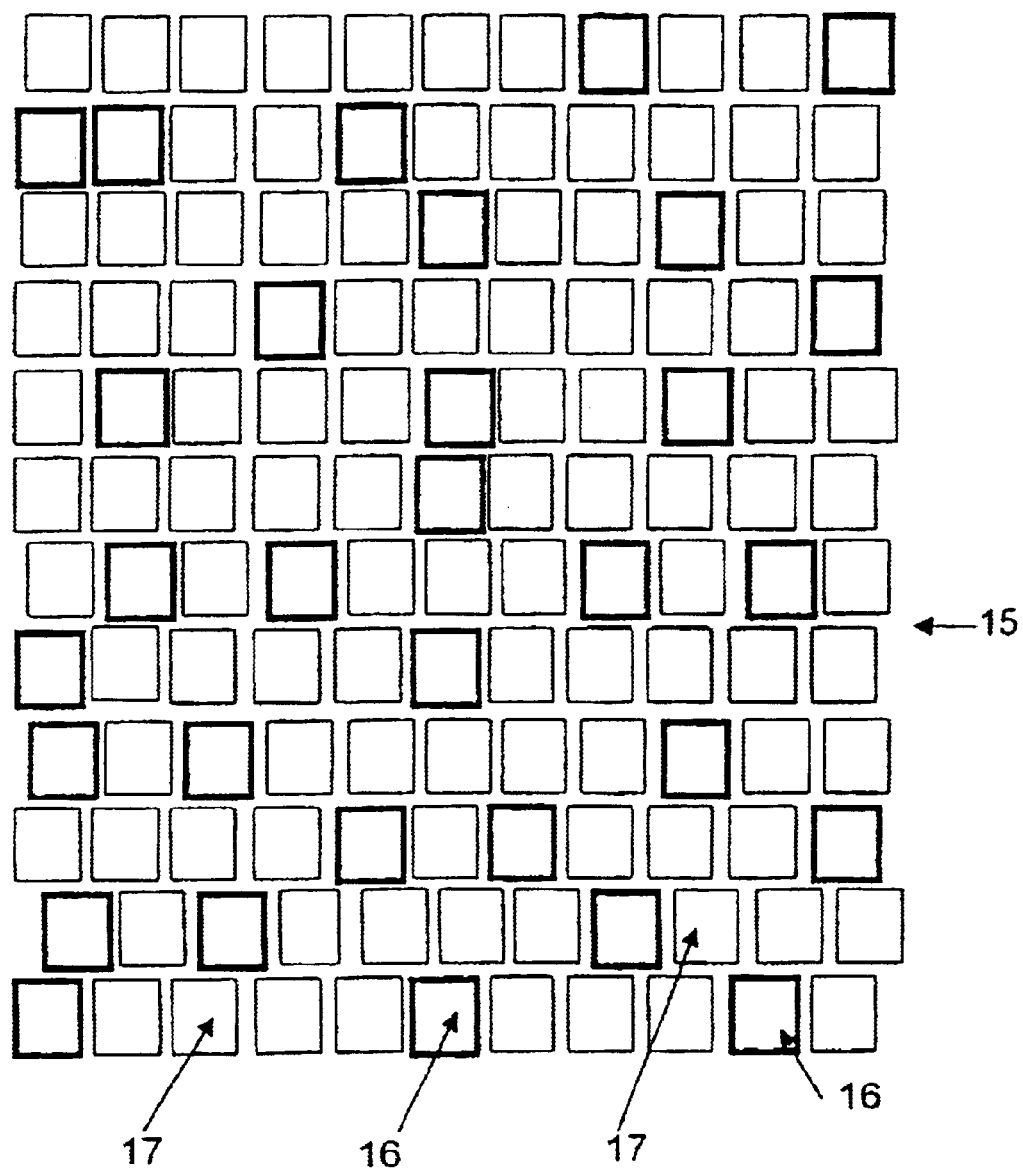
FIG. 5 is a 2-dimensional graphical representation of the gas-permeable, macroscopic artificial dielectric susceptor that is constructed of objects representing unit susceptors where one type of unit susceptor is primarily reflective and the other type of unit susceptor is either primarily transparent or partially absorptive.

FIG. 5 describes the structure of the macroscopic artificial dielectric susceptor, 15, by using a two-dimension array of squares that represent unit susceptors. Although the optical properties of each unit susceptor within the embodied macroscopic artificial dielectric susceptor structure, 15, can be independent, the embodied structure of the macroscopic artificial dielectric susceptor, 15, will dictate the interaction of the macroscopic susceptor with the applied electromagnetic energy, 6. The structure of the macroscopic artificial dielectric susceptor will be described with the unit susceptors that are primarily reflective, 16. This invention, the gas-permeable, macroscopic artificial dielectric susceptor, 15, embodies the principle of reflection to provide diffuse reflection, scattering, as means for allowing the applied energy, 6, to penetrate the width of interaction, 12, in susceptor, 9, to volumetrically interact with susceptor, 9, to produce the desired method of treatment to react gases for desired products or to treat pollutants for producing clean air which can be discharged into the environment in accordance with the law of the land.

The reflectivity of the embodied macroscopic artificial dielectric susceptor, 15, is controlled by the volume and interconnectivity of the unit susceptors, 16, which are the primarily reflective unit susceptors in the macroscopic susceptor. The primarily reflective unit susceptors, 16, are defined as being the unit susceptors to which are primarily reflective to the applied energy, 6, or energies. The gas-permeable, macroscopic artificial dielectric susceptor has the primarily reflective unit susceptors, 16, surrounded by unit susceptors, 17, that are either primarily transparent or partially absorptive of the applied energy or energies. The primarily reflective unit susceptors, 16, scatter the applied energy, 6, within susceptor, 9, concentrating the applied energy to interact with either a) the primarily transparent or partially absorptive unit susceptors, 17 or b) the reactant gases, pollutants or particulates.

Figure 6:
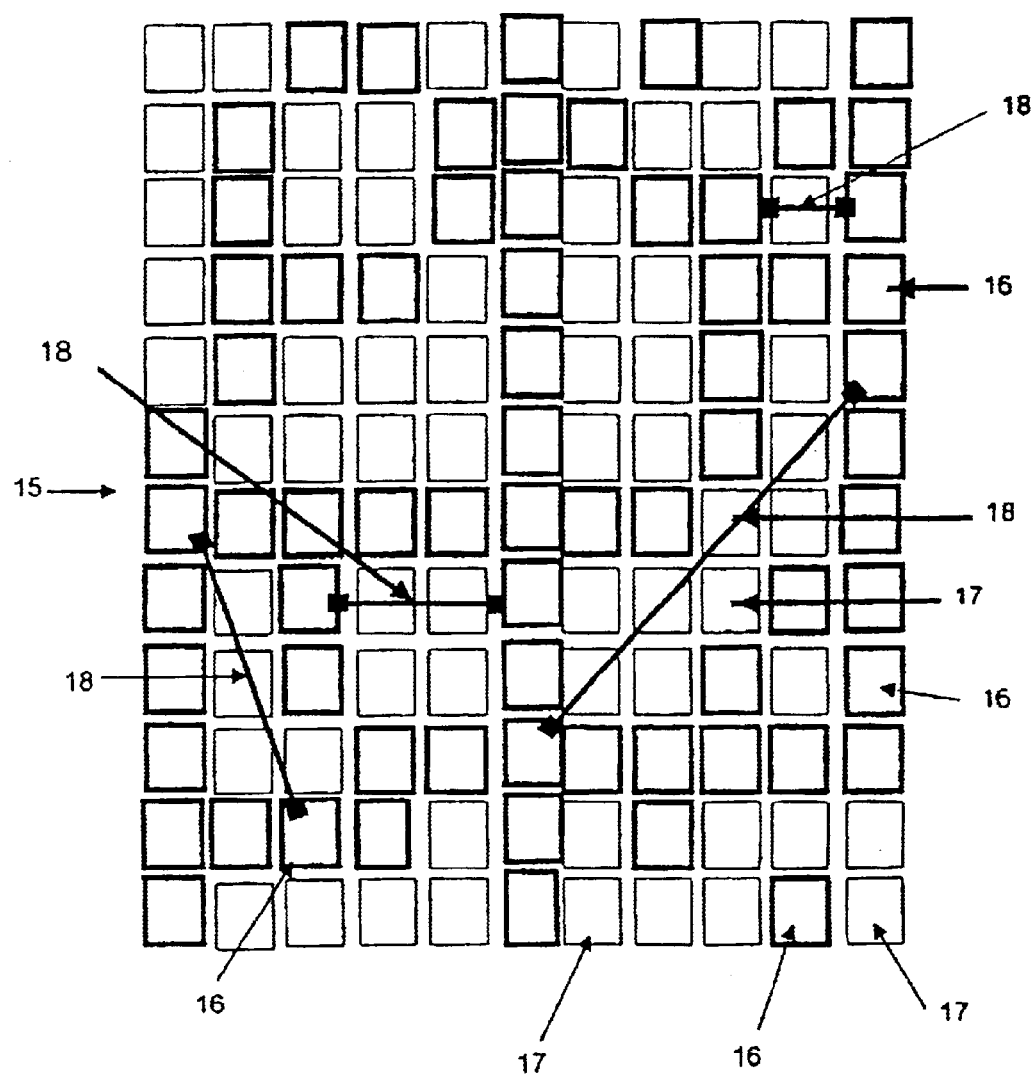
FIG. 6 is a 2-dimensional graphical representation of the gas-permeable, macroscopic artificial dielectric susceptor which is constructed of objects representing unit susceptors that have an interconnected network of primarily reflective unit susceptors.

As the volume of the primarily reflective unit susceptors, 16, increases in the gas-permeable, macroscopic artificial dielectric susceptor, 15, a degree of interconnectivity of the primarily reflective unit susceptors, 16, will occur, forming an interconnective network within the gas-permeable, macroscopic artificial dielectric susceptor, 15, as shown in FIG. 6. The degree or amount of interconnectivity will depend on the size and shape of the primarily reflective unit susceptors, 16. The ability of the applied energy, 6, or energies to penetrate the macroscopic artificial dielectric susceptor, 15, 9, will depend not only on the volume of the primarily reflective unit susceptor, 16, but also on the degree and amount of interconnectivity. When the degree of interconnectivity of the primarily reflective unit susceptors, 16, throughout the entire gas-permeable macroscopic artificial dielectric susceptor, 15, 9, is such that maximum distance between the interconnected network, 18, of the primarily reflective unit susceptors, 16, does not allow for applied energy, 6, to penetrate or the longest wavelength of the applied energies, 6, to penetrate, the gas-permeable macroscopic artificial dielectric susceptor, 9, 15, itself, will become primarily reflective to either a) the applied electromagnetic energy or b) the longest wavelength of the applied energies, and volumetric interaction between the applied energy, 6, with susceptor, 9 will not occur. The volume of susceptor, 9, given by the production width of interaction, 12, by the length of the susceptor by the breadth of the susceptor will not have 50% of the applied electromagnetic energy disturbed volumetrically within the volume.

This invention embodies a gas permeable susceptor with macroscopic artificial dielectric structure, which allows for the applied electromagnetic energy, 6, to be able to penetrate the distance, 18, between primarily reflective unit susceptors, 16, allowing for volumetric interaction within susceptor, 9. The embodiments of this invention can be applied to honeycomb structures, weaves and foams when reflective coating are applied to the structure or the structure are constructed of smaller pieces that are primarily reflective suscepting units.

The invention embodies a high degree of interconnectivity of primarily reflective unit susceptors, 16. A high degree of interconnectivity can be beneficial in some instances. This invention embodies the use of clusters of primarily reflective unit susceptors, 16, to be distributed about the macroscopic artificial susceptor to promote scattering. Primarily reflective unit susceptors can be aggregated to form shapes and boundaries that reflect one or more wavelengths of the applied energy or energies.

This invention embodies a macroscopic artificial dielectric structure for the gas-permeable susceptor, 9, where the volume fraction and interconnectivity of the reflective unit susceptors, 16, surrounding partially absorbing or primarily transparent unit susceptors, 17, as a means to design specific macroscopic artificial dielectric structures a) for resonant cavities that are based upon the wavelength of the applied energy in the susceptor, b) for scattering energy for interaction with gas or particulate species, c) that concentrate energy at field concentrators which are located on other unit susceptors, d) that concentrate energy within the susceptor for increase reactivity between the gas stream and the fluorescent radiation, e) that have the primarily reflective unit susceptors arranged in such a manner to produce a large spiral, helical or other shape with the macroscopic susceptor, f) that act as shielding to prevent the applied electromagnetic from entering material inside the cavity for thermal insulation, g) that prevent leakage outside the cavity by the applied energy, h) that reflect applied energy to other regions of the artificial dielectric to provide either higher temperatures or increased energy for reaction or destruction of gaseous/particulate species, and i) that regulate the temperature of the gas-stream.

This invention also embodies a gas-permeable susceptor, 9, with a macroscopic artificial dielectric structure, which uses reflection, scattering and concentration of the applied electromagnetic energy as a means a) to react gases for desired products or to treat pollutants for producing clean air which can be discharged into the environment in accordance with the law of the land, b) to regulated the temperature of the air stream, c) to prevent the device from overheating, d) to prevent deleterious reactions between the materials of construction, e) to heat a gas stream, f) to create a device of substantial size for adsorption and regeneration of gaseous species from a mixture of carbon-containing susceptor and zeolite-containing susceptors, and g) to produce a desired ratio of a self-limited temperature to power concentration of applied energy or energies to perform the desired utility.

This invention embodies primarily of the unit susceptors, 16, that are produced from metallic or intermetallic materials species at room temperature or materials such as semiconductors, ferroelectrics, ferromagnetics, antiferroelectrics, and antiferromagnetics that become reflective at elevated temperatures. The embodied unit susceptor's materials that produce reflection are either a) homogeneous materials, b) composite materials having a second phase material in a matrix that is partially absorptive to applied electromagnetic energy where the volume fraction of the second phase materials can be used to control the amount of reflection of a unit susceptor, or c) a coating on a unit susceptor. This invention also embodies the length, width and shape of the primarily reflective unit susceptors, 16, and the distance between reflective unit susceptors, 18, to control the reflectivity of the gas-permeable, macroscopic artificial dielectric susceptor.

The shape of the unit susceptor can be designed for reflection. The invention embodies the shape of the unit susceptor that are either chiral, spire-like, helical, rod-like, acicular, spherical, ellipsoidal, disc-shaped, needle-like, plate-like, irregular-shaped or the shape of spaghetti twist in Muller's Spaghetti and Creamette brand. This invention embodies the shape of the unit susceptor to produce turbulence in the airflow, thus providing for mixing of reactants in the gaseous or liquid stream. The shape and size of the susceptor can be used to grade the pore size of the susceptor to accommodate the expansion of gas due to passing through the hot zone.

Figure 7:
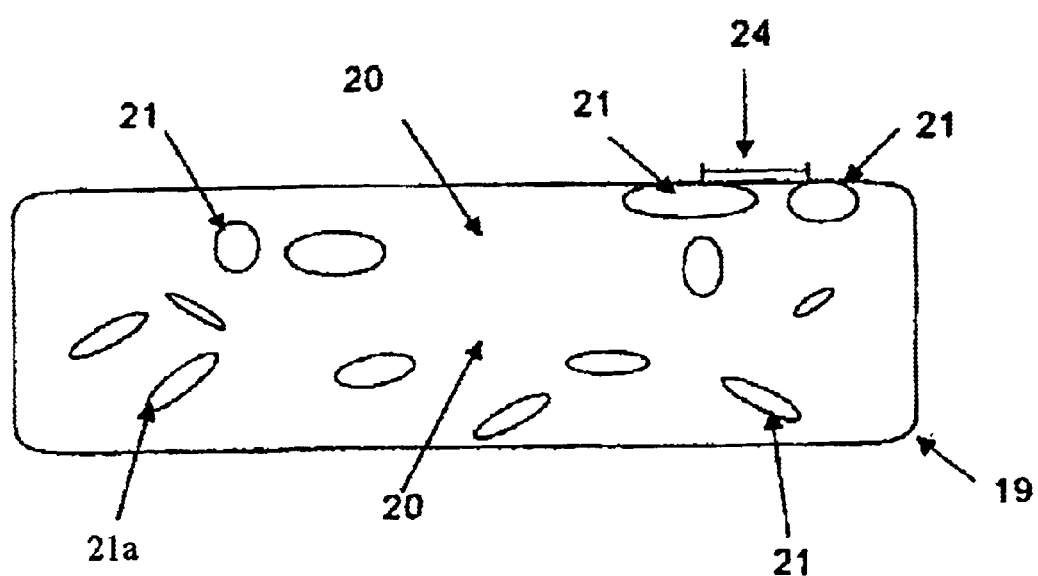
FIG. 7 is a unit susceptor that is constructed of an artificial dielectric material.

Another embodiment of this invention is unit susceptor, 19, that is illustrated in FIG. 7. Unit susceptors, 19, can make up the gas-permeable, macroscopic artificial dielectric susceptor, 15. The unit susceptor's, 19, shape can be chiral, spire-like, helical, rod-like, acicular, spherical, ellipsoidal, disc-shaped, irregular-shape, plate-like, needle-like or the shape of a Muller's spaghetti twist (rotini). The susceptor, 19, can be an artificial dielectric material, made from a homogeneous material or have a coating on the unit susceptor that is either made from a homogeneous material or artificial dielectric material. The length of unit susceptor, 19, should be greater than 0.25 inches and the width should be greater than $\frac{1}{16}$th of an inch.

The absorption, transmission, reflection, scattering and the complex dielectric constant of unit susceptors, 19, can be controlled by using artificial dielectric materials. The structure of a unit susceptor, 19, made from an artificial dielectric material is shown FIG. 7. The unit susceptor, 19, has a matrix material, 20, which contains a second phase material, 21 or third phase material, 12. The purpose of using an artificial dielectric material for a unit susceptor, 19, is to produce primarily reflective unit susceptors, 16. The reflectivity of the primarily unit susceptors, 16, can be controlled by size, volume fraction and shape of the second phase material, 21 or third phase material, 12. A volume fraction of the second phase material over 50% can produce an interconnected network of the second phase materials, which has a reflectivity that behaves the same as higher volume fractions. The shape of the second phase can be chiral, spire-like, helical, rod-like, acicular, spherical, ellipsoidal, disc-shaped, irregular-shape, plate-like or needle-like. A size range of the second phase, 21, which is from the group of materials known as semiconductors, conductors, ferromagnetics, ferroelectrics, ferrimagnetics and antiferroelectrics is embodied in this invention.

The size-range which is embodied in this invention for the second phase is a particle size range that is −325 U.S. Mesh Sieve Size or less (equivalent to sizes less than 46 microns). The embodied small particle size range is used because these particle sizes will rapidly absorb electromagnetic energy, elevating the temperature of the particles' very high temperature where the particles' material will become very conductive and/or exceed the Curie temperature, rendering the unit susceptor to be reflective. Another embodiment of this invention is that the thermal expansion mismatch between the second phase material, 21, and the matrix, 20, be less than 15%, in order to prevent the unit susceptor, 19, from becoming friable. Another embodiment of this invention is a method to reduce the thermal expansion mismatch by the unit susceptor's second phase material, 21, being the same crystalline structure and base material as the matrix material, 20, however the second phase's material, 21, is doped on the lattice structure with a cation or anion to increase the electrical conductivity of the second phase's material while producing a very low thermal expansion mismatch between the matrix, 20, and the second phase material, 21. Another embodiment of this invention is to have the particle size of the second phase material, 21, be in the size range of between 200 microns and 3 mm in the unit susceptor, 19, when strong potential for deleterious chemical reaction between the matrix, 20, and the second phase material, 21, in unit susceptor, 19.

Additionally, the composite materials for unit susceptors can use a combination of materials in such a fashion where the selected materials produce thermoluminescent, incandescent and phosphorescent radiation.

Figure 8:
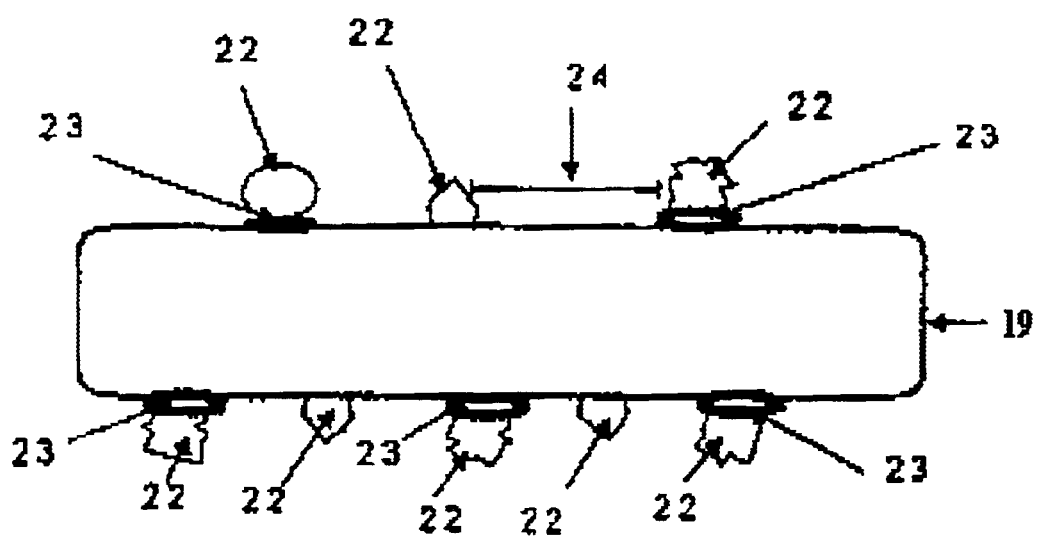
FIG. 8 illustrates field concentrators on the unit susceptors.

Another embodiment of this invention is the use of field concentrators, 22, on unit susceptors, 19, as illustrated in FIG. 8. This invention embodies the use of field concentrators, 22, to concentrate the electromagnetic field locally so a high intensity electromagnetic field is available to interact with gaseous/particulate species to either drive chemical reaction, enhance the reaction between chemical species or to treat pollutants. This invention embodies materials of construction of field concentrators, 22, that are a) conductors, b) semi-conductors, c) materials with a Curie Point, d) ionic-conducting ceramic, e) composite materials from a and c, f) composite materials from b and c, g) composite materials from a and d, and h) composite materials from b and d. This invention embodies the shape of field concentrators, 22, to be selected from shapes that are chiral, spire-like, helical, rod-like, acicular, spherical, ellipsoidal, disc-shaped, irregular-shape, plate-like, needle-like or have a shape that has sharp-pointed-gear-like teeth.

This invention embodies a size range for the field concentrators, 22, that is used to prevent deleterious chemical reaction between the field concentrators, 22, and unit susceptor, 19. The size of the field concentrators can be one to 10 times the depth of penetration of applied electromagnetic energy of materials of construction, either at room temperature or the operating temperature. This size difference depends on the chemical compatibility between the field concentrators and the unit susceptor's materials of construction. Where there is little concern for deleterious reaction between the unit susceptor and field concentrator, then the size of the field concentrator, which, based on its depth of penetration of the materials of construction, can be 1 to 10 times the depth penetration at the operating temperature. If there is great concern for deleterious reaction between the unit susceptor and field concentrator, then the size of the field concentrator should be such not to promote reaction, 200 microns to 4 mm.

Additionally, this invention embodies the use of a barrier coating, 23, between the field concentrators, 22, and the unit susceptor, 19, to prevent deleterious chemical reaction between the field concentrator and the unit susceptor. Also, this invention embodies materials of construction for field concentrators, 22, including 1) a thermoluminescent material, 2) a phosphorescent material, 3) an incandescent material, 4) ferroelectric, 5) ferromagnetic, 6) ferrimagnetic, 7) $MnO_2$, 8) $TiO_2$, 9) CuO, 10) NiO, 11) $Fe_2O_3$, 12) $Cr_2O_3$, 13) $Li_2O$ doped $MnO_2$, 14) $Li_2O$ doped CuO, 15) $Li_2O$ doped NiO, 16) CuO—$MnO_2$—$Li_2O$ complex, 17) CuO—$MnO_2$, 18) silicide, 19) borides, 20) aluminides, 21) nitrides, 22) carbides, 23) ceramic glazes with metal particles, 24) ceramic glazes with semi-conducting particles, 25) materials that produce thermionic emissions, and 26) thermoelectric materials.

This invention embodies the production of ozone from field concentrators, 22, on unit susceptor, 19 as shown in FIG. 8. When the distance (gap), 23, between two field concentrators, 22, which are made from materials which are conducting or semi-conducting are at such a distance, the applied electromagnetic field, 6, can cause a discharge of a spark from localized fields that are produced by the applied electromagnetic energy, producing ozone. The invention also embodies the production of ozone on the surfaces of unit susceptors, 19, which are constructed of artificial dielectric material as shown in FIG. 7. A spark can occur from a gap, 24, between the exposed surfaces of the second phase material, 21, and ozone can be produced. This invention embodies the production of ozone that can occur at elevated temperatures and when the volume fraction of the second phase material, 21, exceeds twenty percent (20%). Also, this invention embodies the production of ozone from electric discharges that can occur a) between two unit susceptors, 19, in close proximity that contain field concentrators, 22, b) between exposed surfaces of second phase material, 21, from two unit susceptors in close proximity, and c) between two unit susceptors, 19, where one unit susceptor, 19, contains a field concentrator, 22, and the one unit susceptor contains an exposed surface of a second phase material, 21.

The above description sets forth the best mode of the invention as known to the inventor at this time, and is for illustrative purposes only, as one skilled in the art will be able to make modifications to this process without departing from the spirit and scope of the invention and its equivalents as set forth in the appended claims.

Field Concentrators

Figure 9:
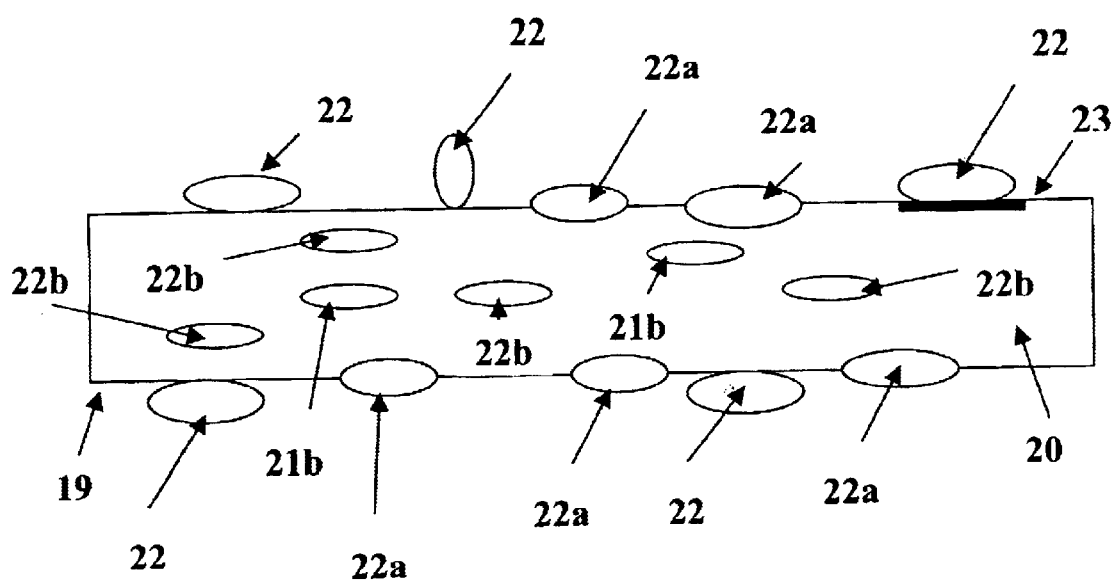
FIG. 9 illustrates field concentrators on the surface of, embedded in the surface of, and embedded within the unit susceptors.

This invention embodies different locations for field concentrators in a susceptor. The susceptor can be a macroscopic susceptor, 15, or a unit susceptor, 19. As shown in FIG. 9, a field concentrator can be located on the surface of a susceptor, 22, embedded in a surface of susceptor, 22a, or embedded in the matrix, 22b, of a susceptor. A susceptor can have a combination of these locations of field concentrators to generate local electric fields. When a field concentrator, 22b, is embedded in the susceptor, the matrix, 20, would be made of a material that has enough permittivity and permeability to the applied electromagnetic energy and enough permittivity and permeability that allows for producing a local field about the surface of the susceptor from embedded field concentrator, 22b. A susceptor can contain a plurality of field concentrators. As shown in FIG. 7, the non-matrix material, 21, that is embedded in the surface of susceptor, 19, can behave as field concentrators as mentioned earlier to produce ozone. Additionally, when the field concentrator is on the surface, 22, or embedded in the surface of a susceptor, 22a, the susceptor can be a homogeneous material, not a composite. The homogeneous material of the susceptor can either be reflective to the applied electromagnetic energy, be an insulator, be a material that has a Curie temperature, a material that has dielectric losses or a material that absorb at least a portion of the applied electromagnetic energy.

Another aspect of this embodiment is that reflective non-matrix material, 21b, can be used to reflect applied electromagnetic energy to a field concentrator to increase the local electric field. As shown in FIG. 9, the reflective non-matrix material, 21b, is a material that is primarily reflective to the applied electromagnetic energy at room temperature or a material that becomes reflective to the applied electromagnetic energy at temperatures greater than room temperature.

The invention also is a method of locally concentrating an applied electric field to promote chemical reaction having a dispersion of individual field concentrators at a location selected from the group consisting of on the surface of a substrate, embedded on a substrate, and embedded on the surface of a substrate, wherein the individual field concentrators consists of shaped material and the shape and material are capable of producing a locally concentrated electric field in the vicinity of the field concentrator from interaction between the field concentrator and the applied electric field.

The shape of an individual field concentrator can be selected from the group consisting of chiral shape, spire-like shape, shape cylindrical shape, tubular shape, helical shape, rod-like shape, plate-like shape, acicular shape, spherical shape, ellipsoidal shape, disc-shaped shape, irregular-shaped shape, plate-like shape, needle-like shape, twist shape, and a shape like a pasta rotini twist.

The size of an individual field concentrator preferably is between one nanometer and one meter.

The material for an individual field concentrator preferably is selected from the group of materials consisting of a material that is capable of creating an electric field, a chalcogenide, a metal alloy, a solid-solution crystalline material, a Fe-based alloy, a precious metal alloy, an artificial dielectric, an artificial dielectric material where the volume fraction of the non-matrix species is less that 50 volume percent, an artificial dielectric material where the volume fraction of the non-matrix species is equal to or greater than 50 volume percent, a material that produces thermionic emissions, a material that is thermoelectric, a cermet, a composite material, an organic polymeric matrix composite, a ceramic matrix composite, a metal matrix composite, copolymer, a Co-alloy, a Ni-alloy, antiferromagnetic, antiferroelectric, paramagnetic, a material with a Curie temperature, glassy, metallic, ferrimagnetic, ferroelectric, ferromagnetic, semiconducting, conducting, a solid-state ionic conductor, a non-stoichiometric carbide, a non-stoichiometric oxide, an oxycarbide, an oxynitride, a carbonitride, an intermetallic, a hydroxide, thermoluminescent, fluorescent, a boride, a material with low dielectric constant and low dielectric losses, a material with a high dielectric constant and low dielectric losses, Fe, Co, Ni, a silicide, a nitride, an aluminide, a material with a high dielectric constant and high dielectric losses, a material with a high dielectric constant and moderate dielectric losses, a carbide, an oxide, anatase, a sulfide, a sulfate, carbonate, FeO, CuO $Cu_2O$, $MnO_2$ $Mn_2O_5$, NiO, $Fe_2O_3$, $Fe_3O_4$, $Li_2O$—NiO, $TiO_2$ doped with a divalent cation, $TiO_2$ doped with a trivalent cation, $Fe_2O_3$ doped with $Ti^{+4}$, CuO—$MnO_2$, $Cu_2O$—$MnO_2$, $Li_2O$—$Cu_2O$, $Li_2O$—CuO, $Li_2O$—$MnO_2$, SiC, WC, TiC, $TiC_{x-y}O_y$, $TiC_{1-x}$, $TiO_2$, a non-stoichiometric titanium oxide, TiO, $Ti_2O_3$, a non-stoichiometric zirconia oxide, anatase, beta"-alumina, alpha-alumina, Na-beta-alumina, Li-beta-alumina, (Na,Li)-beta-alumina, a carbon, a graphite, ZnO, CuS, FeS, CoO, a calcium aluminate, char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, a p-type material, an n-type material, a cation-doped p-type dominate material, an anion-doped p-type dominate materials, a cation-doped n-type dominate material, an anion-doped n-type material, a metal, an amorphous material, and a non-stoichiometric nitride.

A coating also can be placed between the substrate and field concentrator wherein the utility of coating is selected from the group of utility consisting of a coating containing a catalyst for catalysis, a coating to prevent deleterious reaction between the field concentrator and the susceptor's materials of construction, a coating that is used to adhere the field concentrator to the susceptor, a coating to provide electrical insulation between the field concentrator and the susceptor's materials of construction, a coating to create a strong local electric field where the coating's material has a high dielectric constant with low dielectric losses, a coating to create a strong local electric field where the coating's material has a moderate dielectric constant and dielectric losses, a coating that is a semiconductor where the coating heats due to the field concentration of the field concentrator, and combinations thereof.

The substrate preferably is constructed of low-loss dielectric material selected from the group of materials consisting of alumina, aluminosilicate ceramic, magnesium aluminosilicate ceramic, magnesium silicate, calcium silicate, calcium aluminosilicate, clay, zeolite, magnesium oxide, sialon, oxynitride, inorganic glass, organic glass, organic polymer, crystalline organic polymer, a polymer composite, cordierite, enstatite, forsterite, steatite, nitride, porcelain, high-temperature porcelain, a glass ceramic, a phase separated glass, a lithium-aluminosilicate, Teflon, a organic copolymer, polycarbonate, polypropylene, polystyrene, polyethylene, polyester, polytetrafluoroethylene, and combination thereof.

The substrate also can be constructed of materials selected from the group of materials consisting of a material that is amorphous, polycrystalline, antiferromagnetic, antiferroelectric, paramagnetic, an artificial dielectric, an artificial dielectric material where the volume fraction of the non-matrix species is less that 50 volume percent, an artificial dielectric material where the volume fraction of the non-matrix species is equal to or greater than 50 volume percent, a material that produces thermionic emissions, a material that is thermoelectric, a cermet, a composite, a material with a Curie temperature, glassy, metallic, ferrimagnetic, ferroelectric, thermochromatic, photochromatic, ferromagnetic, semiconducting, conducting, a solid-state ionic conductor, a non-stoichiometric carbide, a non-stoichiometric oxide, an oxycarbide, an oxynitride, a carbonitride, an intermetallic, a hydroxide, a non-stoichiometric nitride, thermoluminescent, a non-stoichiometric Ilmenitic structure, fluorescent, a boride, a material with low dielectric constant and low dielectric losses, a material with a high dielectric constant and low dielectric losses, an oxide, a silicide, a nitride, an aluminide, a material with a high dielectric constant and high dielectric losses, a material with a high dielectric constant and moderate dielectric losses, a carbide, an oxide, anatase, a sulfide, a sulfate, a carbonate, a glass ceramic, a phase separated glass, an ionic conductor, a catalyst, a material derived by processing a clay mineral with heat to a temperature and for time period above the temperature that the water of crystallization is removed and below a temperature and for time period that prevent complete transformation of the clay material to nonreversible crystalline and/or glass phases, a material derived by processing talc with heat to a temperature and for time period above the temperature that the water of crystallization is removed and below a temperature and for time period that prevent complete transformation of the talc material to non-reversible crystalline and/or glass, a material derived by processing a zeolite with heat to a temperature and for time period above the temperature that the water of crystallization is removed and below a temperature and for time period that prevent complete transformation of the zeolite material to non-reversible crystalline and/or glass phases, a material derived by processing Brucite with heat to a temperature and for time period above the temperature that the water of crystallization is removed and below a temperature and for time period that prevent complete transformation of the Brucite material to non-reversible crystalline material, a material derived by processing a Gibbsite with heat to a temperature and for time period above the temperature that the water of crystallization is removed and below a temperature and for time period that prevent complete transformation of the clay material to non-reversible crystalline material, and combinations thereof.

The preferred clay mineral is selected from the group consisting of a montmorillonite, a ball clay, illite, dickite, halloysite, a mica, a zeolite, a koalinite, an illitic clay, pyropholite, Endellite, bentonite, chlorite, and combinations thereof.

The distance between any two field concentrators prevents the formation of a spark.

The field concentration cam be used for the function selected from the group of functions consisting of to drive chemical reactions, to assist in chemical reactions, to drive polymerization, to assist in polymerization, to assist in catalysis, oglomerization, or combination thereof, wherein the reaction occurs in physical phases of matter from the group consisting of a plasma, gas, solid, liquid, a fluid containing particulates, and combinations thereof.

The size of an individual field concentrator preferably is less than 20 times the depth of penetration of at least one wavelength of applied electromagnetic energy in the material that the individual field concentrator is constructed of.

The field concentration preferably has utility that is selected from the group of utility that reforms a hydrocarbon, causes polymerization, reduces nitrogen oxides to nitrogen ($N_2$), reduces NO to nitrogen ($N_2$), reduces $NO_2$ to NO, reduces $NO_2$ to nitrogen ($N_2$), reduces $SO_x$ to sulfur (S), reduces $SO_3$ to $SO_2$, reduces $SO_4$ to $SO_2$, reduces $SO_3$ to $SO_2$, produces chemical synthesis, allows for sterilization, produces cracking of a hydrocarbon, decreases the activation energy of a chemical process, oxidizes volatile organic compound to carbon dioxide and water, oxidizes carbon monoxide to carbon dioxide, synthesizes pharmaceuticals, reduces NOx in the presence of hydrocarbons, synthesizes biodiesel, reforms a hydrocarbon with a hydrogen donor species in the presence of $H_2O$, reforms a hydrocarbon with methane in the presence of $H_2O$, reforms a hydrocarbon in the presence of methane, water and carbon dioxide, reforms a hydrocarbon in the presence of methane, water, hydrogen and carbon dioxide, reforms a hydrocarbon in the presence of hydrogen and methane, polymerizes a hydrocarbon in the presence of metal halides, reduces nitrogen oxides in the presence of ammonia, reduces nitrogen-oxides in the presence of ammonium-containing compounds, treats pollutants to form clean air which can be discharged into the environment in accordance to the law of the land, produces oxidative bond cleavage of a hydrocarbon and produces non-oxidative bond cleavage of a hydrocarbon, wherein the reaction occurs in physical phases of matter from the group consisting of a plasma, gas, solid, liquid, a fluid containing particulates, and combinations thereof.

The method of field concentration is used in an atmosphere preferably selected from the group of atmosphere consisting of a reducing atmosphere, an oxidizing atmosphere, an atmosphere at one atmosphere of pressure, an atmosphere at less than one atmosphere of pressure, an atmosphere at greater than one atmosphere of pressure, and combinations thereof.

The field concentrator's electronic properties preferably are selected from the group consisting of a p-type material, an n-type material, a cation-doped p-type dominate material, an anion-doped p-type dominate materials, a cation-doped n-type dominate material, an anion-doped n-type dominate material, and combinations thereof.

The method electromagnetic properties of the field concentrator's materials preferably is control by a crystalline defect. The defect preferably is selected from the group of consisting of an intrinsic defect, an extrinsic defect, defect from cation substitution, a defect from anion substitution, and combinations thereof.

The operating temperature of the method of field concentration preferably is selected from the group of operating conditions consisting of a temperature which is above the Curie temperature of all the field concentrators' materials, a temperature which is below the Curie temperature of all the field concentrators' materials, a temperature which is above Curie temperature of the non-matrix material only, a temperature which is above the Curie temperature of the matrix material only, a temperature which is above the Curie temperature of all the susceptor's materials causing increased absorption, a temperature which is above the Curie temperature of the non-matrix causing increased absorption, a temperature which is above the Curie temperature of the matrix causing increased absorption, a temperature above the thermal runaway temperature (critical temperature) of at least one of the constituent phases, a temperature which is below the thermal runaway temperature (critical temperature) of all the constituent phases, a temperature which is below the activation temperature of the intrinsic dielectric conduction species of all the phases present, a temperature which is above the activation temperature of at least one intrinsic dielectric conducting species of all constituent phases, a temperature which is below the activation temperature of all extrinsic dielectric conducting species, a temperature which is above the activation temperature of at least one extrinsic dielectric conducting species of all the constituent phases, and combinations thereof.

The field concentrator preferably is of a size that is designed to lessen any deleterious chemical reaction between the materials of construction of the electromagnetic susceptor and the materials of construction of the field concentrator.

The field concentrator also may further comprise a catalyst.

The applied electromagnetic energy is applied in the form of continuous energy, pulsed energy or combination thereof.

The method substrate also can be permeable to a chemical species flow.

An illustrative chemical reaction is the production of ozone from interaction between a field concentrator and applied electromagnetic energy by having two or more field concentrators on a substrate constructed of a low-loss dielectric material having a distance between each field concentrator such that a spark is capable of being produced applying electromagnetic energy to the substrate that contains said field concentrators causing a spark discharge while passing a chemical species flow containing oxygen over said substrate.

A second illustrative chemical reaction is the production of ozone from interaction between a non-matrix material and applied electromagnetic energy by exposing a composite substrate to electromagnetic energy in which a portion of the non-matrix material is embedded in the surface of a susceptor and is exposed above the surface of a susceptor having a matrix constructed of a low-loss and low dielectric constant material, and applying electromagnetic energy to the substrate causing a spark discharge while passing a chemical species flow containing oxygen of said substrate.

The volume fraction of the non-matrix material is greater than 0% and preferably greater than 20%.

Coatings

The invention also is a coated susceptor of electromagnetic energy for chemical processing comprising:

a matrix material that surrounds a non-matrix material that is made from a material that is different from the matrix material, wherein the matrix material is constructed of material having lower dielectric losses compared to the non-matrix material, wherein:

a. the non-matrix material initially absorbs electromagnetic energy applied to the electromagnetic susceptor to a greater extent than the matrix material;

b. the non-matrix material produces subsequent heat in the matrix material; and c. the surface of the susceptor is coated with a material that interacts with applied electromagnetic energy of at least one frequency and initially absorbs electromagnetic energy and produces heat.

The non-matrix material also can produce reflection.

The form of said coating preferably is selected from the group consisting of a full coating on all susceptor surfaces, a full coating on a surface, a partial coating on a surface, a partial coating on all susceptor surfaces, a coating with a specific pattern, a coating containing a homogeneous material, a coating containing a composite material, a partial coating containing a more than one material, a patterned coating containing more than one material, a coating containing multiple layers of different material, and combinations thereof.

The weight fraction of said non-matrix material preferably is greater than 0.00001 weight percent and less than 50 weight percent. The weight fraction of said non-matrix material preferably is greater than 50 weight percent and less 99.9 weight percent.

The coating preferably has optical dielectric properties in relation to the applied electromagnetic energy selected from the group consisting of transparent, reflective, scattering, absorptive, and combinations thereof.

The coating can provide a utility to effect a physical property of said susceptor selected from the group consisting of mechanical properties, thermal properties, optical properties of the non-matrix material, optical properties of the susceptor, absorption of electromagnetic energy, reflection of electromagnetic energy, transmission of electromagnetic energy, scattering of electromagnetic energy, electromagnetic properties, corrosive properties, wear properties, piezoelectric properties, dielectric properties, magnetic properties, electric properties, susceptibility to the applied electromagnetic energy, susceptibility to the fluorescent electromagnetic energy, conductivity, controlling the chemical compatibility between the non-matrix material and the matrix material, regulating the temperature of said susceptor, regulating the temperature of a process, regulating the amount of electromagnetic energy available for chemical process, regulating the amount of electromagnetic energy available for a physical process, and combinations thereof.

The physical properties often are controlled by the thickness of the coating.

The coated susceptor can be used in an atmosphere selected from the group consisting of a reducing atmosphere, an oxidizing atmosphere, an atmosphere at one atmosphere of pressure, an atmosphere at less than one atmosphere of pressure, an atmosphere at greater than one atmosphere of pressure, and combinations thereof.

The coating can be constructed of a material selected from the group consisting of metallic, amorphous, polycrystalline, antiferromagnetic, antiferroelectric, paramagnetic, a material with a Curie temperature, glassy, metallic, ferrimagnetic, ferroelectric, ferromagnetic, semiconducting, conducting, a solid-state ionic conductor, a non-stoichiometric carbide, a non-stoichiometric oxide, an oxycarbide, a material that produces thermionic emissions, a material that is thermoelectric, a cermet, a ceramic glaze with metal particles, an oxynitride, a carbonitride, an intermetallic, a hydroxide, a non-stoichiometric nitride, thermoluminescent, a composite material, an organic polymeric matrix composite, a ceramic matrix composite, a metal matrix composite, a crystalline form of silica, fused silica, quartz, a organic copolymer, an amorphous organic polymer, a crystalline organic polymer, polycarbonate, polypropylene, polystyrene, polyethylene, polyester, polytetrafluoroethylene, a non-stoichiometric Ilmenitic structure, fluorescent, an artificial dielectric material, an artificial dielectric material where the volume fraction of the non-matrix species is less that 50 volume percent, an artificial dielectric material where the volume fraction of the non-matrix species is equal to or greater than 50 volume percent, a boride, a material with low dielectric constant and low dielectric losses, a material with a high dielectric constant and low dielectric losses, a silicide, a nitride, an aluminide, a material with a high dielectric constant and high dielectric losses, a material with a high dielectric constant and moderate dielectric losses, a carbide, an oxide, anatase, a sulfide, a sulfate, a crystalline form of silica, a carbonate, a glass ceramic, photochromatic, thermochromatic, a phase separated glass, an ionic conductor, a material derived by processing a clay mineral with heat to a temperature and for time period above the temperature that the water of crystallization is removed and below a temperature and for time period that prevent complete transformation of the clay material to non-reversible crystalline and/or glass phases, a material derived by processing talc with heat to a temperature and for time period above the temperature that the water of crystallization is removed and below a temperature and for time period that prevent complete transformation of the talc material to non-reversible crystalline and/or glass, a material derived by processing a zeolite with heat to a temperature and for time period above the temperature that the water of crystallization is removed and below a temperature and for time period that prevent complete transformation of the zeolite material to non-reversible crystalline and/or glass phases, a material derived by processing Brucite with heat to a temperature and for time period above the temperature that the water of crystallization is removed and below a temperature and for time period that prevent complete transformation of the Brucite material to non-reversible crystalline material, and a material derived by processing a Gibbsite with heat to a temperature and for time period above the temperature that the water of crystallization is removed and below a temperature and for time period that prevent complete transformation of the clay material to nonreversible crystalline material or combination thereof.

The clay mineral preferably selected from the group consisting of a montmorillonite, a ball clay, illite, dickite, halloysite, a mica, a zeolite, a koalinite, an illitic clay, pyropholite, Endellite, bentonite, chlorite and combinations thereof.

The coating can be constructed of a material selected from the group consisting of FeO, CuO $Cu_2O$, $MnO_2$ $Mn_2O_5$, NiO, $Fe_2O_3$, $Fe_3O_4$, $CuO$—$MnO_2$, $Cu_2O$—$MnO_2$, $Li_2O$—$Cu_2O$, $Li_2O$—CuO, $Li_2O$—$MnO_2$, SiC, WC, TiC, $TiC_{x-y}O_y$, $TiC_{1-x}$, $TiO_2$, non-stoichiometric titanium oxide, $Li_2O$—NiO, $TiO_2$ doped with a divalent cation, $TiO_2$ doped with a trivalent cation, $Fe_2O_3$ doped with $Ti^{+4}$, TiO, $Ti_2O_3$, non-stoichiometric zirconia oxide, anatase, beta"-alumina, alpha-alumina, Na-beta-alumina, Li-beta-alumina, (Na,Li)-beta-alumina, carbon, graphite, ZnO, CuS, FeS, CoO, calcium aluminate, char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, and combinations thereof.

The coating can be an amorphous material that is at a temperature below the material's glass transition temperature during the chemical processing.

The frequency of said applied electromagnetic energy can be selected from the group consisting of visible, ultraviolet, radio frequency, microwave, infrared, a variable frequency source, 915 MHz, 2.59 GHz, and combinations thereof.

The structure of said susceptor can be selected from the group consisting of chiral-shaped, spire-like shaped, helical shaped, rod-like shaped, plate-like shaped, acicular shaped, spherical shaped, ellipsoidal shaped, disc-shaped, irregular-shaped, plate-like shaped, a shape of a spiral antenna species for at least one wavelength of applied electromagnetic energy, a shape of an antenna specified for at least on wavelength of applied electromagnetic energy, needle-like shaped, twist shaped, rotini shaped, a woven structure and honeycomb-like structure, multi-cell structure, cylindrical shaped, tubular shaped, a reticulated structure, a foamed structure, a capillary structure, and combinations thereof.

The coated susceptor preferably is permeable to a chemical species flow.

The coated susceptor can be used as a plurality of susceptors for chemical processing in the form of an operation selected from the group consisting of fluidized bed, a slurry, a fluid mixture of susceptors and chemicals species flow, a gaseous mixture of particulate susceptors and a chemical species flow, a packed bed, a solid mixture of particulate susceptors and a solid chemical species flow, and combination thereof.

The coating preferably becomes reflective at the operating temperature of the chemical processing.

The coated susceptor can further comprising a field concentrator wherein the location of the field concentrator is selected group from the group consisting of on the coating, embedded in the coating, in the coating, and combinations thereof.

The coating can have a function is selected from the group consisting of driving chemical reactions, assisting in chemical reactions, polymerization, producing biodiesel through catalysis, synthesizing pharmaceuticals, reducing nitrogen oxides to nitrogen ($N_2$), reducing NO to nitrogen ($N_2$), reducing $NO_2$ to NO, reducing $NO_2$ to nitrogen ($N_2$), reducing $SO_x$ to sulfur (S), reducing $SO_3$ to $SO_2$, reducing $SO_4$ to $SO_2$, reducing $SO_3$ to $SO_2$, chemical synthesis, sterilization, cracking hydrocarbons, decreasing the activation energy of a chemical process, oxidizing volatile organic compounds, oxidizing carbon monoxide to carbon dioxide, reducing NOx in the presence of hydrocarbons, synthesizing biodiesel, reforming a hydrocarbon with a hydrogen donor species in the presence of $H_{23}$, reforming a hydrocarbon with methane in the presence of $H_{23}$, reforming a hydrocarbon in the presence of methane, water and carbon dioxide, reforming a hydrocarbon in the presence of methane, water, hydrogen and carbon dioxide, reforming a hydrocarbon in the presence of hydrogen and methane, polymerizing a hydrocarbon in the presence of metal halides, reducing nitrogen oxides in the presence of ammonia, reducing nitrogen oxides in the presence of ammonium-containing compounds, treating pollutants to form clean air which can be discharged into the environment in accordance to the law of the land, oxidative bond cleavage of a hydrocarbon, non-oxidative bond cleavage of a hydrocarbon, catalysis, field concentration or combination thereof, wherein the reaction occurs in physical phases of matter from the group consisting of a plasma, gas, solid, liquid, a fluid containing particulates, and combinations thereof.

The operating temperature of said susceptor can be selected from the group of operating conditions consisting of a temperature which is above the Curie temperature of all the susceptor's materials, a temperature which is below the Curie temperature of all the susceptor's materials, a temperature which is above Curie temperature of the non-matrix material only, a temperature which is above the Curie temperature of the matrix material only, a temperature which is above the Curie temperature of all the susceptor's materials causing increased absorption, a temperature which is above the Curie temperature of the non-matrix causing increased absorption, a temperature which is above the Curie temperature of the matrix causing increased absorption, a temperature above the thermal runaway temperature (critical temperature) of at least one of the constituent phases, a temperature which is below the thermal runaway temperature (critical temperature) of all the constituent phases, a temperature which is below the activation temperature of the intrinsic dielectric conduction species of all the phases present, a temperature which is above the activation temperature of at least one intrinsic dielectric conducting species of all constituent phases, a temperature above the Curie temperature of the coating's material, a temperature which is below the activation temperature of all extrinsic dielectric conducting species, a temperature which is above the activation temperature of at least one extrinsic dielectric conducting species of all the constituent phases, and combinations thereof.

The coating can be selected from the group consisting of controlling the amount of absorption of the applied electromagnetic energy by said susceptor material, regulating the temperature of the susceptor, controlling the amount of reflectivity of the applied electromagnetic energy by said susceptor, and combinations thereof.

The applied electromagnetic energy often applied in the form of continuous energy, pulsed energy or a combination thereof.

The coating can contain a material with catalytic properties. The material with catalytic properties can have a molecular structure selected from the group consisting of amorphous, rock salt, zinc blend, antifluorite, rutile, perovskite, spinel, inverse spinel, nickel arsenide, corundum, ilimenite, olivine, cesium chloride, fluorite, silica types, wurtzite, derivative structure of a known crystalline structure, a superstructure of a known crystalline structure, orthosilicate, metasilicate, gibbsite, graphite, zeolite, carbide, nitride, montmorillonite, pyrophyllite, intermetallic semiconductor, metallic semiconductor, garnet, psuedoperovskite, orthoferrite, hexagonal ferrite, rare earth garnet, and a ferrite.

The material with catalytic properties also can have electronic properties selected from the group consisting of a p-type material, an n-type material, a cation-doped p-type dominate material, an anion-doped p-type dominate materials, a cation-doped n-type dominate material, an anion-doped n-type material, and combinations thereof.

The coated susceptor also can have a barrier coating placed between said coating material with catalytic properties and said susceptor to prevent deleterious chemical reaction between said coating material with catalytic properties and the susceptor, to help prevent the poisoning of the catalyst, or to help prevent a combination thereof.

The form of the catalytic material can be selected from the group consisting of a catalyst that is a full coating on all susceptor surfaces, a catalyst that is partial coating on all susceptor surfaces, a catalyst that is particulate catalyst on the susceptor's surface, a catalyst that is particulate catalyst contained in a coating that is on the susceptor, a catalyst that is particulate catalyst on a coating that is on the susceptor, a catalyst that is full coating of all susceptor surfaces that has an additional coating between the catalyst and the susceptor, a catalyst that is a partial coating of all susceptor surfaces that has an additional coating between the catalyst and the susceptor, and combinations thereof.

The material with catalytic properties can be a composite selected from the group of catalytic composites consisting of two or more catalysts that perform the same function, two or more catalysts where at least one catalyst performs a different function than the other catalyst, two or more catalysts where at least one catalyst is a metallic species, two or more catalyst where at least one catalyst has a Curie temperature, and combinations thereof.

The material with catalytic properties can have a function selected from the group consisting of driving chemical reactions, assisting in chemical reactions, polymerization, producing biodiesel through catalysis, synthesizing pharmaceuticals, reducing nitrogen oxides to nitrogen ($N_2$), reducing NO to nitrogen ($N_2$), reducing $NO_2$ to NO, reducing $NO_2$ to nitrogen ($N_2$), reducing $SO_x$ to sulfur (S), reducing $SO_3$ to $SO_2$, reducing $SO_4$ to $SO_2$, reducing $SO_3$ to $SO_2$, chemical synthesis, sterilization, cracking hydrocarbons, decreasing the activation energy of a chemical process, oxidizing volatile organic compounds, oxidizing carbon monoxide to carbon dioxide, reducing NOx in the presence of hydrocarbons, synthesizing biodiesel, reforming a hydrocarbon with a hydrogen donor species in the presence of $H_{23}$, reforming a hydrocarbon with methane in the presence of $H_{23}$, reforming a hydrocarbon in the presence of methane, water and carbon dioxide, reforming a hydrocarbon in the presence of methane, water, hydrogen and carbon dioxide, reforming a hydrocarbon in the presence of hydrogen and methane, polymerizing a hydrocarbon in the presence of metal halides, reducing nitrogen oxides in the presence of ammonia, reducing nitrogen oxides in the presence of ammonium-containing compounds, treating pollutants to form clean air which can be discharged into the environment in accordance to the law of the land, oxidative bond cleavage of a hydrocarbon, non-oxidative bond cleavage of a hydrocarbon, catalysis, field concentration or combination thereof, wherein the reaction occurs in physical phases of matter from the group consisting of a plasma, gas, solid, liquid, a fluid containing particulates, and combinations thereof.

The material with catalytic properties also can be selected from the group of materials consisting of a photocatalytic material activated by electromagnetic energy in the ultraviolet region, a photo catalytic material activated by electromagnetic energy in the visible region, a infrared catalytic materials activated by electromagnetic energy in the infrared region, a catalytic materials activated by electromagnetic energy in the microwave region, a catalytic material activated by electromagnetic energy in the radio frequency region, and combinations thereof.

The material with catalytic properties also can be selected from the group of consisting of materials that are a precious metal, Fe, Co, Ni, Pt, Pd, Au, Ag, chalcogenide, metal alloy, boride, Fe-based alloy, a precious metal alloy, an artificial dielectric, an artificial dielectric material where the volume fraction of the non-matrix species is less that 50 volume percent, an artificial dielectric material where the volume fraction of the non-matrix species is equal to or greater than 50 volume percent, Co-alloy, Ni-alloy, antiferromagnetic, antiferroelectric, paramagnetic, a material with a Curie temperature, glassy, metallic, a material that produces thermionic emissions, a material that is thermoelectric, a cermet, a ceramic glaze with metal particles, ferrimagnetic, ferroelectric, ferromagnetic, semiconducting, conducting, solid-state ionic conductor, non-stoichiometric carbide, non-stoichiometric oxide, oxycarbide, oxynitride, carbonitride, oxide, nitride, intermetallic, hydroxide, thermoluminescent, fluorescent, boride, a material with low dielectric constant and low dielectric losses, a material with a high dielectric constant and low dielectric losses, silicide, nitride, aluminide, a material with a high dielectric constant and high dielectric losses, a material with a high dielectric constant and moderate dielectric losses, carbide, oxide, anatase, sulfide, sulfate, carbonate, FeO, CuO $Cu_2O$, $MnO_2$ $Mn_2O_5$, NiO, $Fe_2O_3$, $Fe_3O_4$, $CuO$—$MnO_2$, $Li_2O$—NiO, $TiO_2$ doped with a divalent cation, $TiO_2$ doped with a trivalent cation, $Fe_2O_3$ doped with $Ti^{+4}$, $Cu_2O$—$MnO_2$, $Li_2O$—$Cu_2O$, $Li_2O$—CuO, $Li_2O$—$MnO_2$, SiC, WC, TiC, $TiC_{x-y}O_y$, $TiC_{1-x}$, $TiO_2$, non-stoichiometric titanium oxide, TiO, $Ti_2O_3$, non-stoichiometric zirconia oxide, anatase, beta"-alumina, alpha-alumina, Na-beta-alumina, Li-beta-alumina, (Na,Li)-beta-alumina, carbon, graphite, ZnO, CuS, FeS, CoO, calcium aluminate, char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, $ZnO_{1-x}$, $SmLiO_2$, $LaLiO_2$, $LaNaO_2$, $SmNaO_2$, $(SmLiO_2)_{0.8}$ $(CaOMgO)_{0.2}$, $(LaLi_2)_{0.7}(SrOMgO)_{0.3}$, $(NdLiO_2)_{0.8}$ $(CaMgO)_{0.2}$, strontium-doped lanthium oxide supported on magnesium oxide, a material derived by processing a clay mineral with heat to a temperature and for time period above the temperature that the water of crystallization is removed and below a temperature and for time period that prevent complete transformation of the clay material to nonreversible crystalline and/or glass phases, a material derived by processing talc with heat to a temperature and for time period above the temperature that the water of crystallization is removed and below a temperature and for time period that prevent complete transformation of the talc material to nonreversible crystalline and/or glass, a material derived by processing a zeolite with heat to a temperature and for time period above the temperature that the water of crystallization is removed and below a temperature and for time period that prevent complete transformation of the zeolite material to non-reversible crystalline and/or glass phases, a material derived by processing Brucite with heat to a temperature and for time period above the temperature that the water of crystallization is removed and below a temperature and for time period that prevent complete transformation of the Brucite material to non-reversible crystalline material, a material derived by processing a Gibbsite with heat to a temperature and for time period above the temperature that the water of crystallization is removed and below a temperature and for time period that prevent complete transformation of the clay material to non-reversible crystalline material, and combinations thereof.

The clay mineral is selected from the group consisting of a montmorillonite, a ball clay, illite, dickite, halloysite, a mica, a zeolite, a koalinite, an illitic clay, pyropholite, Endellite, bentonite, chlorite, and combinations thereof.

The coating on the susceptor can be used as a reactant with a chemical species flow for desired products or with a pollutant species to treat pollutants for producing clean air which can be discharge into the environment in accordance with the law of the land.

The coating can be a carbon-containing species that reacts with a chemical species flow to produce hydrogen, higher order chemical species, lower order chemical species, carbon monoxide, carbon dioxide or combinations thereof.

The coating can contain a reactant selected from the group consisting of Na-beta alumina, Li-beta alumina, NaOH, LiOH, $CaCO_3$, $Ca(OH)_2$, gamma-alumina, alpha-alumina, lithium complexes, a lithium complex partially adsorbed on partially calcine bauxite, a sodium complex partially adsorbed on partially calcine bauxite, silica, a cation-doped silica or combination thereof, to chemically react with a chemical species flow containing a fluorine species, a chlorine species, a sulfur species, and combinations thereof.

The coating also can contain a reactant selected from the group consisting of urea, ammonia, cyanuric acid, ammonium carbamate, ammonium bicarbonate, mixtures of ammonia and ammonium bicarbonate, ammonium formate, ammoniumoxialate, sources of a nydroxyl radicals, sources of hydrogen radicals, milk, sugar, molasses, polysaccharides, a reducing agent, and combinations thereof, to chemically react with a chemical species flow containing a nitrogen oxide or nitrogen oxides to produce Nitrogen ($N_2$).

Particle-Size Effects, Materials for the Matrix, Applications, Materials Mixture, Physical Properties, Atmospheres, Operating Temperature and Other Properties The invention also is an electromagnetic susceptor for chemical processing comprising a matrix material that surrounds a non-matrix material that is made from a material that is different from the matrix material, wherein:

a. the matrix material is constructed of material having lower dielectric losses compared to the non-matrix material;

b. the non-matrix material initially absorbs electromagnetic energy applied to the electromagnetic susceptor to a greater extent than the matrix material;

c. the non-matrix material produces subsequent heat in the matrix material; and d. the greatest length of measurement of the electromagnetic susceptor is between one nanometer and 10 meters.

The non-matrix material also can produce reflection.

The susceptor can be used in an atmosphere selected from the group consisting of a reducing atmosphere, an oxidizing atmosphere, an atmosphere at one atmosphere of pressure, an atmosphere at less than one atmosphere of pressure, an atmosphere at greater than one atmosphere of pressure, and combinations thereof.

The susceptor's function can be selected from the group consisting of driving chemical reactions, assisting in chemical reactions, polymerization, producing biodiesel through catalysis, synthesizing pharmaceuticals, reducing nitrogen oxides to nitrogen ($N_2$), reducing NO to nitrogen ($N_2$), reducing $NO_2$ to NO, reducing $NO_2$ to nitrogen ($N_2$), reducing $SO_x$ to sulfur (S), reducing $SO_3$ to $SO_2$, reducing $SO_4$ to $SO_2$, reducing $SO_3$ to $SO_2$, chemical synthesis, sterilization, cracking hydrocarbons, decreasing the activation energy of a chemical process, oxidizing volatile organic compounds, oxidizing carbon monoxide to carbon dioxide, reducing NOx in the presence of hydrocarbons, synthesizing biodiesel, reforming a hydrocarbon with a hydrogen donor species in the presence of $H_2O$, reforming a hydrocarbon with methane in the presence of $H_2O$, reforming a hydrocarbon in the presence of methane, water and carbon dioxide, reforming a hydrocarbon in the presence of methane, water, hydrogen and carbon dioxide, reforming a hydrocarbon in the presence of hydrogen and methane, polymerizing a hydrocarbon in the presence of metal halides, reducing nitrogen oxides in the presence of ammonia, reducing nitrogen oxides in the presence of ammonium-containing compounds, treating pollutants to form clean air which can be discharged into the environment in accordance to the law of the land, oxidative bond cleavage of a hydrocarbon, non-oxidative bond cleavage of a hydrocarbon, catalysis, field concentration or combination thereof, wherein the reaction occurs in physical phases of matter from the group consisting of a plasma, gas, solid, liquid, a fluid containing particulates, and combinations thereof.

The operating temperature of the susceptor can be selected from the group consisting of operating conditions consisting of a temperature which is above the Curie temperature of all the susceptor's materials, a temperature which is below the Curie temperature of all the susceptor's materials, a temperature which is above Curie temperature of the non-matrix material only, a temperature which is above the Curie temperature of the matrix material only, a temperature which is above the Curie temperature of all the susceptor's materials causing increased absorption, a temperature which is above the Curie temperature of the non-matrix material causing increased absorption, a temperature which is above the Curie temperature of the matrix material causing increased absorption, a temperature above the thermal runaway temperature (critical temperature) of at least one of the constituent phases, a temperature which is below the thermal runaway temperature (critical temperature) of all the susceptor's constituent phases, a temperature which is below the activation temperature of the intrinsic dielectric conduction species of all the phases present, a temperature which is above the activation temperature of at least one intrinsic dielectric conducting species of all constituent phases, a temperature which is below the activation temperature of all extrinsic dielectric conducting species, a temperature which is above the activation temperature of at least one extrinsic dielectric conducting species of all the constituent phases, and combinations thereof.

The particle size of the non-matrix material through interaction with the applied electromagnetic energy can provide a utility to effect a physical property of said susceptor selected from the group consisting of mechanical properties, thermal properties, optical properties of the non-matrix material, optical properties of the susceptor, absorption of electromagnetic energy, reflection of electromagnetic energy, transmission of electromagnetic energy, scattering of electromagnetic energy, electromagnetic properties, corrosive properties, wear properties, piezoelectric properties, dielectric properties, magnetic properties, electric properties, susceptibility to the applied electromagnetic energy, susceptibility to the fluorescent electromagnetic energy, conductivity, controlling the chemical compatibility between the non-matrix material and the matrix material, regulating the temperature of said susceptor, regulating the temperature of a process, regulating the amount of electromagnetic energy available for chemical process, regulating the amount of electromagnetic energy available for a physical process, and combinations thereof.

The particle size of the matrix material through interaction with the applied electromagnetic energy can provide a utility to effect a physical property of said susceptor selected from the group consisting of mechanical properties, thermal properties, optical properties of the matrix material, optical properties of the susceptor, absorption of electromagnetic energy, reflection of electromagnetic energy, transmission of electromagnetic energy, scattering of electromagnetic energy, electromagnetic properties, corrosive properties, wear properties, piezoelectric properties, dielectric properties, magnetic properties, electric properties, susceptibility to the applied electromagnetic energy, susceptibility to the fluorescent electromagnetic energy, conductivity, controlling the chemical compatibility between the non-matrix material and the matrix material, regulating the temperature of said susceptor, regulating the temperature of a process, regulating the amount of electromagnetic energy available for chemical process, regulating the amount of electromagnetic energy available for a physical process, and combinations thereof.

The non-matrix material preferably has a particle size of less than the US Standard Mesh size 325. The particle size of the non-matrix material can be selected from the group consisting of mono-modal, multi-modal, heterogeneous and homogeneous particle sizes, and combinations thereof. The particle-size of the matrix material can be selected from the group consisting of mono-modal distribution, multi-modal distribution, heterogeneous and homogeneous particle sizes, and combinations thereof.

The matrix material can be selected from the group consisting of materials that are metallic, amorphous, polycrystalline, antiferromagnetic, antiferroelectric, paramagnetic, an artificial dielectric material where the volume fraction of the non-matrix species is less that 50 volume percent, an artificial dielectric material where the volume fraction of the non-matrix species is equal to or greater than 50 volume percent, a material that produces thermionic emissions, a material that is thermoelectric, a cermet, a material with a Curie temperature, glassy, metallic, ferrimagnetic, ferroelectric, ferromagnetic, semiconducting, conducting, a solid-state ionic conductor, a non-stoichiometric carbide, a non-stoichiometric oxide, an oxycarbide, an oxynitride, a carbonitride, an intermetallic, a hydroxide, a non-stoichiometric nitride, thermoluminescent, a non-stoichiometric Ilmenitic structure, fluorescent, a boride, a material with low dielectric constant and low dielectric losses, a material with a high dielectric constant and low dielectric losses, a silicide, a nitride, an aluminide, a material with a high dielectric constant and high dielectric losses, a material with a high dielectric constant and moderate dielectric losses, a carbide, an oxide, anatase, a sulfide, a sulfate, a carbonate, a glass ceramic, photochromatic, thermochromatic, a phase separated glass, an ionic conductor, and combinations thereof.

The matrix material also can be selected from group consisting of FeO, CuO $Cu_2O$, $MnO_2$ $Mn_2O_5$, NiO, $Fe_2O_3$, $Fe_3O_4$, $CuO-MnO_2$, $Cu_2O-MnO_2$, $Li_2O-Cu_2O$, $Li_2O-CuO$, $Li_2O-MnO_2$, SiC, WC, TiC, $TiC_{x-y}O_y$, $TiC_{1-x}$, $TiO_2$, non-stoichiometric titanium oxide, $Li_2O-NiO$, $TiO_2$ doped with a divalent cation, $TiO_2$ doped with a trivalent cation, $Fe_2O_3$ doped with $Ti^{+4}$, TiO, $Ti_2O_3$, non-stoichiometric zirconia oxide, anatase, beta"-alumina, alpha-alumina, Na-beta-alumina, Li-beta-alumina, (Na,Li)-beta-alumina, carbon, graphite, ZnO, CuS, FeS, CoO, calcium aluminate, char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, and combinations thereof.

The matrix material can be a composite material.

Defects can be introduced into a crystalline molecular structure of the constituent materials to effect the susceptor's physical properties selected from the group consisting of mechanical properties, thermal properties, chemical properties, optical properties, magnetic properties, electric properties, property of susceptibility to electromagnetic energy, conductivity, catalytic properties, electromagnetic properties, and combinations thereof. The defect can be selected from the group consisting of an intrinsic defect, an extrinsic defect, a defect from cation substitution, a defect from anion substitution, and combinations thereof.

The non-matrix material and matrix material can have the same Bravais lattice structure, similar crystalline structure and chemical composition where the non-matrix material contains ionic substitution which produces greater dielectric losses compared to the matrix material. The non-matrix material and matrix material also can have the same Bravais lattice structure, similar crystalline structure and similar chemical composition where at least one phase of the matrix material contains ionic substitution which produces greater dielectric losses compared to remaining matrix material.

The electromagnetic susceptor can further comprises a barrier coating between the non-matrix material and matrix material to prevent deleterious chemical reaction.

The electromagnetic susceptor also can have a constituent material used to decrease the power required to obtain the desired operating temperature for the desired use and the form of the constituent material is selected from the group consisting of a coating, non-matrix material, a matrix material, a field concentrator, and combinations thereof.

The susceptor can be used for the adsorption of a chemical species, absorption of a chemical species, or combinations thereof.

The thermal conductivity of the susceptor can be used to control the heat transfer between the dielectric susceptor and chemical species flow and the method of controlling the thermal conductivity of the dielectric susceptor is selected from the group consisting of controlling the pore structure, controlling the volume of the porosity, using a composite structure that contains a material with a high thermal conductivity, using a coating on the susceptor that increases the thermal conductivity of the susceptor's surface, grading the pore structure by flame polishing the outer surface of the dielectric susceptor, and combinations thereof.

The non-matrix material preferably has a thermal expansion mismatch between the non-matrix material and matrix of less than 20%.

The applied electromagnetic energy can initially intercepts the susceptor in a manner selected from the group consisting of one side of the susceptor, more than one side of the susceptor, all sides of the susceptor, at opposing sides of the susceptor and at adjacent sides of the susceptor, and at least one wavelength of applied electromagnetic initially entering the susceptor at set of opposing sides of the susceptor's surface that have the largest surface area of the susceptor with also at least one different wavelength of applied electromagnetic energy initially entering the susceptor at a different set of two opposing sides.

The dimensions of the susceptor can be designed to allow the susceptor to be placed into a cavity that allows for the cavity's dimensions to accommodate the optical dielectric properties of the applied electromagnetic energy or energies so to form a resonate cavity that accommodates a multiple of ¼ the wavelength of the applied electromagnetic energy in the susceptor with respect to the optical properties of the susceptor where the multiple is equal to or greater than one. At least one dimension of the susceptor can accommodate the largest wavelength when more then one wavelength is applied to the susceptor. The dimensions of the susceptor can be made to accommodate a specific transverse electromagnetic mode.

The susceptor can be placed in a cavity that has a shape that is selected from the group consisting of irregular shaped, orthorhombic, cylindrical, spherical, cubic, hemispherical, ellipsoidal, tubular, equilateral polyhedral, square, rectangular, and polyhedral. The cavity also can be tuned.

The interaction between the dielectric properties of at least one non-matrix material and at least one wavelength of the applied electromagnetic energy can be selected from the group of consisting of at least 5% transparency to at least one wavelength of applied electromagnetic energy, at least 5% absorption of at least one wavelength of applied electromagnetic energy, at least 5% scattering of at least one wavelength of applied electromagnetic energy, at least 5% reflection of at least one wavelength of applied electromagnetic energy, and combination thereof.

The interaction between the dielectric properties of the matrix material and at least one wavelength of the applied electromagnetic energy also can be selected from the group of consisting of at least 5% transparency to at least one wavelength of applied electromagnetic energy, at least 5% absorption of at least one wavelength of applied electromagnetic energy, at least 5% reflection of at least one wavelength of applied electromagnetic energy, at least 5% scattering of at least one wavelength of applied electromagnetic energy, and combinations thereof.

During the chemical process the temperature of at least part of the matrix material can be greater than the temperature of the non-matrix material. During the chemical process the temperature of at least part of the non-matrix material also can be greater than the temperature of the matrix material.

The matrix material can become reflective at a temperature greater than 0° C.

The susceptor can be used as a reactant with a chemical species flow for desired products or with a pollutant species to treat pollutants for producing clean air which can be discharge into the environment in accordance with the law of the land.

The susceptor can be a carbon-containing species that reacts with a chemical species flow to produce hydrogen, higher order chemical species, lower order chemical species, carbon monoxide, carbon dioxide or combinations thereof.

The susceptor can be a reactant selected from the group consisting of Na-beta alumina, Li-beta alumina, NaOH, LiOH, $CaCO_3$, $Ca(OH)_2$, gamma-alumina, alpha-alumina, lithium complexes, a lithium complex partially adsorbed on partially calcine bauxite, a sodium complex partially adsorbed on partially calcine bauxite, silica, a cation-doped silica or combination thereof, that chemically reacts with a chemical species flow containing a fluorine species, a chlorine species, a sulfur species, and combinations thereof.

The susceptor also can a reactant selected from the group consisting of urea, ammonia, cyanuric acid, ammonium carbamate, ammonium bicarbonate, mixtures of ammonia and ammonium bicarbonate, ammonium formate, ammoniumoxialate, sources of a nydroxyl radicals, sources of hydrogen radicals, milk, sugar, molasses, polysaccharides, a reducing agent, and combinations thereof, that chemically reacts with a chemical species flow containing a nitrogen oxide or nitrogen oxides to produce Nitrogen ($N_2$).

Clay Systems

The description of a material that is derived by a clay is important. There are at least four (4) ways that a clay can be described:

(1) An extrinsically bonded clay structure: The clay material using water or another binding agent for bonding the clay to create a structure. For example, a piece of pottery formed by throwing clay on a potter's wheel;

(2) Non extrinsic bonded clay structure and clay powder: A piece of pottery held together by van der Waals forces after a drying process has removed the bonding water, or dry clay powder;

(3) Crystalline species derived from a clay: Clay, whether as a formed structure or powder, can be heated above 1000° C. to synthesize an intimate mixture of mullite (an aluminosilicate phase) and a silica phase; and (4) An intermediate structure derived from a clay: The clay structure contains what is known in the trade as water of crystallization. An intermediate structure that is known as a pseudomorphic structure occurs when clay is heated above 500° C. Between about 500° C. to about 980° C. or greater, the pseudomorphic structure is the matrix of the original crystalline structure of the clay containing large anion vacancies from removal of ($OH^-$) ions from original crystalline structure. This pseudomorphic structure is probably metastable up to 1100° C. This temperature range is dependent upon atmospheric conditions and particle size.

The invention also is an electromagnetic susceptor for chemical processing having a matrix material that surrounds a non-matrix material that is made from a material that is different from the matrix material, wherein:

a. the matrix material is constructed of a sintered ceramic material having lower dielectric losses compared to the non-matrix material;

b. the non-matrix material initially absorbs electromagnetic energy applied to the electromagnetic susceptor to a greater extent than the matrix material; and c. the non-matrix material produces subsequent heat in the matrix material.

The non-matrix material also can produce reflection.

The matrix material can be a sintered ceramic having a composition that can have crystalline and glassy phases that is based upon magnesia-silica chemistry where the summation of the matrix material's weight fraction of magnesium (Mg), silica (Si) and oxygen (O) is at least 85% by weight, and comprises:

a. between 5% by weight and 99% by weight of the total weight of MgO in the matrix material, and up to 100% by weight of the MgO exists as a crystalline phase in a crystalline system selected from the group consisting of magnesium silicate, periclase, and combinations thereof;

b. between 5% by weight and 99% by weight of the total weight of $SiO_2$ in the matrix material and up to 100% by weight of the $SiO_2$ exists as a crystalline phase in a crystalline system selected from the group consisting of magnesium silicate, silica, and combinations thereof; and c. the balance of the matrix material's total weight being selected from cations other that Si and Mg substituted in a crystalline phase selected from the group consisting of magnesium silicate, silica, periclase, and combinations thereof, at least one cation species other than or in addition to Mg and Si in a glass phase, a crystalline phase other than magnesium silicate, silica and periclase that has at least one other cation species other than or in addition to Mg and Si, and combinations thereof.

The matrix material also can be a sintered ceramic having a composition which can have crystalline and glassy phases based upon alumina-silica chemistry where the summation of the matrix material's weight fraction of aluminum (Al), silica (Si) and oxygen (O) is at least 80% by weight, and comprises:

a. between 5% by weight and 99% by weight of the total weight of $Al_2O_3$ in the matrix material, and up to 100% by weight of the $Al_2O_3$ exists as a crystalline phase in a crystalline system selected from the group consisting of aluminosilicate, alumina, and combinations thereof;

b. between 5% by weight and 99% by weight of the total weight of $SiO_2$ in the matrix material, and up to 100% by weight of the $SiO_2$ exists as a crystalline phase in a crystalline system selected from the group consisting of aluminosilicate, silica, or combinations thereof; and c. the balance of the matrix material's total weight being selected from cations other than Al and Si substituted in a crystalline phase selected from the group consisting of an aluminosilicate, an alumina, a silica, and combinations thereof, at least one cation species other than or in addition to Si and Al in a glass phase, a crystalline phase other than aluminosilicate, silica and alumina that has at least one other cation species other than or in addition to Mg and Si, and combinations thereof.

The matrix material can be selected from the group consisting of stabilized zirconia, partially stabilized zirconia, and combinations thereof.

The electromagnetic susceptor can comprise a matrix material that is nonreflective of electromagnetic energy and that surrounds a non-matrix material that is reflective of electromagnetic energy and that is made from a material that is different from the matrix material and further comprising a field concentrator and a coating between said electromagnetic susceptor and said field concentrator that prevents deleterious chemical reaction between said electromagnetic susceptor and said field concentrator.

The field concentrator can be made from a material that is selected from the group consisting of a conductor, semiconductor, materials with a Curie temperature, and an ionic conducting ceramic. The field concentrator can be of a size that is designed to lessen any deleterious chemical reaction between materials of construction of the electromagnetic susceptor and the material of the field concentrator. The field concentrator also can be made from a material that is selected from the group consisting of $MnO_2$—CuO, $Li_2O$—

NiO, $Li_2O$—$MnO_2$, $Li_2O$—CuO, $TiO_2$ doped with a divalent cation, and $TiO_2$ doped with a trivalent cation, $Fe_2O_3$ with $Ti^{+4}$.

The matrix material can be selected from the group of crystalline phases consisting of enstatite, clino-enstatite, forsterite, cordierite, periclase, alpha-quartz, beta-quartz, alpha-trydimite, beta'-trydimite, beta"-trydimite, alpha-crystobalite, beta-crystobalite, an orthosilicate, a pyrosilicate, a metasilicate, wollastonite, albite, orthoclase, microcline, sillimanite, alpha-alumina, beta-alumina, gamma-alumina, mullite, olivine, anorthite, and combinations thereof.

At least a part of the matrix material can be a glassy phase selected group consisting of amorphous silica, aluminosilicate glass, aluminosilicate glass with glass modifiers, phosphate-based glass, phase separated glass, germanium-based glass, soda-lime-silicate glass, borosilicate glass, sodium silicate glass, calcium silicate glass, soda-lime-aluminosilicate glass, chalcogenide, and combinations thereof.

The matrix material also can be a sintered ceramic having a composition which has crystalline and glassy phases based upon magnesia-alumina-silica chemistry where the summation of the matrix material's weight fraction of aluminum (Al), magnesium (Mg), silica (Si) and oxygen (O) is at least 80% by weight, comprising:

a. between 5% by weight and 99% by weight of the total weight of $Al_2O_3$ in the matrix material, and up to 100% by weight of the $Al_2O_3$ exist as a crystalline phase in a crystalline system from the group consisting of magnesium aluminosilicate, alumina, aluminosilicate, magnesium aluminate, and combinations thereof;

b. between 5% by weight and 99% by weight of the total weight of MgO in the matrix material, and up to 100% by weight of the MgO exists as a crystalline phase in a crystalline system selected from the group consisting of magnesium aluminosilicate, magnesium silicate, periclase, magnesium aluminate, and combinations thereof;

c. between 5% by weight and 99% by weight of the total weight $SiO_2$ in the matrix material, and up to 100% by weight of the $SiO_2$ exists as a crystalline phase in a crystalline system selected from the group consisting of silica, magnesium aluminosilicate, magnesium silicate, and combinations thereof; and d. the balance of the matrix material's total weight being selected from other than Mg, Al and Si substituted in a crystalline phase in a crystalline system selected from the group consisting of aluminosilicate, magnesium aluminosilicate, magnesium silicate, magnesium aluminate, alumina, silica, periclase, and combinations thereof, at least one other cation species other than or in addition to Mg, Al and Si in a glass phase, a crystalline phase other than magnesium aluminosilicate, aluminosilicate, magnesium silicate, magnesium aluminate, silica, periclase and alumina that has at least one other cation species other than or in addition to Mg, Al, and Si, and combinations thereof.

The matrix material can be selected from the group consisting of alumina, aluminosilicate ceramic, magnesium aluminosilicate ceramic, magnesium silicate, calcium silicate, crystalline form of silica, calcium aluminosilicate, clay, zeolite, magnesium oxide, sialon, oxynitride, inorganic glass, organic glass, organic polymer, crystalline organic polymer, solid solution, ceramic matrix composite, metal matrix composite, polymer composite, cordierite, quartz, enstatite, forsterite, steatite, nitride, porcelain, high-temperature porcelain, glass ceramic, phase separated glass, lithium-aluminosilicate, Teflon, organic copolymer, polycarbonate, polypropylene, polystyrene, polyethylene, polyester, polytetrafluoroethylene, materials derived by processing a clay mineral with heat to a temperature and for time period above the temperature that the water of crystallization is removed and below a temperature and for time period that prevent complete transformation of the clay material to nonreversible crystalline and/or glass phases, materials derived by processing talc with heat to a temperature and for time period above the temperature that the water of crystallization is removed and below a temperature and for time period that prevent complete transformation of the talc material to nonreversible crystalline and/or glass, a material derived by processing a zeolite with heat to a temperature and for time period above the temperature that the water of crystallization is removed and below a temperature and for time period that prevent complete transformation of the zeolite material to non-reversible crystalline and/or glass phases, materials derived by processing Brucite with heat to a temperature and for time period above the temperature that the water of crystallization is removed and below a temperature and for time period that prevent complete transformation of the Brucite material to non-reversible crystalline material, materials derived by processing a Gibbsite with heat to a temperature and for time period above the temperature that the water of crystallization is removed and below a temperature and for time period that prevent complete transformation of the clay material to non-reversible crystalline material, and combinations thereof.

The matrix material can be selected from the group consisting of thermoluminescent materials, fluorescent materials, low-loss dielectrics, and combinations thereof. The fluorescent materials fluoresce upon exposure of a dye to the applied electromagnetic energy and the dye is embedded in a matrix that is primarily transparent to the radiation emitted from the dye. The fluorescent materials produce fluorescent radiation selected from the group of electromagnetic frequencies consisting of ultraviolet radiation, visible radiation, infrared radiation, and combinations thereof.

The non-matrix material can be selected from the group consisting of materials that are amorphous, metallic, ferrimagnetic, ferroelectric, ferromagnetic, semiconducting, conducting, solid-state ionic conductor, non-stoichiometric carbides, non-stoichiometric oxides, oxycarbides, oxynitrides, carbonitrides, intermetallic, thermoluminescent, fluorescent, borides, suicides, nitrides, aluminides, carbides, oxides, sulfides, composite materials, organic polymeric matrix composites, ceramic matrix composites, metal matrix composites, organic copolymers, amorphous organic polymers, crystalline organic polymers, polycarbonates, polypropylene, polystyrene, polyethylene, polyester, polytetrafluoroethylene, solid solutions, sulfates, non-stoichiometric illmenitic structures, mica, non-stoichiometric zinc oxide, non-stoichiometric nitrides, crystalline forms of silica, antiferromagnetics, antiferroelectrics, materials with low dielectric constant and low dielectric losses, materials with high dielectric constant and low dielectric losses, paramagnetics, materials with high dielectric constant and high dielectric losses, materials with a high dielectric constant and moderate dielectric losses, hydroxides, thermochromatics, photochromatics, metal alloys, artificial dielectric materials where the volume fraction of the non-matrix species is less that 50 volume percent, artificial dielectric materials where the volume fraction of the non-matrix species is equal to or greater than 50 volume percent, materials that produce thermionic emissions, materials that are thermoelectric, cermet, materials with a Curie temperature, sulfates, anatase, carbonate, materials derived by processing a clay mineral with heat to a temperature and for time period above the temperature that the water of crystallization is removed and below a temperature and for time period that prevent complete transformation of the clay material to non-reversible crystalline and/or glass phases, materials derived by processing talc with heat to a temperature and for time period above the temperature that the water of crystallization is removed and below a temperature and for time period that prevent complete transformation of the talc material to non-reversible crystalline and/or glass, materials derived by processing a zeolite with heat to a temperature and for time period above the temperature that the water of crystallization is removed and below a temperature and for time period that prevent complete transformation of the zeolite material to non-reversible crystalline and/or glass phases, materials derived by processing Brucite with heat to a temperature and for time period above the temperature that the water of crystallization is removed and below a temperature and for time period that prevent complete transformation of the Brucite material to nonreversible crystalline material, materials derived by processing a Gibbsite with heat to a temperature and for time period above the temperature that the water of crystallization is removed and below a temperature and for time period that prevent complete transformation of the clay material to nonreversible crystalline material, and combinations thereof. The non-matrix material also can be selected from the group consisting of FeO, CuO $Cu_2O$, $MnO_{62}$, $Mn_2O_5$, NiO, $Fe_2O_3$, $Fe_3O_4$, $CuO-MnO_2$, $Cu_2O-MnO_2$, $Li_2O-Cu_2O$, $Li_2O-CuO$, $Li_2O-MnO_2$, $Li_2O-NiO$, ZnO and combinations thereof.

The non-matrix material further can be selected from the group consisting, SiC, WC, TiC, $TiC_{x-y}O_y$, $TiC_{1-x}$, $TiO_2$, $TiO_2$ doped with a divalent cation, $TiO_2$ doped with a trivalent cation, $Fe_2O_3$ doped with $Ti^{+4}$, a non-stoichiometric titanium oxide, TiO, $Ti_2O_3$, a non-stoichiometric zirconia oxide, anatase, beta"-alumina, alpha-alumina, Na-beta-alumina, Li-beta-alumina, (Na, Li)-beta-alumina, a carbon, a graphite, CuS, FeS, CoO, a calcium aluminate, a char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, quartz, a crystalline form of silica, and combinations thereof.

The applied electromagnetic energy can be a radiation selected from the group consisting of ultra-violet, infrared, microwave, visible, radio frequency, 915 MHz, 2.45 GHz, a variable frequency source, and combinations thereof.

The structure of the susceptor can be selected from the group consisting of chiral-shaped, spire-like shaped, helical shaped, rod-like shaped, plate-like shaped, acicular shaped, spherical shaped, ellipsoidal shaped, disc-shaped, irregular-shaped, plate-like shaped, a shape of a spiral antenna species for at least one wavelength of applied electromagnetic energy, a shape of an antenna specified for at least on wavelength of applied electromagnetic energy, needlelike shaped, twist shaped, rotini shaped, a woven structure and honeycomb-like structure, multi-cell structure, cylindrical shaped, tubular shaped, a reticulated structure, a foamed structure, a capillary structure, and combinations thereof.

The shape of the non-matrix material can be selected from a group consisting of chiral, spire-like, helical, rod-like, plate-like, acicular, spherical, ellipsoidal, disc-shaped, irregular-shaped, plate-like, needle-like, and twist.

The interaction between the dielectric properties of the susceptor and at least one wavelength of the applied electromagnetic energy can be selected from the group of interactions with applied electromagnetic energy consisting of at least 5% transparent to at least one wavelength of applied electromagnetic energy, at least 5% scattering to at least one wavelength of applied electromagnetic energy, at least 5% absorptive of at least one wavelength of applied electromagnetic energy, at least 5% reflective of at least one wavelength of applied electromagnetic energy, and combinations thereof.

The non-matrix material can have a volume fraction greater than 50% and less than 98%. The non-matrix material can have a volume fraction greater than 0.001% and less than or equal to 50%.

The susceptor can further comprise a coating, a catalyst, and/or a field concentrator.

The susceptor can have a volume fraction of porosity and pore-size distribution which are used to control the physical properties of the susceptor selected from the group consisting of dielectric properties, thermal properties, mechanical properties, optical properties, corrosive properties, magnetic properties, electric properties, conductive properties, absorptive properties, susceptibility of applied electromagnetic energy, wear properties, and combinations thereof.

The matrix material also can be a sintered ceramic having a composition which has crystalline and glassy phases based upon magnesia-alumina-silica chemistry where the summation of the matrix material's weight fraction of aluminum (Al), magnesium (Mg), silica (Si) and oxygen (O) is at least 80% by weight, wherein:

a. the weight percent of $Al_2O_3$ in the matrix material is between 5% by weight and 99% by weight, and up to 100% by weight of the $Al_2O_3$ exists as a crystalline phase in a crystalline system from the group consisting of magnesium aluminosilicate, alumina, aluminosilicate, magnesium aluminate, and combinations thereof;

b. the weight percent of MgO in the matrix material is between 5% by weight and 99% by weight, and up to 100% by weight of the MgO exists as a crystalline phase in a crystalline system selected from the group consisting of magnesium aluminosilicate, magnesium silicate, periclase, magnesium aluminate, and combinations thereof;

c. the weight percent $SiO_2$ in the matrix material is between 5% by weight and 99% by weight, and up to 100% by weight of the $SiO_2$ exists as a crystalline phase in a crystalline system selected from the group consisting of silica, magnesium aluminosilicate, magnesium silicate, and combinations thereof; and d. the balance of the matrix material's weight percent is cation substitution other than Mg, Al and Si in a crystalline phase in a crystalline system selected from the group consisting of aluminosilicate, magnesium aluminosilicate, magnesium silicate, magnesium aluminate, alumina, silica, periclase, and combinations thereof, at least one other cation species other than or in addition to Mg, Al and Si in a glass phase, a crystalline phase other than magnesium aluminosilicate, aluminosilicate, magnesium silicate, magnesium aluminate, silica, periclase and alumina that has at least one other cation species other than or in addition to Mg, Al, and Si, and combinations thereof.

The matrix material also can be a sintered ceramic having a composition which has crystalline and glassy phases based upon calcia-alumina-silica chemistry where the summation of the matrix material's weight fraction of aluminum (Al), calcium (Ca), silica (Si) and oxygen (O) is at least 80% by weight, wherein:

a. The weight percent of $Al_2O_3$ in the matrix material is between 5% by weight and 99% by weight, and up to 100% by weight the $Al_2O_3$ exist as a crystalline phase in a crystalline system from the group consisting of calcium aluminosilicate, alumina, calcium aluminate, aluminosilicate, and combinations thereof;

b. the weight percent of CaO in the matrix material is between 5% by weight and 99% by weight, and up to 100% by weight of the CaO exists as a crystalline phase in a crystalline system selected from the group consisting of calcium aluminosilicate, calcium silicate, calcium aluminate, calcia, and combinations thereof;

c. the weight percent $SiO_2$ in the matrix material is between 5% by weight and 99% by weight, and up to 100% by weight of the $SiO_2$ exists as a crystalline phase in a crystalline system selected from the group consisting of silica, calcium aluminosilicate, calcium silicate, and combinations thereof; and d. the balance of the matrix material's weight is cation substitution other than Ca, Al and Si in a crystalline phase in a crystalline system selected from the group consisting of aluminosilicate, calcium aluminosilicate, calcium aluminate, calcium silicate, alumina, calcia, silica, and combinations thereof, at least one other cation species other than or in addition to Ca, Al and Si in a glass phase, a crystalline phase other than a calcium aluminosilicate, calcium aluminate, aluminosilicate, calcium silicate, silica, calcia and alumina that has at least one other cation species other than or in addition to Ca, Al, and Si, and combinations thereof.

Ozone Production

The invention also includes a method of producing ozone from interaction on an electromagnetic susceptor between field concentrators on the electromagnetic susceptor and applied electromagnetic energy applied to the susceptor, comprising the steps of:

a. controlling the distance between field concentrators on the electromagnetic susceptor;

b. using a low loss, low dielectric constant material of construction for the electromagnetic susceptor; and c. applying electromagnetic energy to the electromagnetic susceptor to produce ozone.

A second embodiment of the method of producing ozone from interaction on an electromagnetic susceptor, comprises the steps of:

a. providing an electromagnetic susceptor having a matrix material that is nonreflective of electromagnetic energy and that surrounds a non-matrix material that is reflective of electromagnetic energy and that is made from a material that is different from the matrix material, wherein the non-matrix material has exposed surfaces;

b. controlling the distance between the exposed surfaces of the non-matrix material;

c. using a matrix material that has a low dielectric losses and low dielectric constant; and d. applying electromagnetic energy to the electromagnetic susceptor to produce ozone.

I claim:

1. A coated susceptor of electromagnetic energy for chemical processing comprising:

a matrix material that surrounds a non-matrix material that is made from a material that is different from the matrix material, wherein the matrix material is constructed of material having lower dielectric losses compared to the non-matrix material, wherein:

a. the non-matrix material initially absorbs electromagnetic energy applied to the electromagnetic susceptor to a greater extent than the matrix material;

b. the non-matrix material produces subsequent heat in the matrix material; and c. the surface of the susceptor is coated with a material that interacts with applied electromagnetic energy of at least one frequency and initially absorbs electromagnetic energy and produces heat.

2. The coated susceptor of electromagnetic energy as claimed in claim 1, wherein the form of said coating is selected from the group consisting of a full coating on all susceptor surfaces, a full coating on a surface, a partial coating on a surface, a partial coating on all susceptor surfaces, a coating with a specific pattern, a coating containing a homogeneous material, a coating containing a composite material, a partial coating containing a more than one material, a patterned coating containing more than one material, a coating containing multiple layers of different material, and combinations thereof.

3. The coated susceptor of electromagnetic energy as claimed in claim 1, wherein the weight fraction of said non-matrix material is greater than 0.00001 weight percent and less than 50 weight percent.

4. The coated susceptor of electromagnetic energy as claimed in claim 1, wherein the weight fraction of said non-matrix material is greater than 50 weight percent and less 99.9 weight percent.

5. The coated susceptor of electromagnetic energy as claimed in claim 1, wherein said coating has optical dielectric properties in relation to the applied electromagnetic energy selected from the group consisting of transparent, reflective, scattering, absorptive, and combinations thereof.

6. The coated susceptor of electromagnetic energy as claimed in claim 1, wherein said coating provides a utility to effect a physical property of said susceptor selected from the group consisting of mechanical properties, thermal properties, optical properties of the non-matrix material, optical properties of the susceptor, absorption of electromagnetic energy, reflection of electromagnetic energy, transmission of electromagnetic energy, scattering of electromagnetic energy, electromagnetic properties, corrosive properties, wear properties, piezoelectric properties, dielectric properties, magnetic properties, electric properties, susceptibility to the applied electromagnetic energy, susceptibility to the fluorescent electromagnetic energy, conductivity, controlling the chemical compatibility between the non-matrix material and the matrix material, regulating the temperature of said susceptor, regulating the temperature of a process, regulating the amount of electromagnetic energy available for chemical process, regulating the amount of electromagnetic energy available for a physical process, and combinations thereof.

7. The coated susceptor of electromagnetic energy as claimed in claim 1, wherein said physical properties are controlled by the thickness of the coating.

8. The coated susceptor of electromagnetic energy as claimed in claim 1, wherein said susceptor is used in an atmosphere selected from the group consisting of a reducing atmosphere, an oxidizing atmosphere, an atmosphere at one atmosphere of pressure, an atmosphere at less than one atmosphere of pressure, an atmosphere at greater than one atmosphere of pressure, and combinations thereof.

9. The coated susceptor of electromagnetic energy as claimed in claim 1, wherein said coating is constructed of a material selected from the group consisting of metallic, amorphous, polycrystalline, antiferromagnetic, antiferroelectric, paramagnetic, a material with a Curie temperature, glassy, metallic, ferrimagnetic, ferroelectric, ferromagnetic, semiconducting, conducting, a solid-state ionic conductor, a non-stoichiometric carbide, a non-stoichiometric oxide, an oxycarbide, a material that produces thermionic emissions, a material that is thermoelectric, a cermet, a ceramic glaze with metal particles, an oxynitride, a carbonitride, an intermetallic, a hydroxide, a non-stoichiometric nitride, thermoluminescent, a composite material, an organic polymeric matrix composite, a ceramic matrix composite, a metal matrix composite, a crystalline form of silica, fused silica, quartz, a organic copolymer, an amorphous organic polymer, a crystalline organic polymer, polycarbonate, polypropylene, polystyrene, polyethylene, polyester, polytetrafluoroethylene, a non-stoichiometric llmenitic structure, fluorescent, an artificial dielectric material, an artificial dielectric material where the volume fraction of the non-matrix species is less that 50 volume percent, an artificial dielectric material where the volume fraction of the non-matrix species is equal to or greater than 50 volume percent, a boride, a material with low dielectric constant and low dielectric losses, a material with a high dielectric constant and low dielectric losses, a silicide, a nitride, an aluminide, a material with a high dielectric constant and high dielectric losses, a material with a high dielectric constant and moderate dielectric losses, a carbide, an oxide, anatase, a sulfide, a sulfate, a crystalline form of silica, a carbonate, a glass ceramic, photochromatic, thermochromatic, a phase separated glass, an ionic conductor, a material derived by processing a clay mineral with heat to a temperature and for time period above the temperature that the water of crystallization is removed and below a temperature and for time period that prevent complete transformation of the clay material to non-reversible crystalline and/or glass phases, a material derived by processing talc with heat to a temperature and for time period above the temperature that the water of crystallization is removed and below a temperature and for time period that prevent complete transformation of the talc material to non-reversible crystalline and/or glass, a material derived by processing a zeolite with heat to a temperature and for time period above the temperature that the water of crystallization is removed and below a temperature and for time period that prevent complete transformation of the zeolite material to non-reversible crystalline and/or glass phases, a material derived by processing Brucite with heat to a temperature and for time period above the temperature that the water of crystallization is removed and below a temperature and for time period that prevent complete transformation of the Brucite material to non-reversible crystalline material, and a material derived by processing a Gibbsite with heat to a temperature and for time period above the temperature that the water of crystallization is removed and below a temperature and for time period that prevent complete transformation of the clay material to non-reversible crystalline material or combination thereof.

10. The coated susceptor of electromagnetic energy as claimed in claim 9, wherein said coating is constructed of a clay mineral selected from the group consisting of a montmorillonite, a ball clay, illite, dickite, halloysite, a mica, a zeolite, a koalinite, an illitic clay, pyropholite, Endellite, bentonite, chlorite and combinations thereof.

11. The coated susceptor of electromagnetic energy as claimed in claim 1, wherein said coating is constructed of a material selected from the group consisting of FeO, CuO $Cu_2O$, $MnO_2$, $Mn_2O_5$, NiO, $Fe_2O_3$, $Fe_3O_4$, $CuO-MnO_2$, $Cu_2O-MnO_2$, $Li_2O-Cu_2O$, $Li_2O-CuO$, $Li_2O-MnO_2$, SiC, WC, TiC, $TiC_{x-y}O_y$, $TiC_{1-x}$, $TiO_2$, non-stoichiometric titanium oxide, $Li_2O$-NiO, $TiO_2$ doped with a divalent cation, $TiO_2$ doped with a trivalent cation, $Fe_2O_3$ doped with $Ti^{+4}$, TiO, $Ti_2O_3$, non-stoichiometric zirconia oxide, anatase, beta"-alumina, alpha-alumina, Na-beta-alumina, Li-beta-alumina, (Na,Li)-beta-alumina, carbon, graphite, ZnO, CuS, FeS, CoO, calcium aluminate, char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, and combinations thereof.

12. The coated susceptor of electromagnetic energy as claimed in claim 1, wherein said coating is an amorphous material that is at a temperature below the material's glass transition temperature during the chemical processing.

13. The coated susceptor of electromagnetic energy as claimed in claim 1, wherein the frequency of said applied electromagnetic energy is selected from the group consisting of visible, ultraviolet, radio frequency, microwave, infrared, a variable frequency source, 915 MHz, 2.59 GHz, and combinations thereof.

14. The coated susceptor of electromagnetic energy as claimed in claim 1, wherein the structure of said susceptor is selected from the group consisting of chiral-shaped, spire-like shaped, helical shaped, rod-like shaped, plate-like shaped, acicular shaped, spherical shaped, ellipsoidal shaped, disc-shaped, irregular-shaped, plate-like shaped, a shape of a spiral antenna species for at least one wavelength of applied electromagnetic energy, a shape of an antenna specified for at least on wavelength of applied electromagnetic energy, needle-like shaped, twist shaped, rotini shaped, a woven structure and honeycomb-like structure, multi-cell structure, cylindrical shaped, tubular shaped, a reticulated structure, a foamed structure, a capillary structure, and combinations thereof.

15. The coated susceptor of electromagnetic energy as in claim 14, wherein the coated susceptor is permeable to a chemical species flow.

16. The coated susceptor of electromagnetic energy as claimed in claim 1, wherein the coated susceptor is used as a plurality of susceptors for chemical processing in the form of an operation selected from the group consisting of fluidized bed, a slurry, a fluid mixture of susceptors and chemicals species flow, a gaseous mixture of particulate susceptors and a chemical species flow, a packed bed, a solid mixture of particulate susceptors and a solid chemical species flow, and combination thereof.

17. The coated susceptor of electromagnetic energy as claimed in claim 1, wherein said coating becomes reflective at the operating temperature of the chemical processing.

18. The coated susceptor of electromagnetic energy as claimed in claim 1, further comprising a field concentrator wherein the location of the field concentrator is selected group from the group consisting of on the coating, embedded in the coating, in the coating, and combinations thereof.

19. The coated susceptor of electromagnetic energy as claimed in claim 1, wherein said coating is function is selected from the group consisting of driving chemical reactions, assisting in chemical reactions, polymerization, producing biodiesel through catalysis, synthesizing pharmaceuticals, reducing nitrogen oxides to nitrogen ($N_2$), reducing NO to nitrogen ($N_2$), reducing $NO_2$ to NO, reducing $NO_2$ to nitrogen ($N_2$), reducing $SO_x$ to sulfur (S), reducing $SO_3$ to $SO_2$, reducing $SO_4$ to $SO_2$, reducing $SO_3$ to $SO_2$, chemical synthesis, sterilization, cracking hydrocarbons, decreasing the activation energy of a chemical process, oxidizing volatile organic compounds, oxidizing carbon monoxide to carbon dioxide, reducing NOx in the presence of hydrocarbons, synthesizing biodiesel, reforming a hydrocarbon with a hydrogen donor species in the presence of $H_{23}$, reforming a hydrocarbon with methane in the presence of $H_{23}$, reforming a hydrocarbon in the presence of methane, water and carbon dioxide, reforming a hydrocarbon in the presence of methane, water, hydrogen and carbon dioxide, reforming a hydrocarbon in the presence of hydrogen and methane, polymerizing a hydrocarbon in the presence of metal halides, reducing nitrogen oxides in the presence of ammonia, reducing nitrogen oxides in the presence of ammonium-containing compounds, treating pollutants to form clean air which can be discharged into the environment in accordance to the law of the land, oxidative bond cleavage of a hydrocarbon, non-oxidative bond cleavage of a hydrocarbon, catalysis, field concentration or combination thereof, wherein the reaction occurs in physical phases of matter from the group consisting of a plasma, gas, solid, liquid, a fluid containing particulates, and combinations thereof.

20. The coated susceptor of electromagnetic energy as claimed in claim 1, wherein the operating temperature of said susceptor is selected from the group of operating conditions consisting of a temperature which is above the Curie temperature of all the susceptor's materials, a temperature which is below the Curie temperature of all the susceptor's materials, a temperature which is above Curie temperature of the non-matrix material only, a temperature which is above the Curie temperature of the matrix material only, a temperature which is above the Curie temperature of all the susceptor's materials causing increased absorption, a temperature which is above the Curie temperature of the non-matrix causing increased absorption, a temperature which is above the Curie temperature of the matrix causing increased absorption, a temperature above the thermal runaway temperature (critical temperature) of at least one of the constituent phases, a temperature which is below the thermal runaway temperature (critical temperature) of all the constituent phases, a temperature which is below the activation temperature of the intrinsic dielectric conduction species of all the phases present, a temperature which is above the activation temperature of at least one intrinsic dielectric conducting species of all constituent phases, a temperature above the Curie temperature of the coating's material, a temperature which is below the activation temperature of all extrinsic dielectric conducting species, a temperature which is above the activation temperature of at least one extrinsic dielectric conducting species of all the constituent phases, and combinations thereof.

21. The coated susceptor of electromagnetic energy as claimed in claim 1, wherein said coating is selected from the group consisting of controlling the amount of absorption of the applied electromagnetic energy by said susceptor material, regulating the temperature of the susceptor, controlling the amount of reflectivity of the applied electromagnetic energy by said susceptor, and combinations thereof.

22. The coated susceptor of electromagnetic energy as claimed in claim 1 where the applied electromagnetic energy is applied in the form of continuous energy, pulsed energy or a combination thereof.

23. The coated susceptor of electromagnetic energy as claimed in claim 1, wherein said coating contains a material with catalytic properties.

24. The coated susceptor of electromagnetic energy as claimed in claim 23, wherein the material with catalytic properties has a molecular structure selected from the group consisting of amorphous, rock salt, zinc blend, antifluorite, rutile, perovskite, spinel, inverse spinel, nickel arsenide, corundum, ilimenite, olivine, cesium chloride, fluorite, silica types, wurtzite, derivative structure of a known crystalline structure, a superstructure of a known crystalline structure, orthosilicate, metasilicate, gibbsite, graphite, zeolite, carbide, nitride, montmorillonite, pyrophyllite, intermetallic semiconductor, metallic semiconductor, garnet, psuedoperovskite, orthoferrite, hexagonal ferrite, rare earth garnet, and a ferrite.

25. The coated susceptor of electromagnetic energy as claimed in claim 23, wherein the material with catalytic properties has electronic properties selected from the group consisting of a p-type material, an n-type material, a cation-doped p-type dominate material, an anion-doped p-type dominate materials, a cation-doped n-type dominate material, an anion-doped n-type material, and combinations thereof.

26. The coated susceptor of electromagnetic energy as claimed in claim 23, wherein a barrier coating is place between said coating material with catalytic properties and said susceptor to prevent deleterious chemical reaction between said coating material with catalytic properties and the susceptor, to help prevent the poisoning of the catalyst, or to help prevent a combination thereof.

27. The coated susceptor of electromagnetic energy as claimed in claim 23, wherein the form of the catalytic material is selected from the group consisting of a catalyst that is a full coating on all susceptor surfaces, a catalyst that is partial coating on all susceptor surfaces, a catalyst that is particulate catalyst on the susceptor's surface, a catalyst that is particulate catalyst contained in a coating that is on the susceptor, a catalyst that is particulate catalyst on a coating that is on the susceptor, a catalyst that is full coating of all susceptor surfaces that has an additional coating between the catalyst and the susceptor, a catalyst that is a partial coating of all susceptor surfaces that has an additional coating between the catalyst and the susceptor, and combinations thereof.

28. The coated susceptor of electromagnetic energy as claimed in claim 23, wherein the material with catalytic properties is a composite selected from the group of catalytic composites consisting of two or more catalysts that perform the same function, two or more catalysts where at least one catalyst performs a different function than the other catalyst, two or more catalysts where at least one catalyst is a metallic species, two or more catalyst where at least one catalyst has a Curie temperature, and combinations thereof.

29. The coated susceptor of electromagnetic energy as claimed in claim 23, wherein the material with catalytic properties has a function is selected from the group consisting of driving chemical reactions, assisting in chemical reactions, polymerization, producing biodiesel through catalysis, synthesizing pharmaceuticals, reducing nitrogen oxides to nitrogen ($N_2$), reducing NO to nitrogen ($N_2$), reducing $NO_2$ to NO, reducing $NO_2$ to nitrogen ($N_2$), reducing $SO_x$ to sulfur (S), reducing $SO_3$ to $SO_2$, reducing $SO_4$ to $SO_2$, reducing $SO_3$ to $SO_2$, chemical synthesis, sterilization, cracking hydrocarbons, decreasing the activation energy of a chemical process, oxidizing volatile organic compounds, oxidizing carbon monoxide to carbon dioxide, reducing NOx in the presence of hydrocarbons, synthesizing biodiesel, reforming a hydrocarbon with a hydrogen donor species in the presence of $H_{23}$, reforming a hydrocarbon with methane in the presence of $H_{23}$, reforming a hydrocarbon in the presence of methane, water and carbon dioxide, reforming a hydrocarbon in the presence of methane, water, hydrogen and carbon dioxide, reforming a hydrocarbon in the presence of hydrogen and methane, polymerizing a hydrocarbon in the presence of metal halides, reducing nitrogen oxides in the presence of ammonia, reducing nitrogen oxides in the presence of ammonium-containing compounds, treating pollutants to form clean air which can be discharged into the environment in accordance to the law of the land, oxidative bond cleavage of a hydrocarbon, non-oxidative bond cleavage of a hydrocarbon, catalysis, field concentration or combination thereof, wherein the reaction occurs in physical phases of matter from the group consisting of a plasma, gas, solid, liquid, a fluid containing particulates, and combinations thereof.

30. The coated susceptor of electromagnetic energy as claimed in claim 23, wherein the material with catalytic properties is selected from the group of materials consisting of a photocatalytic material activated by electromagnetic energy in the ultraviolet region, a photo catalytic material activated by electromagnetic energy in the visible region, a infrared catalytic materials activated by electromagnetic energy in the infrared region, a catalytic materials activated by electromagnetic energy in the microwave region, a catalytic material activated by electromagnetic energy in the radio frequency region, and combinations thereof.

31. The coated susceptor of electromagnetic energy as claimed in claim 23, where the material with catalytic properties is selected from the group of consisting of materials that are a precious metal, Fe, Co, Ni, Pt, Pd, Au, Ag, chalcogenide, metal alloy, boride, Fe-based alloy, a precious metal alloy, an artificial dielectric, an artificial dielectric material where the volume fraction of the non-matrix species is less that 50 volume percent, an artificial dielectric material where the volume fraction of the non-matrix species is equal to or greater than 50 volume percent, Co-alloy, Ni-alloy, antiferromagnetic, antiferroelectric, paramagnetic, a material with a Curie temperature, glassy, metallic, a material that produces thermionic emissions, a material that is thermoelectric, a cermet, a ceramic glaze with metal particles, ferrimagnetic, ferroelectric, ferromagnetic, semiconducting, conducting, solid-state ionic conductor, non-stoichiometric carbide, non-stoichiometric oxide, oxycarbide, oxynitride, carbonitride, oxide, nitride, intermetallic, hydroxide, thermoluminescent, fluorescent, boride, a material with low dielectric constant and low dielectric losses, a material with a high dielectric constant and low dielectric losses, silicide, nitride, aluminide, a material with a high dielectric constant and high dielectric losses, a material with a high dielectric constant and moderate dielectric losses, carbide, oxide, anatase, sulfide, sulfate, carbonate, FeO, CuO $Cu_2O$, $MnO_2$ $Mn_2O_5$, NiO, $Fe_2O_3$, $Fe_3O_4$, CuO—$MnO_2$, Li2O—NiO, $TiO_2$ doped with a divalent cation, $TiO_2$ doped with a trivalent cation, $Fe_2O_3$ doped with $Ti^{+4}$, $Cu_2O$—$MnO_2$, $Li_2O$—$Cu_2O$, $Li_2O$—CuO, $Li_2O$—$MnO_2$, SiC, WC, TiC, $TiC_{x-y}O_y$, $TiC_{1-x}$, $TiO_2$, non-stoichiometric titanium oxide, TiO, $Ti_2O_3$, non-stoichiometric zirconia oxide, anatase, beta"-alumina, alpha-alumina, Na-beta-alumina, Li-beta-alumina, (Na,Li)-beta-alumina, carbon, graphite, ZnO, CuS, FeS, CoO, calcium aluminate, char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, $ZnO_{1-x}$, $SmLiO_2$, $LaLiO_2$, $LaNaO_2$, $SmNaO_2$, $(SmLiO_2)_{0.8}(CaOMgO)_{0.2}$, $(LaLi_2)_{0.7}(SrOMgO)_{0.3}$, $(NdLiO_2)_{0.8}(CaMgO)_{0.2}$, strontium-doped lanthanum oxide supported on magnesium oxide, a material derived by processing a clay mineral with heat to a temperature and for time period above the temperature that the water of crystallization is removed and below a temperature and for time period that prevent complete transformation of the clay material to non-reversible crystalline and/or glass phases, a material derived by processing talc with heat to a temperature and for time period above the temperature that the water of crystallization is removed and below a temperature and for time period that prevent complete transformation of the talc material to non-reversible crystalline and/or glass, a material derived by processing a zeolite with heat to a temperature and for time period above the temperature that the water of crystallization is removed and below a temperature and for time period that prevent complete transformation of the zeolite material to non-reversible crystalline and/or glass phases, a material derived by processing Brucite with heat to a temperature and for time period above the temperature that the water of crystallization is removed and below a temperature and for time period that prevent complete transformation of the Brucite material to non-reversible crystalline material, a material derived by processing a Gibbsite with heat to a temperature and for time period above the temperature that the water of crystallization is removed and below a temperature and for time period that prevent complete transformation of the clay material to non-reversible crystalline material, and combinations thereof.

32. The coated susceptor of electromagnetic energy as claimed in claim 31, wherein the clay mineral is selected from the group consisting of a montmorillonite, a ball clay, illite, dickite, halloysite, a mica, a zeolite, a koalinite, an illitic clay, pyropholite, Endellite, bentonite, chlorite, and combinations thereof.

33. The coated susceptor of electromagnetic energy as claimed in claim 1, wherein the coating on the susceptor is used as a reactant with a chemical species flow for desired products or with a pollutant species to treat pollutants for producing clean air which can be discharge into the environment in accordance with the law of the land.

34. The coated susceptor of electromagnetic energy as claimed in claim 33, wherein the coating is a carbon-containing species that reacts with a chemical species flow to produce hydrogen, higher order chemical species, lower order chemical species, carbon monoxide, carbon dioxide or combinations thereof.

35. The coated susceptor of electromagnetic energy as claimed in claim 33, wherein where the coating contains a reactant selected from the group consisting of Na-beta alumina, Li-beta alumina, NaOH, LiOH, $CaCO_3$, $Ca(OH)_2$, gamma-alumina, alpha-alumina, lithium complexes, a lithium complex partially adsorbed on partially calcine bauxite, a sodium complex partially adsorbed on partially calcine bauxite, silica, a cation-doped silica or combination thereof, to chemically react with a chemical species flow containing a fluorine species, a chlorine species, a sulfur species, and combinations thereof.

36. The coated susceptor of electromagnetic energy as claimed in claim 33, wherein the coating contains a reactant selected from the group consisting of urea, ammonia, cyanuric acid, ammonium carbamate, ammonium bicarbonate, mixtures of ammonia and ammonium bicarbonate, ammonium formate, ammoniumoxialate, sources of a nydroxyl radicals, sources of hydrogen radicals, milk, sugar, molasses, polysaccharides, a reducing agent, and combinations thereof, to chemically react with a chemical species flow containing a nitrogen oxide or nitrogen oxides to produce Nitrogen ($N_2$).

37. A coated susceptor of electromagnetic energy for chemical processing comprising:

a matrix material that surrounds non-matrix material that is made from a material that is different from the matrix material, wherein the matrix material is constructed of material having lower dielectric losses compared to the non-matrix material, wherein:
a. the non-matrix material initially absorbs electromagnetic energy applied to the electromagnetic susceptor to a greater extent than the matrix material;
b. the non-matrix material produces subsequent heat in the matrix material and produces reflection; and
c. the surface of the susceptor is a coated with a material that interacts with applied electromagnetic energy of at least one frequency and initially absorbs electromagnetic energy and produces heat.

38. The coated susceptor of electromagnetic energy as claimed in claim 37, wherein the form of said coating is selected from the group consisting of a full coating on all susceptor surfaces, a full coating on a surface, a partial coating on a surface, a partial coating on all susceptor surfaces, a coating with a specific pattern, a coating containing a homogeneous material, a coating containing a composite material, a partial coating containing a more than one material, a patterned coating containing more than one material, a coating containing multiple layers of different material, and combinations thereof.

39. The coated susceptor of electromagnetic energy as claimed in claim 37, wherein the weight fraction of said non-matrix material is greater than 0.00001 weight percent and less than 50 weight percent.

40. The coated susceptor of electromagnetic energy as claimed in claim 37, wherein the weight fraction of said non-matrix material is greater than 50 weight percent and less 99 weight percent.

41. The coated susceptor of electromagnetic energy as claimed in claim 37, wherein said coating has optical dielectric properties in relation to the applied electromagnetic energy selected from the group consisting of transparent, reflective, scattering, absorptive, and combinations thereof.

42. The coated susceptor of electromagnetic energy as claimed in claim 37, wherein said coating provides a utility to effect a physical property of said susceptor selected from the group consisting of mechanical properties, thermal properties, optical properties of the non-matrix material, optical properties of the susceptor, absorption of electromagnetic energy, reflection of electromagnetic energy, transmission of electromagnetic energy, scattering of electromagnetic energy, electromagnetic properties, corrosive properties, wear properties, piezoelectric properties, dielectric properties, magnetic properties, electric properties, susceptibility to the applied electromagnetic energy, susceptibility to the fluorescent electromagnetic energy, conductivity, controlling the chemical compatibility between the non-matrix material and the matrix material, regulating the temperature of said susceptor, regulating the temperature of a process, regulating the amount of electromagnetic energy available for chemical process, regulating the amount of electromagnetic energy available for a physical process, and combinations thereof.

43. The coated susceptor of electromagnetic energy as in claim 37, wherein said physical properties are controlled by the thickness of the coating.

44. The coated susceptor of electromagnetic energy as claimed in claim 37, wherein said susceptor is used in an atmosphere selected from the group consisting of a reducing atmosphere, an oxidizing atmosphere, an atmosphere at one atmosphere of pressure, an atmosphere at less than one atmosphere of pressure, an atmosphere at greater than one atmosphere of pressure, and combinations thereof.

45. The coated susceptor of electromagnetic energy as claimed in claim 37, wherein said coating is constructed of a material selected from the group consisting of metallic, amorphous, polycrystalline, antiferromagnetic, antiferroelectric, paramagnetic, a material with a Curie temperature, glassy, metallic, ferrimagnetic, ferroelectric, ferromagnetic, semiconducting, conducting, a solid-state ionic conductor, a material that produces thermionic emissions, a material that is thermoelectric, a cermet, a ceramic glaze with metal particles, a non-stoichiometric carbide, a non-stoichiometric oxide, an oxycarbide, an oxynitride, a carbonitride, an intermetallic, a hydroxide, a non-stoichiometric nitride, thermoluminescent, a non-stoichiometric Ilmenitic structure, fluorescent, an artificial dielectric material, an artificial dielectric material where the volume fraction of the non-matrix species is less that 50 volume percent, an artificial dielectric material where the volume fraction of the non-matrix species is equal to or greater than 50 volume percent, a boride, a material with low dielectric constant and low dielectric losses, a material with a high dielectric constant and low dielectric losses, a silicide, a nitride, an aluminide, a material with a high dielectric constant and high dielectric losses, a material with a high dielectric constant and moderate dielectric losses, a carbide, an oxide, anatase, a sulfide, a sulfate, a crystalline form of silica, a carbonate, a glass ceramic, photochromatic, thermochromatic, a composite material, an organic polymeric matrix composite, a ceramic matrix composite, a metal matrix composite, a crystalline form of silica, fused silica, quartz, a organic copolymer, an amorphous organic polymer, a crystalline organic polymer, polycarbonate, polypropylene, polystyrene, polyethylene, polyester, polytetrafluoroethylene, a phase separated glass, an ionic conductor, a material derived by processing a clay mineral with heat to a temperature and for time period above the temperature that the water of crystallization is removed and below a temperature and for time period that prevent complete transformation of the clay material to non-reversible crystalline and/or glass phases, a material derived by processing talc with heat to a temperature and for time period above the temperature that the water of crystallization is removed and below a temperature and for time period that prevent complete transformation of the talc material to non-reversible crystalline and/or glass, a material derived by processing a zeolite with heat to a temperature and for time period above the temperature that the water of crystallization is removed and below a temperature and for time period that prevent complete transformation of the zeolite material to non-reversible crystalline and/or glass phases, a material derived by processing Brucite with heat to a temperature and for time period above the temperature that the water of crystallization is removed and below a temperature and for time period that prevent complete transformation of the Brucite material to non-reversible crystalline material, a material derived by processing a Gibbsite with heat to a temperature and for time period above the temperature that the water of crystallization is removed and below a temperature and for time period that prevent complete transformation of the clay material to non-reversible crystalline material, and combinations thereof.

46. The coated susceptor of electromagnetic energy as claimed in claim 45, wherein the clay mineral is selected from the group consisting of a montmorillonite, a ball clay, illite, dickite, halloysite, a mica, a zeolite, a koalinite, an illitic clay, pyropholite, Endellite, bentonite, chlorite, and combinations thereof.

47. The coated susceptor of electromagnetic energy as claimed in claim 37, wherein said coating is constructed of a material selected from the group consisting of FeO, CuO $Cu_2O$, $MnO_2$ $Mn_2O_5$, NiO, $Fe_2O_3$, $Fe_3O_4$, CuO—$MnO_2$, $Cu_2O$—$MnO_2$, $Li_2O$—$Cu_2O$, $Li_2O$—CuO, $Li_2O$—$MnO_2$, SiC, WC, TiC, $TiC_{x-y}O_y$, $TiC_{1-x}$, $TiO_2$, non-stoichiometric titanium oxide, $Li_2O$—NiO, $TiO_2$ doped with a divalent cation, $TiO_2$ doped with a trivalent cation, $Fe_2O_3$ doped with $Ti^{+4}$, TiO, $Ti_2O_3$, non-stoichiometric zirconia oxide, anatase, beta"-alumina, alpha-alumina, Na-beta-alumina, Li-beta-alumina, (Na,Li)-beta-alumina, carbon, graphite, ZnO, CuS, FeS, CoO, calcium aluminate, char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, and combinations thereof.

48. The coated susceptor of electromagnetic energy as claimed in claim 37, wherein said coating is an amorphous material that is at a temperature below the material's glass transition temperature during the chemical processing.

49. The coated susceptor of electromagnetic energy as claimed in claim 37, wherein the frequency of said applied electromagnetic energy is selected from the group consisting of visible, ultraviolet, radio frequency, microwave, infrared, a variable frequency source, 915 MHz, 2.59 GHz, and combinations thereof.

50. The coated susceptor of electromagnetic energy as claimed in claim 37, wherein the structure of said susceptor is selected from the group consisting of chiral-shaped, spire-like shaped, helical shaped, rod-like shaped, plate-like shaped, acicular shaped, spherical shaped, ellipsoidal shaped, disc-shaped, irregular-shaped, plate-like shaped, a shape of a spiral antenna species for at least one wavelength of applied electromagnetic energy, shape of an antenna specified for at least on wavelength of applied electromagnetic energy, needle-like shaped, twist shaped, rotini shaped, a woven structure and honeycomb-like structure, multi-cell structure, cylindrical shaped, tubular shaped, a reticulated structure, a foamed structure, a capillary structure, and combinations thereof.

51. The coated susceptor of electromagnetic energy as claimed in claim 50, wherein the coated susceptor is permeable to a chemical species flow.

52. The coated susceptor of electromagnetic energy as claimed in claim 37, wherein the coated susceptor is used as a plurality of susceptors for chemical processing in the form of an operation selected from the group consisting of a fluidized bed, a slurry, a fluid mixture of susceptors and chemicals species flow, a gaseous mixture of particulate susceptors and a chemical species flow, a packed bed, a solid mixture of particulate susceptors and a solid chemical species flow, and combinations thereof.

53. The coated susceptor of electromagnetic energy as claimed in claim 37, wherein said coating becomes reflective at the operating temperature of the chemical processing.

54. The coated susceptor of electromagnetic energy as claimed in claim 37, further comprising a field concentrator wherein the location of the field concentrator is selected from the group consisting of on the coating, embedded in the coating, in the coating, and combinations thereof.

55. The coated susceptor of electromagnetic energy as claimed in claim 37, wherein said coating has a function selected from the group consisting of driving chemical reactions, assisting in chemical reactions, polymerization, producing biodiesel through catalysis, synthesizing pharmaceuticals, reducing nitrogen oxides to nitrogen ($N_2$), reducing NO to nitrogen ($N_2$), reducing $NO_2$ to NO, reducing $NO_2$ to nitrogen ($N_2$), reducing $SO_x$ to sulfur (S), reducing $SO_3$ to $SO_2$, reducing $SO_4$ to $SO_2$, reducing $SO_3$ to $SO_2$, chemical synthesis, sterilization, cracking hydrocarbons, decreasing the activation energy of a chemical process, oxidizing volatile organic compounds, oxidizing carbon monoxide to carbon dioxide, reducing NOx in the presence of hydrocarbons, synthesizing biodiesel, reforming a hydrocarbon with a hydrogen donor species in the presence of $H_{23}$, reforming a hydrocarbon with methane in the presence of $H_{23}$, reforming a hydrocarbon in the presence of methane, water and carbon dioxide, reforming a hydrocarbon in the presence of methane, water, hydrogen and carbon dioxide, reforming a hydrocarbon in the presence of hydrogen and methane, polymerizing a hydrocarbon in the presence of metal halides, reducing nitrogen oxides in the presence of ammonia, reducing nitrogen oxides in the presence of ammonium-containing compounds, treating pollutants to form clean air which can be discharged into the environment in accordance to the law of the land, oxidative bond cleavage of a hydrocarbon, non-oxidative bond cleavage of a hydrocarbon, catalysis, field concentration or combination thereof, wherein the reaction occurs in physical phases of matter from the group consisting of a plasma, gas, solid, liquid, a fluid containing particulates, and combinations thereof.

56. The coated susceptor of electromagnetic energy as claimed in claim 37, wherein the operating temperature of said susceptor is selected from the group of operating conditions consisting of a temperature which is above the Curie temperature of all the susceptor's materials, a temperature which is below the Curie temperature of all the susceptor's materials, a temperature which is above Curie temperature of the non-matrix material only, a temperature which is above the Curie temperature of the matrix material only, a temperature which is above the Curie temperature of all the susceptor's materials causing increased absorption, a temperature which is above the Curie temperature of the non-matrix causing increased absorption, a temperature which is above the Curie temperature of the matrix causing increased absorption, a temperature above the thermal runaway temperature (critical temperature) of at least one of the constituent phases, a temperature which is below the thermal runaway temperature (critical temperature) of all the constituent phases, a temperature which is below the activation temperature of the intrinsic dielectric conduction species of all the phases present, a temperature which is above the activation temperature of at least one intrinsic dielectric conducting species of all constituent phases, a temperature above the Curie temperature of the coating's material, a temperature which is below the activation temperature of all extrinsic dielectric conducting species, a temperature which is above the activation temperature of at least one extrinsic dielectric conducting species of all the constituent phases, and combinations thereof.

57. The coated susceptor of electromagnetic energy as claimed in claim 37, wherein said coating is selected from the group consisting of controlling the amount of absorption of the applied electromagnetic energy by said susceptor material, regulating the temperature of the susceptor, controlling the amount of reflectivity of the applied electromagnetic energy by said susceptor, or a combination thereof.

58. The coated susceptor of electromagnetic energy as claimed in claim 37, wherein the applied electromagnetic energy is applied in the form of continuous energy, pulsed energy or a combination thereof.

59. The coated susceptor of electromagnetic energy as claimed in claim 37, wherein said coating contains a material with catalytic properties.

60. The coated susceptor of electromagnetic energy as claimed in claim 59, wherein the material with catalytic properties has a molecular structure selected from the group consisting of amorphous, rock salt, zinc blend, antifluorite, rutile, perovskite, spinel, inverse spinel, nickel arsenide, corundum, ilimenite, olivine, cesium chloride, fluorite, silica types, wurtzite, derivative structure of a known crystalline structure, a superstructure of a known crystalline structure, orthosilicate, metasilicate, gibbsite, graphite, zeolite, carbide, nitride, montmorillonite, pyrophyllite, intermetallic semiconductor, metallic semiconductor, garnet, psuedoperovskite, orthoferrite, hexagonal ferrite, rare earth garnet, and ferrite.

61. The coated susceptor of electromagnetic energy as claimed in claim 59, wherein the material with catalytic properties has electronic properties selected from the group consisting of a p-type material, an n-type material, a cation-doped p-type dominate material, an anion-doped p-type dominate materials, a cation-doped n-type dominate material, an anion-doped n-type material, and combinations thereof.

62. The coated susceptor of electromagnetic energy as claimed in claim 59, wherein a barrier coating is place between said coating material with catalytic properties and said susceptor to prevent deleterious chemical reaction between said coating material with catalytic properties and the susceptor, to help prevent the poisoning of the catalyst, and to prevent combination thereof.

63. The coated susceptor of electromagnetic energy as claimed in claim 59, wherein the material with catalytic properties has a form selected from the group consisting of a catalyst that is a full coating on all susceptor surfaces, a catalyst that is partial coating on all susceptor surfaces, a catalyst that is particulate catalyst on the susceptor's surface, a catalyst that is particulate catalyst contained in a coating that is on the susceptor, a catalyst that is particulate catalyst on a coating that is on the susceptor, a catalyst that is full coating of all susceptor surfaces that has an additional coating between the catalyst and the susceptor, a catalyst that is a partial coating of all susceptor surfaces that has an additional coating between the catalyst and the susceptor, and combinations thereof.

64. The coated susceptor of electromagnetic energy as claimed in claim 59, wherein the material is a composite selected from the group consisting of catalytic composites consisting of two or more catalysts that perform the same function, two or more catalysts where at least one catalyst performs a different function than the other catalyst, two or more catalysts where at least one catalyst is a metallic species, two or more catalyst where at least one catalyst has a Curie temperature, and combinations thereof.

65. The coated susceptor of electromagnetic energy as claimed in claim 59, wherein the material with catalytic properties has a function selected from the group consisting of driving chemical reactions, assisting in chemical reactions, polymerization, producing biodiesel through catalysis, synthesizing pharmaceuticals, reducing nitrogen oxides to nitrogen ($N_2$), reducing NO to nitrogen ($N_2$), reducing $NO_2$ to NO, reducing $NO_2$ to nitrogen ($N_2$), reducing $SO_x$ to sulfur (S), reducing $SO_3$ to $SO_2$, reducing $SO_4$ to $SO_2$, reducing $SO_3$ to $SO_2$, chemical synthesis, sterilization, cracking hydrocarbons, decreasing the activation energy of a chemical process, oxidizing volatile organic compounds, oxidizing carbon monoxide to carbon dioxide, reducing NOx in the presence of hydrocarbons, synthesizing biodiesel, reforming a hydrocarbon with a hydrogen donor species in the presence of $H_{23}$, reforming a hydrocarbon with methane in the presence of $H_{23}$, reforming a hydrocarbon in the presence of methane, water and carbon dioxide, reforming a hydrocarbon in the presence of methane, water, hydrogen and carbon dioxide, reforming a hydrocarbon in the presence of hydrogen and methane, polymerizing a hydrocarbon in the presence of metal halides, reducing nitrogen oxides in the presence of ammonia, reducing nitrogen oxides in the presence of ammonium-containing compounds, treating pollutants to form clean air which can be discharged into the environment in accordance to the law of the land, oxidative bond cleavage of a hydrocarbon, non-oxidative bond cleavage of a hydrocarbon, catalysis, field concentration or combination thereof, wherein the reaction occurs in physical phases of matter from the group consisting of a plasma, gas, solid, liquid, a fluid containing particulates, and combinations thereof.

66. The coated susceptor of electromagnetic energy as claimed in claim 59, wherein the material with catalytic properties is selected from the group of materials consisting of a photocatalytic material activated by electromagnetic energy in the ultraviolet region, a photo catalytic material activated by electromagnetic energy in the visible region, a infrared catalytic materials activated by electromagnetic energy in the infrared region, a catalytic materials activated by electromagnetic energy in the microwave region, a catalytic material activated by electromagnetic energy in the radio frequency region, and combinations thereof.

67. The coated susceptor of electromagnetic energy as claimed in claim 59, wherein the material with catalytic properties is selected from the group of consisting of materials that are a precious metal, Fe, Co, Ni, Pt, Pd, Au, Ag, chalcogenide, metal alloy, boride, Fe-based alloy, a precious metal alloy, an artificial dielectric, an artificial dielectric material where the volume fraction of the non-matrix species is less that 50 volume percent, an artificial dielectric material where the volume fraction of the non-matrix species is equal to or greater than 50 volume percent, Co-alloy, Ni-alloy, antiferromagnetic, antiferroelectric, paramagnetic, a material with a Curie temperature, glassy, metallic, ferrimagnetic, ferroelectric, ferromagnetic, semiconducting, conducting, solid-state ionic conductor, non-stoichiometric carbide, non-stoichiometric oxide, oxycarbide, oxynitride, carbonitride, oxide, nitride, intermetallic, a material that produces thermionic emissions, a material that is thermoelectric, a cermet, a ceramic glaze with metal particles, hydroxide, thermoluminescent, fluorescent, boride, a material with low dielectric constant and low dielectric losses, a material with a high dielectric constant and low dielectric losses, silicide, nitride, aluminide, a material with a high dielectric constant and high dielectric losses, a material with a high dielectric constant and moderate dielectric losses, carbide, oxide, anatase, sulfide, sulfate, carbonate, FeO, CuO $Cu_2O$, $MnO_2$ $Mn_2O_5$, NiO, $Fe_2O_3$, $Fe_3O_4$, CuO—$MnO_2$, $Li_2O$—NiO, $TiO_2$ doped with a divalent cation, $TiO_2$ doped with a trivalent cation, $Fe_2O_3$ doped with $Ti^{+4}$, $Cu_2O$—$MnO_2$, $Li_2O$—$Cu_2O$, $Li_2O$—CuO, $Li_2O$—$MnO_2$, SiC, WC, TiC, $TiC_{x-y}O_y$, $TiC_{1-x}$, $TiO_2$, non-stoichiometric titanium oxide, TiO, $Ti_2O_3$, non-stoichiometric zirconia oxide, anatase, beta"-alumina, alpha-alumina, Na-beta-alumina, Li-beta-alumina, (Na,Li)-beta-alumina, carbon, graphite, ZnO, CuS, FeS, CoO, calcium aluminate, char, Ni, Co, Fe, NiFe alloy, $MgTiO_3$, $MnTiO_3$, $NiTiO_3$, $CoTiO_3$, $FeTiO_3$, $LiNbO_3$, $MnTiO_{3-x}$, $NiTiO_{3-x}$, $MgTiO_{3-x}$, $CoTiO_{3-x}$, $FeTiO_{3-x}$, $ZnO_{1-x}$, $SmLiO_2$, $LaLiO_2$, $LaNaO_2$, $SmNaO_2$, $(SmLiO_2)_{0.8}(CaOMgO)_{0.2}$, $(LaLi_2)_{0.7}(SrOMgO)_{0.3}$, $(NdLiO_2)_{0.8}(CaMgO)_{0.2}$, strontium-doped lanthium oxide supported on magnesium oxide, a material derived by processing a clay mineral with heat to a temperature and for time period above the temperature that the water of crystallization is removed and below a temperature and for time period that prevent complete transformation of the clay material to non-reversible crystalline and/or glass phases, a material derived by processing talc with heat to a temperature and for time period above the temperature that the water of crystallization is removed and below a temperature and for time period that prevent complete transformation of the talc material to non-reversible crystalline and/or glass, a material derived by processing a zeolite with heat to a temperature and for time period above the temperature that the water of crystallization is removed and below a temperature and for time period that prevent complete transformation of the zeolite material to non-reversible crystalline and/or glass phases, a material derived by processing Brucite with heat to a temperature and for time period above the temperature that the water of crystallization is removed and below a temperature and for time period that prevent complete transformation of the Brucite material to non-reversible crystalline material, a material derived by processing a Gibbsite with heat to a temperature and for time period above the temperature that the water of crystallization is removed and below a temperature and for time period that prevent complete transformation of the clay material to non-reversible crystalline material, and combinations thereof.

68. The coated susceptor of electromagnetic energy as claimed in claim 67, wherein the clay mineral is selected from the group consisting of a montmorillonite, a ball clay, illite, dickite, halloysite, a mica, a zeolite, a koalinite, an illitic clay, pyropholite, Endellite, bentonite, chlorite, and combinations thereof.

69. The coated susceptor of electromagnetic energy as claimed in claim 37, wherein the coating on the susceptor is used as reactants with a chemical species flow for desired products or with a pollutant species to treat pollutants for producing clean air which can be discharge into the environment in accordance with the law of the land.

70. The coated susceptor of electromagnetic energy as claimed in claim 69, wherein the coating is a carbon-containing species that reacts with a chemical species flow to produce hydrogen, higher order chemical species, lower order chemical species, carbon monoxide, carbon dioxide or combinations thereof.

71. The coated susceptor of electromagnetic energy as claimed in claim 69, wherein where the coating contains a reactant selected from the group consisting of Na-beta alumina, Li-beta alumina, NaOH, LiOH, $CaCO_3$, $Ca(OH)_2$, gamma-alumina, alpha-alumina, lithium complexes, a lithium complex partially adsorbed on partially calcine bauxite, a sodium complex partially adsorbed on partially calcine bauxite, silica, a cation-doped silica or combination thereof, to chemically react with a chemical species flow containing a fluorine species, a chlorine species, a sulfur species, and combinations thereof.

72. The coated susceptor of electromagnetic energy as claimed in claim 69, wherein the coating contains a reactant selected from the group consisting of urea, ammonia, cyanuric acid, ammonium carbamate, ammonium bicarbonate, mixtures of ammonia and ammonium bicarbonate, ammonium formate, ammoniumoxialate, sources of a nydroxyl radicals, sources of hydrogen radicals, milk, sugar, molasses, polysaccharides, a reducing agent or combination thereof, to chemically react with a chemical species flow containing a nitrogen oxide, and nitrogen oxides to produce Nitrogen ($N_2$).

* * * * *